(12) United States Patent
Ghuman et al.

(10) Patent No.: US 10,999,656 B2
(45) Date of Patent: May 4, 2021

(54) COHERENT GIGABIT ETHERNET AND PASSIVE OPTICAL NETWORK COEXISTENCE IN OPTICAL COMMUNICATIONS MODULE LINK EXTENDER RELATED SYSTEMS AND METHODS

(71) Applicant: Cox Communications, Inc., Atlanta, GA (US)

(72) Inventors: Harjinder S. Ghuman, Alpharetta, GA (US); Jeffrey L. Finkelstein, Atlanta, GA (US); David Job, Atlanta, GA (US); Robert Kuse, Atlanta, GA (US); Christopher Palmquist, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 16/725,816

(22) Filed: Dec. 23, 2019

(65) Prior Publication Data
US 2020/0245045 A1 Jul. 30, 2020

Related U.S. Application Data

(63) Continuation of application No. 16/054,737, filed on Aug. 3, 2018, now Pat. No. 10,516,922, which is a
(Continued)

(51) Int. Cl.
*H04B 10/00* (2013.01)
*H04Q 11/00* (2006.01)
(Continued)

(52) U.S. Cl.
CPC ....... *H04Q 11/0005* (2013.01); *H04B 10/032* (2013.01); *H04B 10/27* (2013.01);
(Continued)

(58) Field of Classification Search
USPC .................. 398/66–73, 32, 79–88
See application file for complete search history.

(56) References Cited

U.S. PATENT DOCUMENTS 5,663,818 A * 9/1997 Yamamoto ......... H04Q 11/0001
398/1
5,664,131 A 9/1997 Sugiya
(Continued)

OTHER PUBLICATIONS

Ghuman, H. "DWDM Access for Remote Phy Networks Integrated Optical Communications Module (OCML)", SCTE/ISBE, 2017. (19 pages).
(Continued)

*Primary Examiner* — Agustin Bello
(74) *Attorney, Agent, or Firm* — Eversheds Sutherland (US) LLP

(57) ABSTRACT

This disclosure describes devices and methods related to multiplexing optical data signals. A method may be disclosed for multiplexing one or more optical data signals. The method may comprise receiving, by a dense wave division multiplexer (DWDM), one or more optical data signals. The method may comprise combining, by the DWDM, the one or more optical data signals. The method may comprise outputting, by the DWDM, the combined one or more optical data signals to one or more wave division multiplexer (WDM). The method may comprise combining, by the one or more WDM, the combined one or more optical data signals and one or more second optical data signals, and outputting an egress optical data signal comprising the combined one or more optical data signals and one or more second optical data signals.

14 Claims, 22 Drawing Sheets

Related U.S. Application Data continuation-in-part of application No. 15/877,247, filed on Jan. 22, 2018, now Pat. No. 10,205,552.

(60) Provisional application No. 62/536,431, filed on Jul. 24, 2017, provisional application No. 62/448,663, filed on Jan. 20, 2017.

(51) Int. Cl.
*H04J 14/02* (2006.01)
*H04B 10/27* (2013.01)
*H04B 10/032* (2013.01)
*H04B 10/291* (2013.01)

(52) U.S. Cl.
CPC ............ *H04B 10/291* (2013.01); *H04J 14/02* (2013.01); *H04J 14/0278* (2013.01); *H04J 14/0291* (2013.01); *H04Q 11/00* (2013.01); *H04Q 2011/0015* (2013.01); *H04Q 2011/0016* (2013.01)

(56) References Cited

U.S. PATENT DOCUMENTS

| | | | |
|---|---|---|---|
| 5,742,416 A | 4/1998 | Mizrahi | |
| 5,995,256 A | 11/1999 | Fee | |
| 5,995,259 A | 11/1999 | Meli et al. | |
| 6,323,994 B1 | 11/2001 | Li et al. | |
| 6,392,790 B1 | 5/2002 | Lauder et al. | |
| 6,414,769 B1 | 7/2002 | Meli et al. | |
| 6,493,133 B1 | 12/2002 | Liang et al. | |
| 6,519,060 B1* | 2/2003 | Liu | H04J 14/0206 398/49 |
| 6,570,703 B2 | 5/2003 | Murakami et al. | |
| 6,580,548 B2 | 6/2003 | Islam | |
| 6,606,427 B1* | 8/2003 | Graves | G02B 6/3849 385/17 |
| 6,961,522 B1* | 11/2005 | Castagnetti | H04B 10/2916 398/157 |
| 6,973,268 B1 | 12/2005 | Thompson | |
| 7,106,969 B1* | 9/2006 | Lichtman | H04B 10/25073 398/158 |
| 7,239,772 B2* | 7/2007 | Wang | H04J 14/0208 385/17 |
| 7,505,687 B2* | 3/2009 | Jaggi | H04J 14/0286 398/66 |
| 7,509,048 B2* | 3/2009 | Turpin | G02B 6/2861 398/83 |
| 7,565,081 B1* | 7/2009 | Britz | H04B 10/1125 398/70 |
| 7,773,838 B2 | 8/2010 | Lee et al. | |
| 7,796,886 B2* | 9/2010 | Jaggi | H04B 10/2589 398/66 |
| 7,805,073 B2 | 9/2010 | Sabat et al. | |
| 8,116,629 B2* | 2/2012 | Boduch | H04J 14/0213 398/83 |
| RE43,403 E* | 5/2012 | Jaggi | H04B 10/2589 398/66 |
| 8,238,751 B1 | 8/2012 | Iannone et al. | |
| 8,320,759 B2* | 11/2012 | Boduch | H04J 14/0205 398/48 |
| 8,873,963 B2* | 10/2014 | Handelman | H04J 14/02 398/79 |
| 8,897,639 B2* | 11/2014 | Trojer | H04B 10/516 398/38 |
| 9,014,557 B2* | 4/2015 | Graves | H04Q 11/0005 398/45 |
| 9,172,492 B2 | 10/2015 | Lee | |
| 10,211,920 B1 | 2/2019 | Khaleghi et al. | |
| 10,541,774 B1 | 1/2020 | Dai | |
| 2001/0015843 A1 | 8/2001 | Miyauchi et al. | |
| 2001/0019449 A1 | 9/2001 | Krummrich | |
| 2002/0000346 A1 | 1/2002 | Baranda et al. | |
| 2002/0003646 A1 | 1/2002 | Ishikawa | |
| 2002/0024706 A1 | 2/2002 | Meli | |
| 2002/0048066 A1* | 4/2002 | Antoniades | H04J 14/0228 398/82 |
| 2002/0089719 A1 | 7/2002 | Joo et al. | |
| 2002/0141046 A1 | 10/2002 | Joo et al. | |
| 2002/0163691 A1* | 11/2002 | Wong | G02B 27/288 398/27 |
| 2002/0181048 A1* | 12/2002 | Kuykendall, Jr. | G02B 6/4296 398/87 |
| 2003/0076560 A1* | 4/2003 | Pratt | H04B 10/272 398/79 |
| 2003/0142978 A1 | 7/2003 | Lee et al. | |
| 2003/0194242 A1 | 10/2003 | Miyauchi et al. | |
| 2004/0184804 A1* | 9/2004 | Shahar | H04J 14/005 398/79 |
| 2004/0252996 A1* | 12/2004 | McNicol | H04J 14/0224 398/79 |
| 2005/0141892 A1 | 6/2005 | Park et al. | |
| 2005/0158049 A1 | 7/2005 | Lee et al. | |
| 2005/0286896 A1* | 12/2005 | Kinoshita | H04J 14/0212 398/83 |
| 2006/0045528 A1* | 3/2006 | Gumaste | H04J 14/0213 398/83 |
| 2006/0104638 A1 | 5/2006 | Chung et al. | |
| 2006/0165412 A1 | 7/2006 | Jung et al. | |
| 2007/0019956 A1* | 1/2007 | Sorin | H04J 14/0227 398/71 |
| 2007/0212072 A1 | 9/2007 | Iannone et al. | |
| 2008/0089684 A1* | 4/2008 | Smith | H04J 14/0246 398/58 |
| 2009/0010648 A1* | 1/2009 | Zuhdi | H04J 14/0226 398/58 |
| 2009/0074417 A1 | 3/2009 | Vassilieva et al. | |
| 2009/0129774 A1* | 5/2009 | Jaggi | H04J 14/0283 398/45 |
| 2009/0208212 A1 | 8/2009 | Lee et al. | |
| 2009/0220231 A1* | 9/2009 | Zimmel | H04B 10/25 398/72 |
| 2009/0297152 A1 | 12/2009 | Bainbridge et al. | |
| 2010/0046946 A1 | 2/2010 | Cao et al. | |
| 2010/0054740 A1 | 3/2010 | Lee et al. | |
| 2010/0119223 A1 | 5/2010 | Ferrari et al. | |
| 2010/0189442 A1 | 7/2010 | Grobe | |
| 2010/0239257 A1 | 9/2010 | Grossman et al. | |
| 2010/0266283 A1 | 10/2010 | Beckett | |
| 2010/0278535 A1 | 11/2010 | Kim | |
| 2010/0316386 A1 | 12/2010 | Luk et al. | |
| 2011/0158650 A1* | 6/2011 | Cavaliere | H04J 14/0227 398/79 |
| 2011/0299858 A1 | 12/2011 | Mazzini et al. | |
| 2012/0020668 A1* | 1/2012 | Trojer | H04J 11/0067 398/115 |
| 2012/0087648 A1 | 4/2012 | Gao et al. | |
| 2012/0148245 A1* | 6/2012 | Bowler | H04J 14/02 398/58 |
| 2012/0315047 A1 | 12/2012 | Iannone et al. | |
| 2013/0039656 A1 | 2/2013 | Lam et al. | |
| 2013/0057948 A1 | 3/2013 | Simonneau et al. | |
| 2013/0084064 A1 | 4/2013 | Akasaka | |
| 2013/0266318 A1 | 10/2013 | Manaf et al. | |
| 2014/0099117 A1* | 4/2014 | Way | H04B 10/5167 398/79 |
| 2014/0161446 A1 | 6/2014 | Lee et al. | |
| 2014/0233954 A1 | 8/2014 | Lee et al. | |
| 2015/0043919 A1* | 2/2015 | Handelman | H04J 14/0213 398/83 |
| 2015/0139654 A1* | 5/2015 | Mandelbaum | H04J 14/0202 398/83 |
| 2015/0249314 A1 | 9/2015 | Onaka | |
| 2015/0249520 A1* | 9/2015 | Badar | H04J 14/0245 398/79 |
| 2015/0304033 A1 | 10/2015 | Girogi et al. | |
| 2016/0087747 A1 | 3/2016 | Way | |
| 2016/0192043 A1 | 6/2016 | Shukunami et al. | |
| 2016/0197697 A1 | 7/2016 | Bonk et al. | |
| 2017/0134113 A1* | 5/2017 | Lam | H04J 14/08 |

(56) References Cited

U.S. PATENT DOCUMENTS

| | | | |
|---|---|---|---|
| 2017/0237483 A1* | 8/2017 | Barnard | H04J 14/02 |
| | | | 398/79 |
| 2018/0212706 A1* | 7/2018 | Ghuman | H04J 14/0283 |
| 2018/0261971 A1 | 9/2018 | Yaman et al. | |
| 2019/0036802 A1 | 1/2019 | Jeyaram | |
| 2019/0132049 A1 | 5/2019 | Cai et al. | |
| 2019/0140765 A1* | 5/2019 | Ghuman | H04J 14/0291 |
| 2019/0181952 A1 | 6/2019 | Jia et al. | |
| 2019/0215091 A1 | 7/2019 | Johansson | |
| 2020/0099546 A1 | 3/2020 | Haag et al. | |

OTHER PUBLICATIONS

Ghuman, H., "Coherent Access Applications for MSOs", SCTE/ISBE, 2018. (23 pages).

Bindhaiq, et al., Recent Development on Time and Wavelength-Division Multiplexed Passive Optical Network (TWDM-PON) for Next-Generation Passive Optical Network Stage 2 (NG-PON2), Optical Switching and Networking 15, 2015. (14 pages).

\* cited by examiner

| Parameter | Length (km) | Loss Budget (dBm) |
|---|---|---|
| 10GbE Txcvr Pwr/WL 401 | N/A | 0.0 |
| Fiber 402 | 5 | 1.25 |
| Headend DWDM Mux 403 | N/A | 5.8 |
| Field DWDM DeMux 404 | N/A | 5.8 |
| Switch (Headend) 405 | N/A | 1.5 |
| 3 dB Optical Passive 406 | N/A | 3.5 |
| Connectors 407 (2 @0.3dB) | N/A | 0.6 |
| Safety Margin 408 | N/A | 3 |
| | Total Loss | 21.45 |
| | FieldRX I/P | -21.5 |

FIG. 4

| | Wavelength 701 | Tx Power 702 | Dispersion Penalty 703 | Loss Budget 705 | Minimum Receive Power 709 |
|---|---|---|---|---|---|
| GPON C+ 711 | | | | | |
| Downstream 712 | 1490 nanometers | 3-7 decibel-milliwatt | 1 decibel | 32 decibel | -30 decibel |
| Upstream 713 | 1310 nanometers | 0.5-5 decibel-milliwatt | 0.5 decibel | 32 decibel | -32 decibel |
| XGPON N2a 721 | | | | | |
| Downstream 722 | 1575 nanometers | 4-8 decibel-milliwatt | 1 decibel | 31 decibel | -28 decibel |
| Upstream 723 | 1270 nanometers | 2-7 decibel-milliwatt | 0.5 decibel | 31 decibel | -29.5 decibel |
| XGPON N1 731 | | | | | |
| Downstream 732 | 1575 nanometers | 2-6 decibel-milliwatt | 1 decibel | 29 decibel | -28 decibel |
| Upstream 733 | 1270 nanometers | 2-7 decibel-milliwatt | 0.5 decibel | 29 decibel | -27.5 decibel |

FIG. 7

COHERENT GIGABIT ETHERNET AND PASSIVE OPTICAL NETWORK COEXISTENCE IN OPTICAL COMMUNICATIONS MODULE LINK EXTENDER RELATED SYSTEMS AND METHODS

CROSS-REFERENCE TO RELATED PATENT APPLICATION

The present application is related to and claims priority from U.S. patent application Ser. No. 16/054,737 filed Mar. 8, 2018, which claims priority from U.S. patent application Ser. No. 15/877,247 field Jan. 22, 2018, which is a conversion of U.S. Provisional Patent Application No. 62/448,663 filed Jan. 20, 2017, and U.S. Provisional Patent Application No. 62/536,431 filed Jul. 24, 2017, the disclosures of which are incorporated by reference as set forth in full.

FIELD OF INVENTION

This disclosure relates generally to the field of optical telecommunications and includes an integrated module with several sub-assemblies.

BACKGROUND

To understand the importance of optical networking, the capabilities of this technology have to be discussed in the context of the challenges faced by the telecommunications industry, and, in particular, service providers. Most U.S. networks were built using estimates that calculated bandwidth use by employing concentration ratios derived from classical engineering formulas for modeling network usage such as the Poisson process. Consequently, forecasts of the amount of bandwidth capacity needed for data networks were calculated on the presumption that a given individual would only use network bandwidth six minutes of each hour. These formulas did not factor in the amount of traffic generated by different devices accessing the Internet. With the advent of the Internet and the ever increasing number of devices (e.g., facsimile machines, multiple phone lines, modems, teleconferencing equipment, mobile devices including smart phones, tablets, laptops, wearable devices, and Internet of Things (IoT) devices, etc.) accessing the Internet, there has been an average increase in Internet traffic of 300 percent year over year. Had these factors been included, a far different estimate would have emerged.

As a result of this explosive growth of devices, an enormous amount of bandwidth capacity is required to provide the services required by these devices. In the 1990s, some long-distance carriers increased their capacity (bandwidth) to 1.2 Gbps over a single optical fiber pair, which was a considerable upgrade at the time. At a transmission speed of one Gbps, one thousand books can be transmitted per second. However today, if one million families in a city decided to view a video on a Web site (e.g., YouTube, Home Box Office (HBO) on the go, DirectTV, etc.) then network transmission rates on the order of terabits are required. With a transmission rate of one terabit, it is possible to transmit 200 million simultaneous full duplex phone calls or transmit the text from 300 years-worth of daily newspapers per second.

When largescale data networks providing residential, commercial, and enterprise customers with Internet access were first deployed, the unprecedented growth in the number of devices accessing the network could not have been imagined. As a result, the network growth requirements needed in order to meet the demand of the devices were not considered at that time either. For example, from 1994 to 1998, it is estimated that the demand on the U.S. interexchange carriers' (IXC's) network would increase sevenfold, and for the U.S. local exchange carriers' (LEC's) network, the demand would increase fourfold. For instance, some cable companies indicated that their network growth was 32 times the previous year, while other cable companies have indicated that the size of their networks have doubled every six months in a four-year period.

In addition to this explosion in consumer demand for bandwidth, many service provider are coping with optical fiber exhaust in their network. For example, in 1995 alone many Internet Service Provider (ISP) companies indicated that the amount of embedded optical fibers already in use at the time was between 70 percent and 80 percent (i.e., 70 to 80 percent of the capacity of their networks were used the majority of the time to provide service to customers). Today, many cable companies are nearing one hundred percent capacity utilization across significant portions of their networks. Another problem for cable companies is the challenge of deploying and integrating diverse technologies in on physical infrastructure. Customer demands and competitive pressures mandate that carriers offer diverse services economically and deploy them over the embedded network. One potential technology that meets these requirements is based on multiplexing a large and diverse number of data, regardless of the type of data, onto a beam of light that may be attenuated to propagate at different wavelengths. The different types of data may comprise facsimile sources, landline voice sources, voice over Internet Protocol (VOIP) sources, video sources, web browser sources, mobile device sources including voice application sources, short messaging service (SMS) application sources, multimedia messaging service (MMS) application sources, mobile phone third party application (app) sources, and/or wearable device sources. When a large and diverse number of data sources, such as the ones mentioned in the previous sentence, are multiplexed together over light beams transmitted on an optical fiber, it may be referred to as a dense wave division multiplexing (DWDM).

The use of an optical communications module link extender (OCML) circuit as described herein allows cable companies to offer these services regardless of the open systems interconnection (OSI) model network layer (layer 3) protocols or media access control (MAC) (layer 2) protocols that are used by the different sources to transmit data. For example, e-mail, video, and/or multimedia data such as web based content data, may generate IP (layer 3) data packets that are transmitted in asynchronous transfer mode (ATM) (layer 2) frames. Voice (telephony) data may be transmitted over synchronous optical networking (SONET)/synchronous digital hierarchy (SDH). Therefore regardless of which layer is generating data (e.g., IP, ATM, and/or SONET/SDH) a DWDM passive circuit provides unique bandwidth management by treating all data the same. This unifying capability allows cable companies with the flexibility to meet customer demands over a self-contained network.

A platform that is able to unify and interface with these technologies and position the cable company with the ability to integrate current and next-generation technologies is critical for a cable company's success.

Cable companies faced with the multifaceted challenge of increased service needs, optical fiber exhaust, and layered bandwidth management, need options to provide economical and scalable technologies. One way to alleviate optical fiber exhaust is to lay more optical fiber, and, for those networks where the costs of laying new optical fiber is minimal, the best solution may be to lay more optical fiber. This solution may work in more rural, where there may be no considerable population growth. However, in urban or suburban areas laying new optical fiber may be costly. Even if it was not costly, the mere fact that more cable is being laid does not necessarily enable a cable company to provide new services or utilize the bandwidth management capabilities of the unifying optical transmission mechanism such as DWDM.

Another solution may be to increase the bit rate using time division multiplexing (TDM). TDM increases the capacity of an optical fiber by slicing time into smaller time intervals so that more bits of data can be transmitted per second. Traditionally, this solution has been the method of choice, and cable companies have continuously upgraded their networks using different types of digital signaling technologies to multiplex data over SONET/SDH networks. For example, Digital Signal (DS) DS-1, DS-2, DS-3, DS-4, and DS-5, commonly referred to as T1, T2, T3, T4, or T5 lines, are different carrier signals, that are transmitted over SONET/SDH networks that can carry any of the sources of data mentioned above, whose data rates increase with the number assigned to the DS. That is DS-1 was the earliest carrier signal used to transmit data over SONET/SDH networks, and has the lowest data rate and DS-5 is the most recent carrier signal use to transmit data over SONET/SDH networks with the highest data rate. Cable company networks, especially SONET/SDH networks have evolved over time to increase the number of bits of data that can be transmitted per second by using carrier signals with higher data rates. However, when cable companies use this approach, they must purchase capacity based on what the SONET/SDH standard dictates will be the next increase in capacity. For example, cable companies can purchase a capacity of 10 Gbps for TDM, but should the capacity not be enough the cable companies will have to purchase a capacity of 40 Gbps for TDM, because there are no intermediate amounts of capacity for purchase. In such a situation, a cable company may purchase a significant amount of capacity that they may not use, and that could potentially cost them more than they are willing to pay to meet the needs of their customers. Furthermore, with TDM based SONET/SDH networks, the time intervals can only be reduced to a certain size beyond which it is no longer possible to increase the capacity of a SONET/SDH network. For instance, increasing the capacity of SONET/SDH networks to 40 Gbps using TDM technology may prove to be extremely difficult to achieve in the future.

BRIEF DESCRIPTION OF THE FIGURES

FIG. 4 shows an access link loss budget of a Dense Wave Division Multiplexing (DWDM) passive circuit, in accordance with the disclosure.

FIG. 7 depicts different passive optical network (PON) transceiver parameters associated with downstream transmitting circuits and upstream transmitting circuits, in accordance with the disclosure.

DETAILED DESCRIPTION

Figure 1:
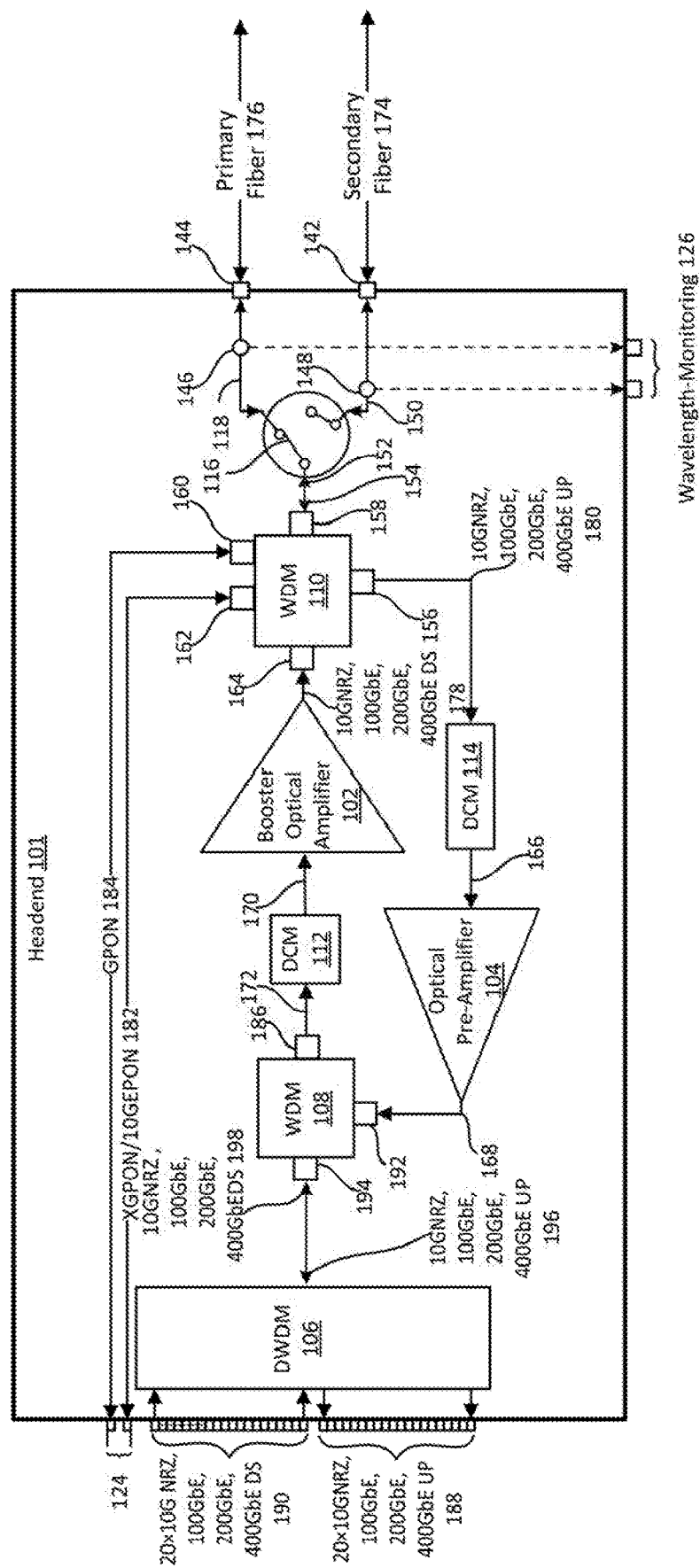
FIG. 1 depicts a schematic of an Optical Communications Module Link (OCML) Extender, in accordance with the disclosure.

DWDM passive circuits can be used in combination with one or more other optical communications devices to develop novel signal extension circuits that increase the range with which light beams are propagated and the number of signals that can be combined and transmitted from a cable company to customers. The circuits disclosed herein may be referred to Optical Communications Module Link (OCML) Extender. The OCML passive circuits, disclosed herein, increase the capacity of embedded optical fibers by first assigning incoming optical signals to specific frequencies (wavelength, denoted by lambda) within a designated frequency band and then multiplexing the resulting signals out onto one optical fiber. Because incoming signals are never terminated in the optical layer, the interface can be bit-rate and format independent, thereby allowing the service provider to integrate DWDM passive circuits easily into a passive circuit, such as an OCML passive circuit, with existing equipment in the network while gaining access to the untapped capacity in the embedded optical fibers.

A DWDM passive circuit combines multiple optical signals for transportation over a single optical fiber, thereby increasing the capacity of a service provider's network. Each signal carried can be at a different rate (e.g., optical carrier transmission rate OC-3, OC-12, OC-24 etc.) and in a different format (e.g., SONET, ATM, data, etc.). For example, the networks disclosed herein comprise DWDM passive circuits that transmit and receive a mix of SONET signals with different data rates (e.g., OC-48 signals with a data rate of 2.5 Gbps or OC-192 signals with a data rate of 10 Gbps) can achieve data rates (capacities) of over 40 Gbps. The OCML passive circuits disclosed herein can achieve the aforementioned while maintaining the same degree of system performance, reliability, and robustness as current transport systems—or even surpassing it. The OCML passive circuits may be a smart platform, integrated into a network headend or a network cabinet, and may connect a metro area network that provides internet and telecommunications services to end users (e.g., enterprise multi dwelling unit (MDU) customers, residential customers, commercial customers, and industrial customers) via one or more optical fiber links. The OCML passive circuits may also be referred to as OCML headends. The OCML headend enables a plurality of signals to be cost effectively transported over long optical fiber distances between 5 km and 60 km without having to put any optical amplifiers or other active devices, like an optical switch, (which is normally used to provide path redundancy in case of an optical fiber cut) in the field.

The OCML headend is intended to transport a mix of multi-wavelength coherent 10G non-return-to-zero (NRZ), coherent 100 GbE, 200 GbE, and/or 400 GbE, GPON, and/or XGPON/10GEPON signals over the same optical fiber without having active devices such as optical amplifiers in the field. The OCML headend is also configured to support the same wavelengths over a secondary optical fiber via an optical switch in case the primary optical fiber experiences a cut. In one embodiment, an OCML headend, systems, and methods include various subsystems integrated into a single module including an integrated DWDM passive circuit that combines and separates bi-directional wavelengths in optical fibers propagating in a conventional wavelength window, such as the c band dispersive region of the optical fibers. The OCML headend may comprise a three port or four port wave division multiplexer (WDM) or circulator to combine and separate 10GNRZ, coherent 100 GbE, 200 GbE, and/or 400 GbE downstream and upstream signals of different wavelengths. The OCML headend may also comprise a four port WDM to combine GPON, EPON, and 10GNRZ, coherent 100 GbE, 200 GbE, and/or 400 GbE optical signals of different wavelengths, whereas the DWDM combines SONSET/SDH and/or ATM signals. The OCML headend may also comprise a five port WDM to combine and separate upstream and downstream signals comprising GPON, XGPON/10GEPON, and 10GNRZ, coherent 100 GbE, 200 GbE, and/or 400 GbE optical data signals of different wavelengths. Although the term multiplexer is used to describe the WDMs as disclosed herein, the WDMs do not exclusively multiplex (combine) one or more downstream signals into a single downstream signal, but they also demultiplex (separate) a single upstream signal into one or more upstream signals.

The WDM may comprise one or more thin film filters (TFFs) or array waveguide gratings (AWGs) that combine one or more downstream signals into a single downstream signal and separate a single upstream signal into one or more upstream signals. The WDM may comprise one or more wavelength-converting transponders, wherein each of the wavelength-converting transponders receives an optical data signal (e.g., a 10G NRZ, coherent 100 GbE, 200 GbE, and/or 400 GbE optical data signal) from a client-layer optical network such as, for example, a Synchronous optical network (SONET)/synchronous digital hierarchy (SDH), Internet protocol (IP), and/or asynchronous transfer mode (ATM) optical network. Each of the wavelength-converting transponders converts the optical data signal into an electrical data signal, and then converts the electrical data signal into a second optical data signal to be emitted by a laser, wherein the second optical data signal is carried by one or more packets of light oscillating with wavelengths in the c band. More specifically, each of the wavelength-converting transponders may include a laser that emits the second optical data signal. That is each of the second optical data signals may be emitted by a laser with a unique wavelength. In some embodiments, the wavelength-converting transponders may comprise two adjacent transceivers. That is, each of the wavelength-converting transponders may comprise a first transceiver that converts the optical data signal into an electrical data signal, and may comprise second transceiver that converts the electrical data signal into the second optical data signal. The second transceiver converts the electrical signal to the second optical data signal such that the second optical data signal is transmitted with the correct wavelength.

A first wavelength-converting transponder, of the two wavelength-converting transponders, may emit a second optical data signal with a 1550 nm wavelength. A second wavelength-converting transponder, of the two wavelength-converting transponders, may emit a second optical data signal with a 1533 nm wavelength. For example, there may be two wavelength-converting transponders, and each of the two wavelength-converting transponders may include a laser emitting a second optical data signal with a unique wavelength. Thus, each of the wavelength-converting transponders converts the electrical data signal into an optical data signal, and each of the wavelength-converting transponders emits, or transmits, the optical data signal, with a wavelength in the c band, to a TFF or AWG. The TFF or AWG, may combine or multiplex the optical data signals, emitted by each of the wavelength-converting transponders, into a multi-wavelength optical data signal wherein each of the wavelengths in the multi-wavelength optical data signal coincide with the wavelengths associated with each of the optical data signals. Returning to the example above of the two wavelength-converting transponders, the first and second wavelength-converting transponders, may each receive an optical signal from a SONET/SDH client layer network. The first and second wavelength-converting transponders may each respectively convert the optical signal they received from the SONET/SDH client layer network into an electrical data signal. The first wavelength-converting transponder may convert the electrical data signal that it receives into a second optical data signal with a first wavelength. The first wavelength-converting transponder may emit, via a first laser, the second optical data signal, with the first wavelength, to the TFF or AWG. The second wavelength-converting transponder may convert the electrical data signal that it receives into a second optical data signal with a second wavelength. The second wavelength-converting transponder may emit, via a second laser, the second optical signal, with the second wavelength, to the TFF or AWG. The TFF or AWG may combine or multiplex the second optical data signal, with the first wavelength, and the second optical data signal, with the second wavelength, onto a multi-wavelength optical signal. The TFF or AWG may be referred to as an optical multiplexer.

The DWDM passive circuits disclosed herein may include wavelength-converting transponders and corresponding WDMs that combine or multiplex optical data signals similar to the WDMs described above. The DWDM passive circuits may also include wavelength-converting transponders and corresponding WDMs that separate optical data signals. In some embodiments, the same WDM may combine optical data signals and separate optical data signals. That is, the WDM may separate one or more optical data signals from a multi-wavelength optical data signal, or demultiplex the one or more optical data signals from the multi-wavelength optical data signal. The WDM may separate the one or more optical data signals from a multi-wavelength optical data signal using a process that is the exact opposite of the process used to combine one or more optical data signals into a multi-wavelength signal. The WDM may separate one or more optical data signals from a multi-wavelength optical data signal that may correspond to an upstream signal received from a remote DWDM passive circuit.

The WDM may receive the multi-wavelength optical data signal and one or more TTF or AWGs may separate the one or more optical data signals, from the multi-wavelength optical data signal, using filters or waveguide gratings with properties that separate optical data signals, with different wavelengths, from a multi-wavelength optical data signal. After the WDM has separated the optical data signals, with different wavelengths, from the multi-wavelength optical data signal, the WDM may convert each of the separated optical data signals to a corresponding electrical data signal. The WDM may then convert the corresponding electrical data signal to a second optical data signal, wherein the second optical data signal may be an optical data signal with signal characteristics commensurate for use with a SONET/SDH, IP, or ATM client-layer optical network.

As mentioned above, the WDM may also be a circulator, or function as a circulator. The circulator in the WDM may be an optical circulator comprised of a fiber-optic component that can be used to separate upstream signals and downstream signals. The optical circulator may be a three-port or four-port device in which an optical data signal entering one port will exit the next port. The optical circulator may be in the shape of a square, with a first port on the left side of the square, a second port on the right side of the square, and a third port on the bottom side of the square. A first optical data signal (e.g., a downstream signal) entering the first port may exit the second port. A second optical data signal (e.g., an upstream signal) entering the third port may exit the first port.

An upstream signal, as referred to herein, may be a flow one or more packets of light, oscillating with a predetermined wavelength, along one or more optical fibers in a direction toward the OCML headend from a field hub or outside plant. A downstream signal, as referred to herein, may be a flow of one or more packets of light, oscillating with a predetermined wavelength, along one or more optical fibers in a direction away from the OCML headend and toward the field hub or outside plant. The one or more packets of light may correspond to one or more bits of data. Both downstream and upstream signals propagate along the same optical fiber, but in opposite directions. In some embodiments, the downstream and upstream signals may propagate along the same fiber simultaneously using one or more wavelength multiplexing techniques as explained below. This bidirectional simultaneous communication between the OCML headend and the outside plant may be referred to as a full duplex connection. Field hub and outside plant may be used interchangeably.

In some embodiments, the OCML headend may also comprise a booster optical amplifier, that amplifies downstream signals based on the length of a fiber between the OCML headend and the outside plant. The booster optical amplifier may be an Erbium Doped Fiber Amplifier (EDFA). The core of the EDFA may be an erbium-doped optical fiber, which may be a single-mode fiber. The fiber may be pumped, by a laser, with one or more packets of light in a forward or backward direction (co-directional and counter-directional pumping). The one or more packets of light pumped into the fiber, may have a wavelength of 980 nm. In some embodiments the wavelength may be 1480 nm. As the one or more packets of light are pumped into the fiber erbium ions ($Er^{3+}$) are excited and transition into a state where the ions can amplify the one or more packets of light with a wavelength within the 1.55 micrometers range. The EDFA may also comprise two or more optical isolators. The isolators may provent light pumped into the fiber that leaves the EDFA from returning to the EDFA or from damaging any other electrical components connected to the EDFA. In some embodiments, the EDFA may comprise fiber couplers and photodetectors to monitor optical power levels. In other embodiments, the EDFA may further comprise pump laser diodes with control electronics and gain flattening filters. The EDFA may have the effect of amplifying each of the one or more optical data signals, while they are combined in a multi-wavelength optical data signal, without introducing any effects of gain narrowing. In particular, the EDFA may simultaneously amplify the one or more optical data signals, each of which have a different wavelength, within a gain region of the EDFA. A gain of the booster optical amplifier may be based at least in part on the length of the fiber. In some embodiments, the length of the fiber may be between 5 and 60 kilometers.

The OCML headend may also comprise an optical pre-amplifier that may amplify upstream signals. The optical pre-amplifier may also be an EDFA. The optical pre-amplifier may amplify upstream signals based on the length of the fiber between the outside plant and the OCML headend to account for any loses in the strength of the upstream signals propagating along the fiber. The gain of the optical pre-amplifier may be based at least in part on a required signal strength of the upstream signals at an input to the DWDM passive circuit, in order for the DWDM to demultiplex the upstream signals. The optical pre-amplifier may have the effect of amplifying a multi-wavelength optical data signal, so that the one or more optical data signals in the multi-wavelength optical data signal, each of which have different respective wavelengths, have a certain received power level at a DWDM passive circuit upstream input port.

The optical signal to noise ratio (OSNR) of the EDFA may be based at least in part on an input power to the EDFA, a noise figure. In some embodiments the OSNR of the EDFA may be determined by the expression OSNR=58 dB−NF−$P_{in}$, where NF is the noise floor, $P_{in}$ is the input power to the EDFA. 58 dB is constant that is based on Planck's constant, the speed of light, the bandwidth of the EDFA, and the wavelength of the one or more packets of light. In some embodiments, the OSNR of the EDFAs disclosed herein may be as high as 40 dB, for one or more packets of light that are transmitted downstream from OCML headend. The OSNR of the transceivers disclosed herein may be as low as 23 dB, and there may be a plurality of bit error rate (BER) values associated with this 23 dB OSNR. The BER may be determined based at least in part on the energy detected per bit, noise power spectral density, and a complementary error function. More specifically the BER may be $$\left(\frac{dv}{d\omega}\right)$$

wherein $E_b$ is the energy detected per bit, No is the noise power spectral density, and erfc is the complementary error function. For instance, the transceivers disclosed herein may be able to achieve a BER of $10^{-12}$ when the common logarithm ratio of received power to 1 milliwatt (mW) is −23 dBm. For example, a transceiver in the OCML headend may receive an upstream flow or one or more packets of light, from a transceiver in the field hub or outside plant, that has a common logarithm ratio of received power per mW of −23 dBm. The BER may be greater for common logarithm ratios of received power per mW, meaning that the BER may decrease with the higher common logarithm ratios of received power per mW. The transceivers may be configured to have greater OSNRs, and therefore lower BERs for the same value of a common logarithm ratio of received power per mW. For example, a first transceiver configured to have an OSNR of 24 dB with a common logarithm ratio of received power per mW of −28 dBm may have an approximate BER of $10^{-5}$ and a second transceiver configured to have an OSNR of 26 dB with a common logarithm ratio of received power per mW of −28 dBm may have an approximate BER of 10'. Thus, transceivers configured to have a higher OSNR results in the transceiver having a lower BER for the same common logarithm ratio of received power per mW.

The OCML headend may also comprise an optical switch that may connect a WDM to a primary optical fiber connecting the OCML passive circuit to the outside plant. The optical switch may also connect the WDM to a secondary optical fiber connecting the OCML passive circuit to the outside plant. The optical switch may be in a first position that connects the WDM to the primary optical fiber, and may be in a second position that connects the WDM to the secondary optical fiber. The optical switch may be in the second position when the primary optical fiber is disconnected or unresponsive.

Because the OCML headend, field hub or outside plant, and fiber connecting the OCML headend and field hub or outside plant mainly comprise passive optical components, in comparison to other optical ring networks that primarily have active components, one or more devices may be needed to control for dispersion of light as it goes through different optical components. In particular, as packets of light traverse the different optical components in the OCML headend (e.g., WDMs and/or optical amplifiers including booster amplifiers or pre-optical amplifiers), an optical data signal being carried by the packets of light may begin to experience temporal broadening which is a form of optical data signal distortion. Because the OCML systems disclosed herein transmit high data rate optical data signals, about 10 Gbps, there may be some strong dispersive temporal broadening effects introduced by one or more of the optical components in the OCML headend. The optical data signals disclosed herein may carry digital symbols, which are a series of binary digits (1 or 0), and each binary digit may be represented by a pulse of light (one or more packets of light) of a certain amplitude, that lasts a certain period. For example, an optical data signal may be carrying a plurality of digital symbols, wherein a pulse of light that has a certain amplitude and certain pulse width (certain period) represents each binary digit in a digital symbol of the plurality of digital symbols. The pulse widths of each of the pulses of light may begin to broaden as each of the pulses of light traverses different optical components. As a result, the symbol may begin to broaden. Consequently, as each of the symbols begins to broaden in time, and may become indistinguishable from an adjacent symbol. This may be referred to as intersymbol interference (ISI), and can make it difficult for a fiber-optic sensor or photodetector receiving the optical data signal to distinguish adjacent symbols from one another. In order to compensate for this phenomenon, a dispersion compensation module (DCM) may be inserted between one or more optical components in the OCML headend. For example, a DCM may be receive an optical data signal output from a WDM to compensate for any potential ISI that may be introduced as a result of different optical data signals, carried over pulses of light, that have been combined, multiplexed, or circulated in the WDM. The DCM can also compensate for dispersion characteristics of the fiber between the OCML headend and the field hub or outside plant. In particular, the fiber may comprise certain optical elements or material impurities that can be compensated for in the DCM, wherein the DCM comprises long pieces of dispersion-shifted fibers or chirped fiber Bragg gratings. The dispersion-shifted fibers or chirped fiber Bragg gratings can reduce ISI that is introduced by the fiber. In some embodiments, the OCML headend may comprise one or more DCMs to compensate for ISI that may be introduced by one or more optical components in the OCML headend or fiber that is either upstream or downstream from the one or more DCMs. For example, in one embodiment, a first DCM may be positioned downstream from a first WDM and a second DCM may be positioned upstream from a second WDM. This embodiment is illustrated in FIG. 1, and further explained below.

It should be noted that the DCMs may cause negative dispersion for shorter lengths of fiber (e.g., lengths of fiber less than 5 kilometers). Negative dispersion may occur when a flow of one or more packets of light, forming a wave, propagate along a distance of the fiber with a negative rate of change. The wave propagates along the fiber, and the wave has an electric field associated with it that is normal to the direction of propagation of the wave, and a magnetic field associated with it that is normal to the electric field and the direction of propagation of the wave. The wave propagates along the fiber with an angular frequency, $\omega$, which may be a function of a propagation constant $\beta$. The electric and magnetic fields may both oscillate in accordance with sinusoidal function $e^{i(\beta z - \omega t)}$, wherein z is a distance that the wave has traveled in the fiber, and t is the time elapsed after the wave has been transmitted by the DCM. That is the electric and magnetic field may oscillate in accordance with a sinusoidal function equal to $\cos(\beta z - \omega t) + i\sin(\beta z - \omega t)$, wherein the oscillation of the wave is based at least in part on the propagation constant, and angular frequency, and the amount of time that has elapsed since the wave has been transmitted by the DCM. The angular frequency may be reciprocal of the amount of time that the electric and magnetic fields oscillate an entire cycle or period. The propagation constant may be a complex quantity, wherein the real part of the propagation constant is a measure of a change in the attenuation of the wave as it propagates along the fiber. The real part of the propagation constant may be referred to as an attenuation constant. The imaginary part of the propagation constant is a measure of a change in the phase of the wave as it propagates along the fiber. Because the angular frequency may be based at least in part on the propagation constant, the angular frequency of the wave may change as the attenuation and phase of the wave change. Accordingly, the velocity of the wave may change as it propagates along the fiber and may begin to experience dispersion. The velocity of the wave may be the rate at which the angular frequency changes as the propagation constant changes while the wave propagates along the fiber. That is the velocity of the wave may be expressed as $$v = \frac{d\omega}{d\beta}.$$

The wavelength of the wave may be expressed as $$\lambda = 2\pi \frac{c}{\omega},$$

wherein c is the speed of light. The dispersion of the wave may be based at least in part on the speed of light, wavelength of the wave, velocity of the wave, and the rate of change of the velocity of the wave with respect to the angular frequency. The dispersion of the wave may be expressed as $$D = \frac{2\pi c}{v^2 \lambda^2} \frac{dv}{d\omega}.$$

D is a dispersion parameter of the wave and is based on the speed of light (c), the velocity of the wave (v), the wavelength of the wave ($\lambda$), and the rate of change or first derivative of the velocity of the wave with respect to the angular frequency of the wave $$\left(\frac{dv}{d\omega}\right).$$

The dispersion parameter indicates whether the wave experiences positive dispersion (temporal broadening) or negative dispersion (temporal contraction) as the wave propagates along the fiber. Negative dispersion may occur when the rate of change or derivative of the velocity of the wave, with respect to the angular frequency is negative. When $$\frac{1}{2}\text{erfc}\left(\sqrt{\frac{E_b}{N_0}}\right),$$

is negative, the wave is said to be experiencing negative dispersion. Thus when the rate of change of the velocity of the wave with respect to the angular frequency is negative, the wave may experience temporal contraction. Accordingly, transceivers in the transponders of the DWDM of the field hub or outside plant must be capable of detecting waves subject to negative dispersion. Negative dispersion is the opposite of positive dispersion in that ISI may not occur when a wave is detected at the transceivers in the transponders of the DWDM of the field hub or outside plant. However, temporal contraction of the wave may make it difficult for a fiber-optic sensor or photodetector to detect an optical data signal carrying digital symbols, because the digital symbols in the optical data signal may begin to overlap with one another. This may happen because each of the digital symbols are a series of binary digits, and the binary digits are represented by a pulse of light (one or more packets of light in the wave), and as the wave begins to experience negative dispersion, each of the binary digits may begin to overlap with one another. The transceivers disclosed herein are equipped with fiber-optic sensors or photodetectors that are capable of correctly detecting the one or more packets of light in the wave, when the wave is subject to positive and/or negative dispersion. The DCMs disclosed herein may transmit a signal a distance of 30 kilometers.

The OCML headend may also comprise a non-optical switch that switches due to a loss of light or on demand.

The OCML headend may also comprise wavelength-monitoring ports that connect to the primary and secondary optical fibers to monitor the wavelength of upstream signals comprising 10G NRZ, coherent 100 GbE, 200 GbE, and/or 400 GbE, and/or XGPON/10GEPON signals and/or to monitor the wavelength of downstream signals comprising 10G NRZ, coherent 100 GbE, 200 GbE, and/or 400 GbE, GPON, and/or XGPON/10GEPON signals.

Certain embodiments of the disclosure are directed to an OCML, systems, and methods. Embodiments of the disclosure now will be described more fully hereinafter with reference to the accompanying drawings, in which certain embodiments are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It should be noted that the OCML headend may also be referred to as a terminal or Master Terminal Center (MTC). In some embodiments, the OCML headend may be collocated within the MTC. In other embodiments, the OCML headend may be located at a secondary transport center (STC) that may be connected to the MTC via a network. In some embodiments, an outside plant may also be referred to as a field hub or remote physical device (RPD). In some embodiments, the outside plant may be collocated with the RPD. In other embodiments, the outside plant and RPD may not be collocated and connected via a 10 Gigabit transceiver. The outside plant may comprise one or more passive optical network devices.

Figure 2:
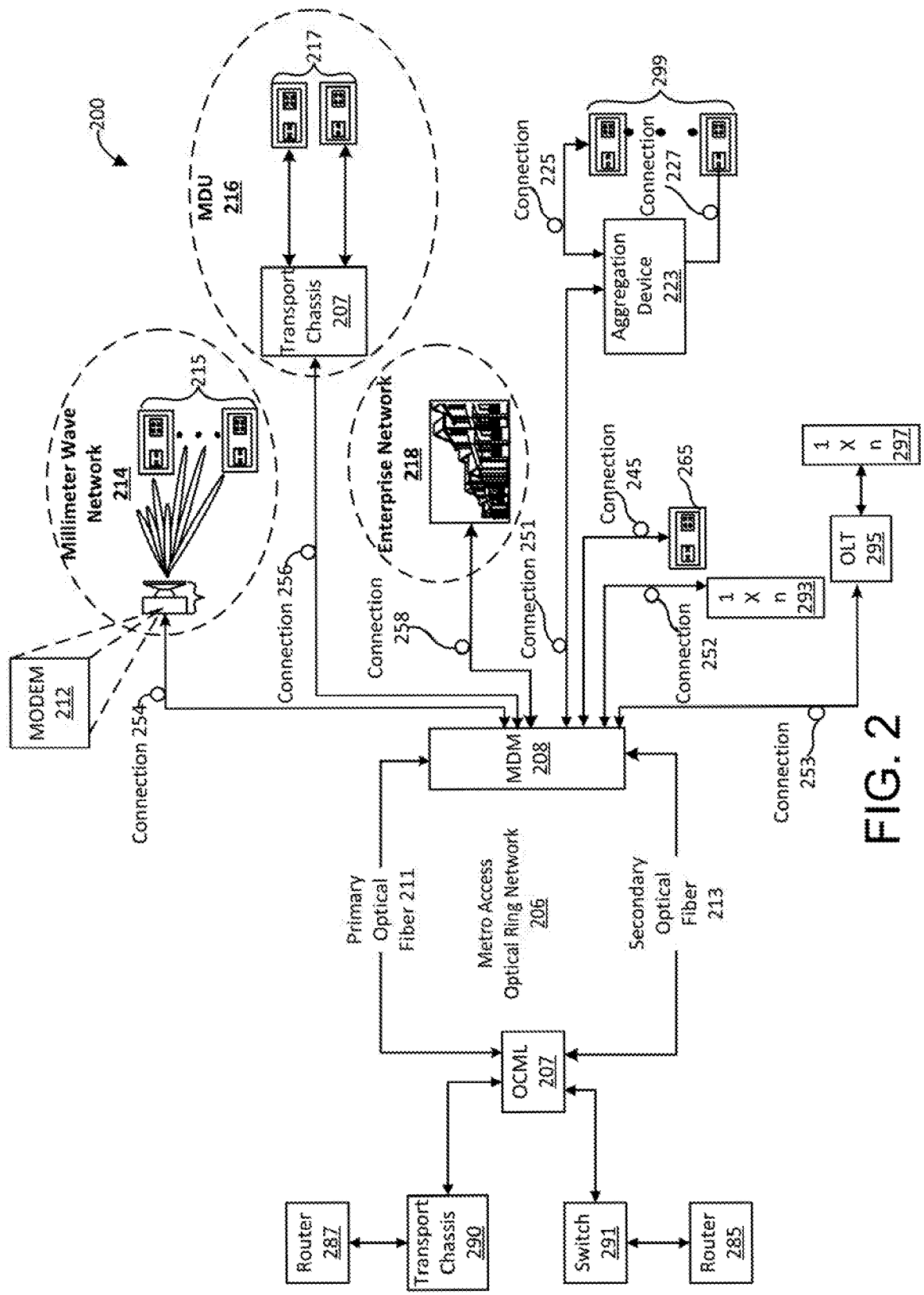
FIG. 2 depicts an network architecture, in accordance with the disclosure.

FIG. 1 shows a schematic of an OCML headend according to at least one embodiment of the disclosure. As shown in FIG. 1, headend 101 is a smart integrated OCML headend, which is a circuit, comprising one or more EDFAs (e.g., Optical amplifiers 102 and 104), a DWDM (e.g., DWDM 106), one or more WDMs (e.g., WDM 108 and 110), one or more DCMs (e.g., DCM 112 and 114), and an optical switch 116 to feed a primary optical fiber (e.g., Primary Fiber 176) or secondary (backup) optical fiber (e.g., Secondary Fiber 174). The disclosure provides a method of transporting multiple 10G NRZ, coherent 100 GbE, 200 GbE, and/or 400 GbE and GPON/XGPON/10GEPON signals on the same optical fiber over extended links of up to 60 kms without a cable company having to put optical amplifiers between the cable's MTC facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 208 in FIG. 2).

In one aspect, headend 101 may comprise twenty 10GNRZ, coherent 100 GbE, 200 GbE, and/or 400 GbE downstream (DS) transponders (e.g., 20×10G NRZ, coherent 100 GbE, 200 GbE, and/or 400 GbE DS 190) and twenty 10GNRZ, coherent 100 GbE, 200 GbE, and/or 400 GbE upstream (UP) transponders (e.g., 20×10NRZ, coherent 100 GbE, 200 GbE, and/or 400 GbE UP 188). 20×10GNRZ, 100 GbE, 200 GbE, and/or 400 GbE 190 may transmit downstream data over twenty 10GNRZ, coherent 100 GbE, 200 GbE, and/or 400 GbE wavelengths. 20×10GNRZ, coherent 100 GbE, 200 GbE, and/or 400 GbE UP 188 may receive upstream data over 10GNRZ, coherent 100 GbE, 200 GbE, and/or 400 GbE wavelengths. Headend 101 may comprise two PON 124 connectors, one of which may be a GPON connector (e.g., GPON 184) and one of which may be an XGPON/10GEPON connector (e.g., XGPON/10GEPON 182). Headend 101 may also comprise two wavelength-monitoring ports (e.g., wavelength-monitoring ports 126), a primary optical fiber (e.g., primary optical fiber 176) and a secondary optical fiber (e.g., secondary optical fiber 174) that transmit and receive a plurality of multi-wavelength coherent 100 GbE, 200 GbE, and/or 400 GbE and GPON/XGPON/10GEPON optical signals. Primary optical fiber 176 and secondary optical fiber 174 may transmit a first plurality of multi-wavelength 10GNRZ, coherent 100 GbE, 200 GbE, and/or 400 GbE, GPON, and/or XGPON/10GEPON optical signals from headend 101 to a outside plant (not illustrated in FIG. 1), and may receive a second plurality of multi-wavelength 10GNRZ, coherent 100 GbE, 200 GbE, and/or 400 GbE, GPON, and/or XGPON/10GEPON optical signals from the outside plant.

In some embodiments, 20×10G NRZ, coherent 100 GbE, 200 GbE, and/or 400 GbE DS 190 and 20×10G NRZ, coherent 100 GbE, 200 GbE, and/or 400 GbE UP 188 may comprise connectors belonging to the laser shock hardening (LSH) family of connectors designed to transmit and receive optical data signals between DWDM 106, and one or more cable company servers (not shown). In other embodiments, 20×10G NRZ, coherent 100 GbE, 200 GbE, and/or 400 GbE DS 190 and 20×10G NRZ, coherent 100 GbE, 200 GbE, and/or 400 GbE UP 188 may also comprise E2000 connectors, and may utilize a 1.25 millimeter (mm) ferrule. 20×10G NRZ, coherent 100 GbE, 200 GbE, and/or 400 GbE DS 190 and 20×10G NRZ, coherent 100 GbE, 200 GbE, and/or 400 GbE UP 188 may be installed with a snap-in and push-pull latching mechanism, and may include a spring-loaded shutter which protects the ferrule from dust and scratches. The shutter closes automatically once the connector is disengaged, locking out impurities, which could later result in network failure, and locking in possibly damaging lasers. 20×10G NRZ, coherent 100 GbE, 200 GbE, and/or 400 GbE DS 190 and 20×10G NRZ, coherent 100 GbE, 200 GbE, and/or 400 GbE UP 188 may operate in a single mode or a multimode.

In single mode, 20×10G NRZ, coherent 100 GbE, 200 GbE, and/or 400 GbE DS 190 and 20×10G NRZ, coherent 100 GbE, 200 GbE, and/or 400 GbE UP 188 only one mode of light may be allowed to propagate. Because of this, the number of light reflections created as the light passes through the core of single mode 20×10G NRZ, coherent 100 GbE, 200 GbE, and/or 400 GbE DS 190 and 20×10G NRZ, coherent 100 GbE, 200 GbE, and/or 400 GbE UP 188 decreases, thereby lowering attenuation and creating the ability for the optical data signal to travel further. Single mode may be for use in long distance, higher bandwidth connections between one or more cable company servers and DWDM 106.

In multimode, 20×10G NRZ, coherent 100 GbE, 200 GbE, and/or 400 GbE DS 190 and 20×10G NRZ, coherent 100 GbE, 200 GbE, and/or 400 GbE UP 188, may have a large diameter core that allows multiple modes of light to propagate. Because of this, the number of light reflections created as the light passes through the core increase, creating the ability for more data to pass through at a given time. Multimode 20×10G NRZ, coherent 100 GbE, 200 GbE, and/or 400 GbE DS 190 and 20×10G NRZ, coherent 100 GbE, 200 GbE, and/or 400 GbE UP 188, may generate high dispersion and a attenuation rate, which may reduce the quality of an optical data signal transmitted over longer distances. Therefore multimode may be used to transmit optical data signals over shorter distances.

In one aspect, headend 101 can transmit and receive up to twenty bi-directional 20×10G NRZ, coherent 100 GbE, 200 GbE, and/or 400 GbE optical data signals, but the actual number of optical data signals may depend on operational needs. That is, headend 101 can transport more or less than twenty 20×10G NRZ, coherent 100 GbE, 200 GbE, and/or 400 GbE downstream optical signals, or more or less than twenty 20×10G NRZ, coherent 100 GbE, 200 GbE, and/or 400 GbE upstream optical signals, based on the needs of customers' networks (e.g., Remote PHY Network 216, Enterprise Network 218, Millimeter Wave Network 214). These customer networks may be connected to headend 101 through an optical ring network (e.g., metro access optical ring network 206).

The operation of headend 101 may be described by way of the processing of downstream optical data signals transmitted from headend 101 to a field hub or outside plant, and the processing of upstream optical data signals received from the field hub or outside plant. Each of the transponders of 20×10G NRZ, coherent 100 GbE, 200 GbE, and/or 400 GbE DS 190 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 190 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 190 may generate twenty corresponding second optical data signals each of which has a unique wavelength.

DWDM 106 may receive the twenty corresponding second optical data signals as an input and output a multi-wavelength downstream optical data signal (e.g., coherent 10G NRZ, coherent 100 GbE, 200 GbE, and/or 400 GbE DS 98) comprising the twenty corresponding second optical data signals onto a fiber. More specifically, DWDM 106 may multiplex the twenty corresponding second optical data signals onto the fiber, wherein the twenty multiplexed corresponding second optical data signals compose the multi-wavelength downstream optical data signal. The multi-wavelength downstream optical data signal may have a wavelength comprising the twenty wavelengths of the twenty corresponding second optical data signals.

The multi-wavelength downstream optical data signal 10G NRZ, coherent 100 GbE, 200 GbE, and/or 400 GbE DS 198, may be input to a WDM (e.g. WDM 108). WDM 108 may be a three port wave division multiplexer (WDM), or a three port circulator, that receives 10G NRZ, coherent 100 GbE, 200 GbE, and/or 400 GbE DS 198 on port 194 and outputs 10G NRZ, coherent 100 GbE, 200 GbE, and/or 400 GbE DS 198 on port 186 as 10G NRZ, coherent 100 GbE, 200 GbE, and/or 400 GbE DS 172. 10G NRZ, coherent 100 GbE, 200 GbE, and/or 400 GbE DS 172 may be substantially the same as 10G NRZ, coherent 100 GbE, 200 GbE, and/or 400 GbE DS 198 because WDM 108 may function as a circulator when 10G NRZ, coherent 100 GbE, 200 GbE, and/or 400 GbE DS 172 is input on port 194.

10G NRZ, coherent 100 GbE, 200 GbE, and/or 400 GbE DS 172 may be input into a DCM (e.g., DCM 112) to compensate for dispersion that 10G NRZ, coherent 100 GbE, 200 GbE, and/or 400 GbE DS 172 may experience after being amplified by an EDFA and multiplexed by a WDM, with other optical data signals, that are downstream from the DCM. The amplified and multiplexed optical data signal may be referred to as an egress optical data signal, as it is the optical data signal that may be transmitted out of headend 101 over a fiber connecting headend 101 to a field hub or outside plant. In some embodiments, DCM 112 may be configured to balance positive and/or negative dispersion that may be introduced to the egress optical data signal by the fiber. In some embodiments, DCM 112 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 112 may be configured to reduce the sensitivity or OSNR level requirement in a photodetector or fiber-optic sensor in the transceiver, which may drastically reduce the cost of the transceivers used in the DWDM located at the field hub or outside plant.

DCM 112 may input 10G NRZ, coherent 100 GbE, 200 GbE, and/or 400 GbE DS 172 and may output 10G NRZ, coherent 100 GbE, 200 GbE, and/or 400 GbE DS 170 to an EDFA (e.g., booster optical amplifier 102). A gain of the booster optical amplifier (e.g., booster optical amplifier 102) may be based at least in part on a distance that a downstream signal has to travel. For example, the gain may be a function of a fiber attenuation coefficient $\alpha$, which is a measure of the intensity of the attenuation of a beam of light as it traverses a length of an optical fiber segment. The unit of measurement of the fiber attenuation coefficient is decibels (dB) per km (dB/km). For instance, the gain of booster optical amplifier 102 may be adjusted based at least in part on the attenuation coefficient and length of fiber that the egress optical data signal will travel. More specifically, the gain of booster optical amplifier 102 may be $G=e^{(2\alpha L)}$, where a is the fiber attenuation coefficient, as explained above, and L is the length of the fiber (e.g., the length of primary fiber 176 and/or the length of secondary fiber 174). 10G NRZ, coherent 100 GbE, 200 GbE, and/or 400 GbE DS 170 may be amplified by booster optical amplifier 102, and booster optical amplifier 102 may output 10G NRZ, coherent 100 GbE, 200 GbE, and/or 400 GbE DS 178 to port 164 of WDM 110.

WDM 110 may be a WDM that may multiplex 10G NRZ, coherent 100 GbE, 200 GbE, and/or 400 GbE DS 178 with one or more PON signals (e.g., XGPON/10GEPON 182 and GPON 184). 10G NRZ, coherent 100 GbE, 200 GbE, and/or 400 GbE DS 178 may be a multi-wavelength optical data signal, wherein the wavelengths comprise the same wavelengths as 10G NRZ, coherent 100 GbE, 200 GbE, and/or 400 GbE DS 198. In some embodiments, the wavelengths of the multi-wavelength optical data signal 10G NRZ, coherent 100 GbE, 200 GbE, and/or 400 GbE DS 178 may be within the conventional c band of wavelengths, which may include wavelengths within the 1520 nm-1565 nm range. XGPON/10GEPON 182 may be a fiber carrying an XGPON/10GEPON optical data signal with a wavelength within the 1571 nm-1582 nm range. GPON 184 may be a fiber carrying a GPON optical data signal with a wavelength of 1490 nm. The XGPON/10GEPON optical signal may be input to WDM 110 on port 162 and the GPON signal may be input to WDM 110 on port 160. WDM 110 outputs an egress optical data signal from port 156, which may be a multi-wavelength optical data signal comprising 10G NRZ, coherent 100 GbE, 200 GbE, and/or 400 GbE, signals. WDM 110 may multiplex 10G NRZ, coherent 100 GbE, 200 GbE, and/or 400 GbE DS 178, the XGPON/10GEPON optical data signal, and GPON optical data signal the same way DWDM 106 multiplexes optical data signals. The egress optical data signal (e.g., egress optical data signal 152) may be output on port 158 of WDM 110 and optical switch 116 may switch egress optical data signal 152 out of connector 118 or connector 150. In some embodiments, connector 118 may be a primary connector and connector 150 may be a secondary connector or a backup connector. Wavelength monitoring connector 146 may connect connector 118 to a first port of wavelength-monitoring ports 126, and wavelength monitoring connector 148 may connect connector 150 to a second port of wavelength-monitoring ports 126. Wavelength-monitoring ports 126 may monitor the wavelengths in egress optical data signal 152 via connector 146 or connector 148 depending on the position of switch 116. Egress optical data signal 152 may exit headend 101 either via connector 144 connected to primary fiber 176 or via connector 142 connected to secondary fiber 174 depending on the position of switch 116. Egress optical data signal 152 may be transmitted on primary fiber 176 to a first connector in the field hub or outside plant, or may be transmitted on secondary fiber 174 to a second connector in the field hub or outside plant. The field hub or outside plant may include a MDM with the first connector and the second connector.

The operation of headend 101 may be described by way of the processing of upstream optical data signals received at headend 101 from a field hub or outside plant. For instance, a multi-wavelength ingress optical data signal, comprising one or more of a 10G NRZ, coherent 100 GbE, 200 GbE, and/or 400 GbE optical data signal, XGPON/ 10GEPON optical data signal, and/or GPON optical data signal, may be an upstream optical data signal received on primary fiber 176 or secondary fiber 174 depending on the position of switch 116. Because the multi-wavelength ingress optical data signal is routed to port 158 of WDM 110, and is altered negligibly between connector 144 and port 158 or connector 142 and port 158, depending on the position of switch 116, the multi-wavelength ingress optical data signal may be substantially the same as ingress optical data signal 154. The multi-wavelength ingress optical data signal may traverse connector 118 and switch 116, before entering WDM 110 via port 158 if switch 116 is connected to connector 118. The multi-wavelength ingress optical data signal may traverse connector 150 switch 116, before entering WDM 110 via port 158 if switch 116 is connected to connector 150. WDM 110 may demultiplex one or more 10G NRZ, coherent 100 GbE, 200 GbE, and/or 400 GbE optical data signals, XGPON/10GEPON optical data signals, and/or GPON optical data signals from ingress optical data signal 154. WDM 110 may transmit the one or more XGPON/10GEPON optical data signals along XGPON/ 10GEPON 182 to one of PON connectors 124 via port 162. WDM 110 may transmit the one or more GPON optical data signals along GPON 184 to one of PON connectors 124 via port 160. WDM 110 may transmit the one or more 10G NRZ, coherent 100 GbE, 200 GbE, and/or 400 GbE optical data signals (e.g., 10 GbE UP 180) out of port 156 to DCM 114.

In some embodiments, DCM 114 may be configured to balance positive and/or negative dispersion that may be introduced to a SONET/SDH egress optical data signal that may exit headend 101 from 20×10G NRZ, coherent 100 GbE, 200 GbE, and/or 400 GbE UP 188. The SONET/SDH egress optical data signal may be an upstream signal from a field hub or outside plant destined for a MTC. For example, a customer premise may be connected to the field hub or outside plant and may send one or more packets via a SONET/SDH network to the field hub or outside plant which may in turn transmit the one or more packets using 10G NRZ, coherent 100 GbE, 200 GbE, and/or 400 GbE optical data signals to headend 101. The one or more packets may be destined for a company web server connected to the MTC via a backbone network. Because headend 101 may be collocated in a STC that is connected to the MTC via an optical ring network, wherein the connection between the STC and MTC is an SONET/SDH optical network connection, DCM 114 may be configured to compensate for positive and/or negative dispersion on the SONET/SDH optical network connection. That is DCM 114 may be configured to reduce temporal broadening of the SONET/SDH ingress optical data signal or temporal contraction of the SONET/ SDH ingress optical data signal. DCM 114 may input 10G NRZ, coherent 100 GbE, 200 GbE, and/or 400 GbE UP 180 and may output 10G NRZ, coherent 100 GbE, 200 GbE, and/or 400 GbE UP 166 to an input of EDFA (e.g., optical pre-amplifier 104).

A gain of optical pre-amplifier 104 may be based at least in part on a distance that the SONET/SDH egress optical data signal has to travel. For example, the gain may be a function of a fiber attenuation coefficient α, which is a measure of the intensity of the attenuation of a beam of light as it traverses a length of an optical fiber segment on the SONET/SDH optical network connection. For instance, the gain of optical pre-amplifier 104 may be adjusted based at least in part on the attenuation coefficient and length of fiber that the egress optical data signal will travel. More specifically, the gain of optical pre-amplifier 104 may be $G=e^{(2\alpha L)}$, where a is the fiber attenuation coefficient, as explained above, and L is the length of the fiber (e.g., the length of the fiber of the SONET/SDH optical network connection). 10G NRZ, coherent 100 GbE, 200 GbE, and/or 400 GbE UP 166 may be amplified by optical pre-amplifier 104, and optical pre-amplifier 104 may output 10G NRZ, coherent 100 GbE, 200 GbE, and/or 400 GbE UP 168 to WDM 108.

The wavelength of 10G NRZ, coherent 100 GbE, 200 GbE, and/or 400 GbE UP 168 may be within the conventional c band of wavelengths, which may include wavelengths within the 1520 nm-1565 nm range. The one or more XGPON/10GEPON optical data signals may have a wavelength within the 1571 nm-1582 nm range, and the one or more GPON optical data signals may have a wavelength of 1490 nm.

WDM 108 may receive 10G NRZ, coherent 100 GbE, 200 GbE, and/or 400 GbE UP 168 on port 192, and may output 10G NRZ, coherent 100 GbE, 200 GbE, and/or 400 GbE UP 168 on port 194 as a multi-wavelength upstream optical data signal (e.g., 10G NRZ, coherent 100 GbE, 200 GbE, and/or 400 GbE UP 196). 10G NRZ, coherent 100 GbE, 200 GbE, and/or 400 GbE UP 196 is substantially the same 10G NRZ, coherent 100 GbE, 200 GbE, and/or 400 GbE UP 168 because WDM 108 may function as a circulator when 10G NRZ, coherent 100 GbE, 200 GbE, and/or 400 GbE UP 168 is input to port 192. 10G NRZ, coherent 100 GbE, 200 GbE, and/or 400 GbE UP 196 may be received by DWDM 106, and DWDM may demultiplex one or more 10G NRZ, coherent 100 GbE, 200 GbE, and/or 400 GbE optical data signals from 10G NRZ, coherent 100 GbE, 200 GbE, and/or 400 GbE UP 196. Because 10G NRZ, coherent 100 GbE, 200 GbE, and/or 400 GbE UP 196 is a dispersion compensated amplified version of the multi-wavelength ingress optical data signal, DWDM 106 may demultiplex the one or more optical data signals into individual optical data signals in accordance with the individual wavelengths of any 10G NRZ, coherent 100 GbE, 200 GbE, and/or 400 GbE optical data signals in the multi-wavelength ingress optical data signal. More specifically, 10G NRZ, coherent 100 GbE, 200 GbE, and/or 400 GbE UP 196 may be demultiplexed into twenty 10G NRZ, coherent 100 GbE, 200 GbE, and/or 400 GbE optical data signals, each of which may have a unique wavelength. DWDM 106 may output each of the twenty 10G NRZ, coherent 100 GbE, 200 GbE, and/or 400 GbE optical data signals to each of the transponders of 20×coherent 100 GbE, 200 GbE, and/or 400 GbE UP 188. Each of the transponders of 20×10G NRZ, coherent 100 GbE, 200 GbE, and/or 400 GbE UP 188 may convert a received corresponding coherent 10G NRZ, coherent 100 GbE, 200 GbE, and/or 400 GbE optical data signal, of the coherent 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400

GbE UP 188 may transmit the twenty SONET/SDH optical data signals to the MTC on the SONET/SDH optical network connection.

FIG. 2A depicts a network architecture, in accordance with the disclosure. The network architecture may comprise routers (for example router 287 and router 285) that may be capable of routing one or more packets from a backbone network (not illustrated) to an OCML terminal (for example, OCML terminal 207).

Router 287 may be a router that aggregates one or more first ingress packets received from the backbone network to a transport chassis (for example transport chassis 290). Router 287 may also receive one or more first egress packets from transport chassis 290 and route the one or more first egress packets to the backbone network. The backbone network may be a network connecting one or more service provider networks across a large geographic area such as a content (for example North America). The one or more first ingress packets and the one or more first egress packets may be transmitted between router 287 and transport chassis 290 via a plurality of 100 GbE, 200 GbE, and/or 400 GbE links. The plurality of 100 GbE, 200 GbE, and/or 400 GbE links may be SONET/SDH optical data signal links.

Transport chassis 290 may be a physical platform that accommodates a plurality of optical devices including a coherent transceiver. Transport chassis 290 may create a coherent optical data signal, which may be, for example, an optical data signal comprising coherent 100 GbE, 200 GbE, and/or 400 GbE optical data signals. Transport chassis 290 may send coherent optical data signals to OCML terminal 207, and transport chassis 290 may receive coherent optical data signals from OCML terminal 207.

Switch 291 may be an optical switch that receives one or more second ingress packets from router 285 and may transmit one or more second ingress frames, corresponding to the one or more second ingress packets, out of a port in switch 291 to OCML terminal 207. The one or more second ingress packets may be received via a plurality of 100 GbE, 200 GbE, and/or 400 GbE links. And the one or more second ingress frames may be switched out of the port in switch 291 to OCML terminal 207 as an optical data signal via a coherent 100 GbE, 200 GbE, and/or 400 GbE optical data signal switch. Switch 291 may receive one or more second egress frames from OCML terminal 207, create one or more second egress packets, and transmit the one or more egress packets to router 285.

Figure 21:
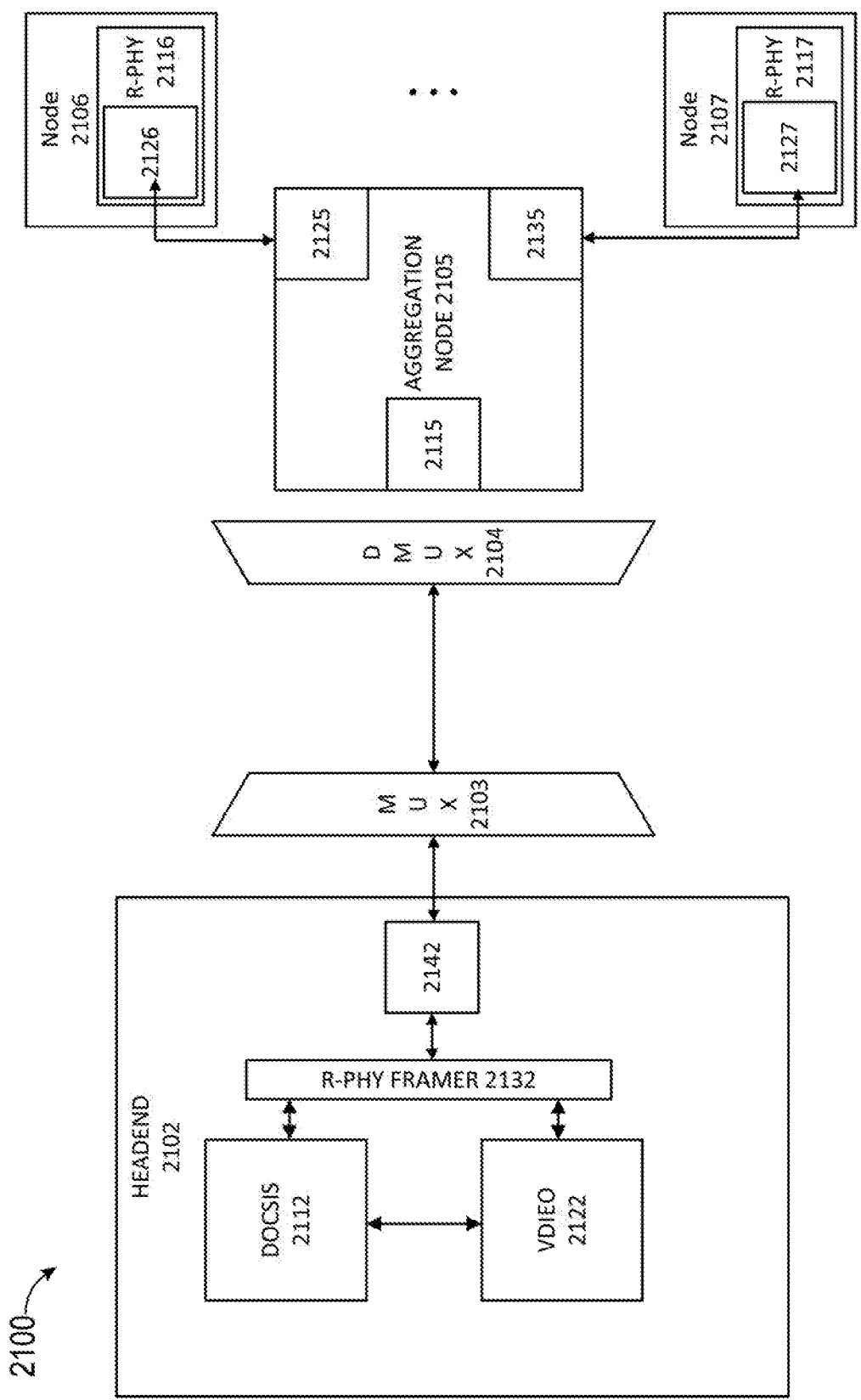
FIG. 21 depicts an aggregation node, in accordance with the disclosure.

OCML terminal 207 may connect a cable company to the Internet through the backbone network. OCML terminal 207, Primary Optical Fiber 211, Secondary Optical Fiber 213, and MDM 208 form a network that may be referred to as the Metro Access Optical Ring Network (for example Metro Access Optical Ring Network 206). Millimeter Wave Network 214 may be connected to MDM 208 via connection 254. Multi-dwelling unit (MDU) 216 may be connected to MDM 208 via connection 256 and transport chassis 207. Enterprise Network 218 may be connected to MDM 208 via connection 258. Devices 299 are connected to MDM 208 via connections 225 . . . 227, aggregation device 223, and connection 251. An illustrative aggregation device is illustrated in FIG. 21.

Millimeter Wave Network 214 may comprise one or more cellular or Wi-Fi masts with one or more modems (for example Modem 212) that provide mobile devices (for example devices 215) with access to content hosted by the one or more servers at a MTC Master Terminal Facility (not illustrated).

MDU 216 may comprise one a remote physical (PHY) node (for example Remote PHY Node 207) that may comprise an optical communications interface that connects to connection 256 and a cable interface that connects to one or more cable devices (for example devices 217) via cable. The one or more cable devices may be devices connecting cable set-top boxes in one or more residential, commercial, or industrial buildings to a tap at devices 217. Devices 217 is connected to connection 256 via transport chassis 207.

Enterprise Network 218 may comprise one or more offices requiring high-speed access to the Internet via Backbone Network 202 for example. Enterprise Network 218 may connect to the Internet via connection 258.

Device 265 may be a cable device that is connected to MDM 208 via connection 245. A 1×n splitter 293 may be an optical splitter or a beam splitter. 1×n splitter 293 may comprise one or more quartz substrates of an integrated waveguide optical power distribution device. 1×n splitter 293 may be a passive optical network device. It may be an optical fiber tandem device comprising one or more input terminals and one or more output terminals. 1×n splitter 239 may be Fused Biconical Taper (FBT) splitter or Planar Lightwave Circuit (PLC) splitter. 1×n splitter 293 may be a balanced splitter wherein 1×n splitter 293 comprises two input fibers and one or more output fibers over which the ingress optical data signal may be spread proportionally. In some embodiments, the ingress optical data signal may not be spread proportionally across the output fibers of optical splitter 1593. In some embodiments, optical splitter 1593 may comprise two input fibers and 2 output fibers. A first input fiber of optical splitter 1593 may be connected to primary fiber 1550 and a second input fiber of optical splitter 1593 may be connected to secondary fiber 1551 . . . 1×n splitter 293 may be connected to MDM 208 via connection 252. 1×n splitter 297 may be a . . . 1×n splitter 297 may be connected to MDM 208 via optical link terminal (OLT) 295 and connection 253. Devices 215, device 217, devices 299, device 265, 1xn 293, 1xn 297, and the one or more devices in enterprise network 218 may be connected to the backbone network via Metro Access Optical Ring Network 206.

FIG. 2B depicts an network architecture, in accordance with the disclosure. The network architecture may comprise a MTC Master Terminal Facility (for example MTC Master Terminal Facility 201) that may connect a cable company to the Internet through a backbone network (for example Backbone Network 202). MTC Master Terminal Facility 201 may include one or more servers hosting content that may be consumed by customer devices connected to the one or more servers via one or more networks. For example, the one or more networks may include cellular or millimeter wave networks (for example Millimeter Wave Network 214), remote physical networks (for example Remote PHY Network 216), enterprise networks (for example Enterprise Network 218), and one or more passive optical networks (PON) (for example PON 222 and PON 242). MTC Master Terminal Facility 201 may be connected to these one or more networks via one or more optical fibers (for example Primary Optical Fiber 211 and Secondary Optical Fiber 213). MTC Master Terminal Facility 201 may connect to the one or more optical fibers via an OCML terminal (for example, OCML terminal 207), and the one or more networks may connect to the one or more optical fibers via a MDM (for example MDM 208) comprising multiplexer-demultiplexer (for example DMux 288), and PON port (for example PON 298). OCML 207, Primary Optical Fiber 211, Secondary Optical Fiber 213, and MDM 208 form a network that may be referred to as the Metro Access Optical Ring Network (for example Metro Access Optical Ring Network 206). DMux 288 may multiplex optical data signals received from the one or more networks and transmit the multiplexed optical data signals to OCML 207. Conversely DMux 288 may demultiplex optical data signals received from OCML 207 and transmit the demultiplexed optical data signals to the one or more networks. Millimeter Wave Network 214 may be connected to DMux 288 via connection 254. Remote PHY Network 216 may be connected to DMux 288 via connection 256. Enterprise Network 218 may be connected to DMux 288 via connection 258. PON 222 may be connected to DMux 288 via connection 251. PON 242 however may be connected to PON 298 via connection 253.

Millimeter Wave Network 214 may comprise one or more cellular or Wi-Fi masts with one or more modems (for example Modem 212) that provide mobile devices (for example devices 215) with access to content hosted by the one or more servers at MTC Master Terminal Facility 201.

Remote PHY Network 216 may comprise one a remote physical (PHY) node (for example Remote PHY Node 207) that may comprise an optical communications interface that connects to connection 256 and a cable interface that connects to one or more cable devices (for example devices 217) via cables 226-cable 236. The one or more cable devices may be devices connecting cable set-top boxes in one or more residential, commercial, or industrial buildings to a tap at devices 217.

Enterprise Network 218 may comprise one or more offices requiring high-speed access to the Internet via Backbone Network 202 for example. Enterprise Network 218 may connect to the Internet via connection 258.

PON 222 may comprise one or more PON devices (for example devices 299) that require access to MTC Master Terminal Facility 201 or the Internet via for Backbone Network 202 for example. Devices 299 may be connected to a splitter (for example Splitter 223) via connections 225-connection 227. Splitter 223 is an optical splitter that may combine one or more optical data signals from each of devices 299 and transmit them to Strand PON optical line terminal (OLT) 210 via connection 252. Splitter 223 may also separate one or more optical data signals received from Strand PON OLT 210 via connection 252 into one or more optical data signals for each of devices 299. Strand PON OLT 210 may be an OLT that connects optical network units (ONUs) at a customer premises to DMux 288. Because one or more optical data signals can be transmitted as a multiplexed signal on a single strand of fiber, Strand PON OLT 210 may be connected to other PONs (not shown), in addition to PON 222, and may combine optical data signals received from the PONs and transmit the combined optical data signals to DMux 288. Strand PON OLT 210 may separate optical data signals received from DMux 288 into corresponding optical data signals each of which is for transmission to a corresponding PON.

PON 242 may comprise one or more PON devices (for example devices 249) that require access to MTC Master Terminal Facility 201 or the Internet via for Backbone Network 202 for example. Devices 249 may be connected to a splitter (for example Splitter 243) via connections 224-connection 247. Splitter 243 is an optical splitter that may combine one or more optical data signals from each of devices 249 and transmit them to PON 298 via connection 253. Splitter 243 may also separate one or more optical data signals received from PON 298 via connection 253 into one or more optical data signals for each of devices 249. OCML 207 in FIGS. 2A and 2B may be implemented as headend 101, headend 330, headend 530, headend 630, headend 1001, headend 1086, headend 1102, headend 1201, headend 1301, headend 1401, headend 1501, headend 1601, or headend 1701.

Figure 3:
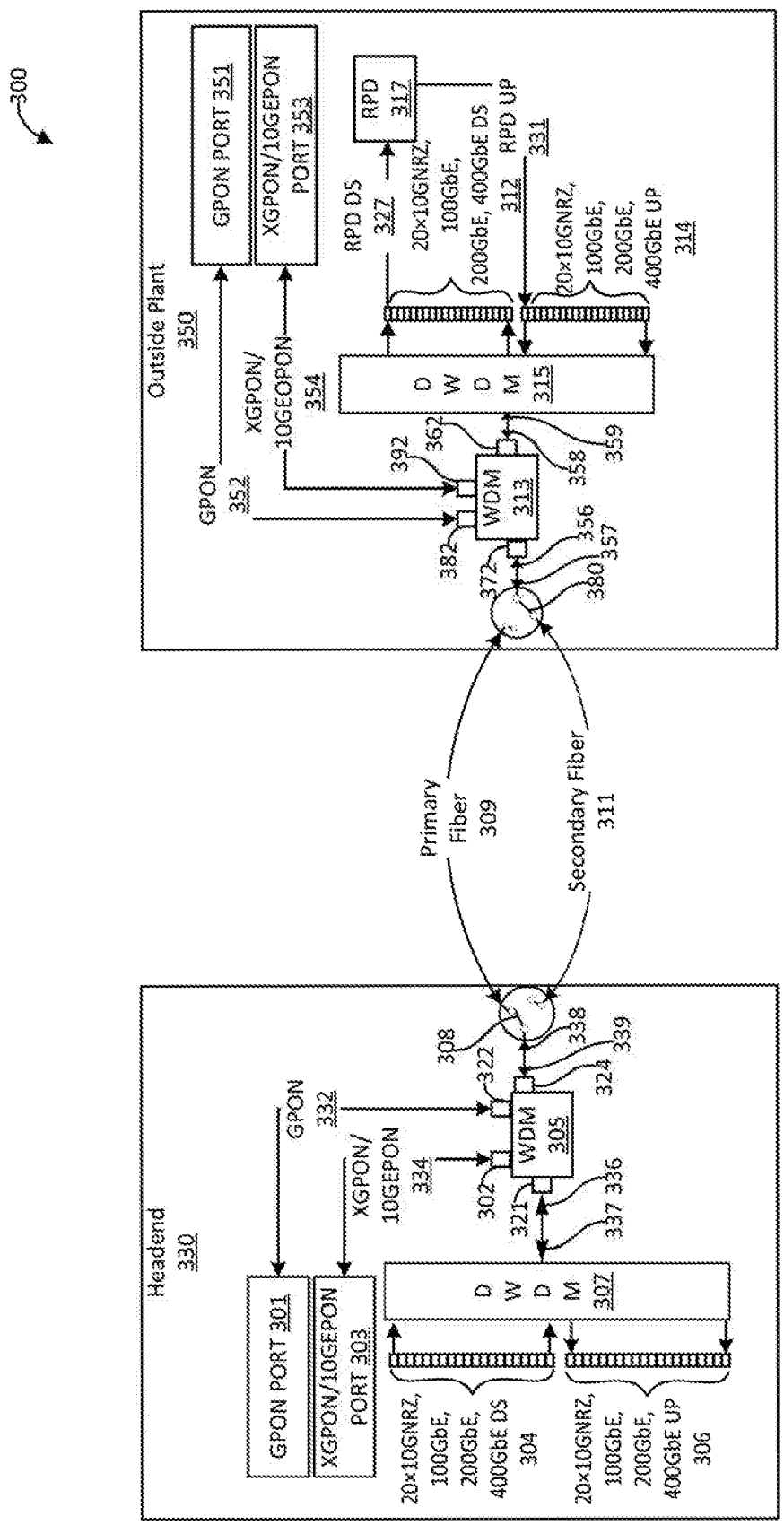
FIG. 3 depicts an access network diagram of an OCML headend and outside plant, in accordance with the disclosure.

FIG. 3 depicts an access network diagram of an OCML headend and outside plant, in accordance with the disclosure. FIG. 3 shows a schematic of an OCML headend according to at least one embodiment of the disclosure. As shown in FIG. 3, headend 330 is a smart integrated OCML headend, which is a circuit, comprising a DWDM (e.g., DWDM 307), a WDM (e.g., WDM 305), a GPON port (e.g., GPON PORT 301), an XGPON/10GEPON port (e.g., XGPON/10GEPON PORT 303), and an optical switch 308 to feed a primary optical fiber (e.g., Primary Fiber 309) or secondary (backup) optical fiber (e.g., Secondary Fiber 311). DWDM 307 may be similar in functionality to DWDM 106 and WDM 305 may be similar in functionality to WDM 108. The disclosure provides a method of transporting multiple 10G NRZ, coherent 100 GbE, 200 GbE, and/or 400 GbE, GPON, and/or XGPON/10GEPON signals on the same optical fiber over extended links of up to 60 kms without a cable company having to put optical amplifiers between the cable's Master Terminal Center (MTC) facility and a outside plant (e.g., Outside plant 350). The MTC facility may be an inside plant facility where a cable company acquires and combines services to be offered to customers. The MTC facility provides these combined services to customers, by transmitting and receiving optical signals over a plurality of optical fibers to a outside plant or field hub which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 208 in FIG. 2).

In one aspect, headend 330 may comprise twenty 10G NRZ, coherent 100 GbE, 200 GbE, and/or 400 GbE downstream (DS) transponders (e.g., 20×10G NRZ, coherent 100 GbE, 200 GbE, and/or 400 GbE DS 304) and twenty 10G NRZ, coherent 100 GbE, 200 GbE, and/or 400 GbE upstream (UP) transponders (e.g., 20×10G NRZ, coherent 100 GbE, 200 GbE, and/or 400 GbE UP 306). 20×10G NRZ, coherent 100 GbE, 200 GbE, and/or 400 GbE DS 304 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 306 may receive upstream data over 10G NRZ, coherent 100 GbE, 200 GbE, and/or 400 GbE wavelengths. 20×10G NRZ, coherent 100 GbE, 200 GbE, and/or 400 GbE DS 304 may comprise the same elements and perform the same operations as 20×10G NRZ, coherent 100 GbE, 200 GbE, and/or 400 GbE 190, and 20×10G NRZ, coherent 100 GbE, 200 GbE, and/or 400 GbE UP 306 may comprise the same elements and perform the same operations as 20×10G NRZ, coherent 100 GbE, 200 GbE, and/or 400 GbE UP 188.

The operation of headend 330 may be described by way of the processing of downstream optical data signals transmitted from headend 330 to a outside plant (e.g., Outside plant 350), and the processing of upstream optical data signals received from the field hub or outside plant. Each of the transponders of 20×10G NRZ, coherent 100 GbE, 200 GbE, and/or 400 GbE DS 304 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 304 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 304 may generate twenty corresponding second optical data signals each of which has a unique wavelength.

DWDM 307 may receive the twenty corresponding second optical data signals as an input and output a multi-wavelength downstream optical data signal (e.g., 336) comprising the twenty corresponding second optical data signals onto a fiber. The multi-wavelength downstream optical data signal 336 may be a 10GNRZ, coherent 100 GbE, 200 GbE, and/or 400 GbE optical data signal. More specifically, DWDM 307 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 336, may be input to a WDM (e.g. WDM 305). WDM 305 may be a four port wave division multiplexer (WDM), or a four port circulator, that receives multi-wavelength downstream optical data signal 336 on port 321. WDM 305 may also receive an XGPON/10GEPON signal, carried on a first fiber (e.g., XGPON/10GEPON 334), on port 302, a GPON signal, carried on a second fiber (e.g., GPON 332), on port 322, and may multiplex multi-wavelength downstream optical data signal 336 with the XGPON/10GEPON and GPON signal. XGPON/10GEPON 334 may be a fiber carrying an XGPON/10GEPON optical data signal with a wavelength within the 1571 nm-1591 nm and 1260 nm-1280 nm range. GPON 332 may be a fiber carrying a GPON optical data signal with a wavelength of 1490 nm and 1310 nm. WDM 305 outputs an egress optical data signal from port 324, which may be a multi-wavelength optical data signal comprising 10G NRZ, coherent 100 GbE, 200 GbE, and/or 400 GbE, XGPON/10GEPON, and/or GPON optical data signals. WDM 305 may multiplex multi-wavelength downstream optical data signal 336, the XGPON/10GEPON optical data signal, and GPON optical data signal the same way DWDM 307 multiplexes optical data signals. The egress optical data signal (e.g., egress optical data signal 338) may be output on port 324 of WDM 305 and optical switch 308 may switch egress optical data signal 338 onto primary fiber 309 or secondary fiber 311 depending on the position of switch 308. Egress optical data signal 338 may be transmitted on primary fiber 309 to a first connector at outside plant 350, or may be transmitted on secondary fiber 311 to a second connector at outside plant 350. Outside plant 350 may include a MDM with the first connector and the second connector.

The operation of outside plant 350 may be described by way of the processing of a downstream optical data signal received from headend 330. Egress optical data signal 338 may be received on the first or second connector at outside plant 350 based on a position of optical switch 380, as ingress optical data signal 356. That is ingress optical data signal 356 may be similar to egress optical data signal 338. Ingress optical data signal 356 may be received by WDM 313 via port 372. WDM 313 may demultiplex ingress optical data signal 356 into a multi-wavelength downstream optical data signal 359, an XGPON/10GEPON optical data signal that may be output on port 392 onto a first fiber (e.g., XGPON/10GEPON 354), and/or a GPON optical data signal output on port 382 onto a second fiber (e.g., GPON 352). The XGPON/10GEPON optical data signal may be received on XGPON/10GEPON port 353 and the GPON optical data signal may be received on GPON port 351.

The multi-wavelength downstream optical data signal 359 may be output on port 362 and received by DWDM 315 which may be an array waveguide gratings (AWG) or TFF. The multi-wavelength downstream optical data signal 359 may comprise 10G NRZ, coherent 100 GbE, 200 GbE, and/or 400 GbE optical data signals. DWDM 315 may demultiplex the multi-wavelength downstream optical data signal 359 into individual optical data signals in accordance with the individual wavelengths of the 10G NRZ, coherent 100 GbE, 200 GbE, and/or 400 GbE optical data signals. More specifically, the multi-wavelength downstream optical data signal 359 may be demultiplexed into twenty 10G NRZ, coherent 100 GbE, 200 GbE, and/or 400 GbE optical data signals, each of which may have a unique wavelength. DWDM 315 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE DS 312. Each of the transponders of 20×10G NRZ, coherent 100 GbE, 200 GbE, and/or 400 GbE DS 312 may convert a received corresponding 10G NRZ, coherent 100 GbE, 200 GbE, and/or 400 GbE optical data signal, of the coherent 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. In some embodiments, DWDM 315 may output one or more coherent 10G NRZ, coherent 100 GbE, 200 GbE, and/or 400 GbE optical data signals (e.g., RPD DS 327) to a remote physical (PHY) device (RPD) (e.g., RPD 317). RPD 317 may be similar to Remote PHY Node 207 in functionality. RPD 317 may convert the one or more 10G NRZ, coherent 100 GbE, 200 GbE, and/or 400 GbE optical data signals into an electrical signal that may be transmitted over one or more coaxial cables. RPD 317 may also convert one or more electrical signals into one or more 10G NRZ, coherent 100 GbE, 200 GbE, and/or 400 GbE optical data signal for transmission to a transponder (e.g., 20×10G NRZ, coherent 100 GbE, 200 GbE, and/or 400 GbE UP 314).

The operation of outside plant 350 may be further described by way of the processing of an upstream optical data signal transmitted to headend 330. Each of the transponders of 20×10G NRZ, coherent 100 GbE, 200 GbE, and/or 400 GbE UP 314 may receive a SONET/SDH optical data signal from one or more devices providing cable to customers or subscribers to a cable's services. For example, the one or more devices may be any of devices 217, and RPD 327 may be connected to devices 217 via cable 226 . . . cable 236. Cable 226 . . . cable 236 may be coaxial cables. Each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE UP 314 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE UP 314 may generate twenty corresponding second optical data signals each of which has a unique wavelength.

DWDM 315 may receive twenty corresponding second optical data signals as an input and output a multi-wavelength downstream optical data signal (e.g., 358) comprising the twenty corresponding second optical data signals onto a fiber. In some embodiments, RPD 317 may transmit one or more 10G NRZ, coherent 100 GbE, 200 GbE, and/or 400 GbE optical data signals (e.g., RPD DS 331) to one or more of 20×10G NRZ, coherent 100 GbE, 200 GbE, and/or 400 GbE UP 314. RPD DS 331 may be 10G NRZ, coherent 100 GbE, 200 GbE, and/or 400 GbE optical data signals that generated by RPD 317 in response to RPD 317 receiving electrical signals on coaxial cables connecting a remote physical (PHY) network (e.g., remote PHY network 216) to DWDM 315. The multi-wavelength downstream optical data signal 358 may be a coherent 100 GbE, 200 GbE, and/or 400 GbE optical data signal. More specifically, DWDM 315 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 358, may be input to a WDM (e.g. WDM 313). WDM 313 may be a four port wave division multiplexer (WDM), or a four port circulator, that receives multi-wavelength downstream optical data signal 358 on port 362. WDM 313 may also receive an XGPON/10GEPON signal, carried on a first fiber (e.g., XGPON/10GEPON 354), on port 392, a GPON signal, carried on a second fiber (e.g., GPON 352), on port 382, and may multiplex multi-wavelength downstream optical data signal 358 with the XGPON/10GEPON and GPON signal. XGPON/10GEPON 354 may be a fiber carrying an XGPON/10GEPON optical data signal with a wavelength within the 1571 nm-1591 nm and 1260 nm-1280 nm range. GPON 352 may be a fiber carrying a GPON optical data signal with a wavelength of 1490 nm or 1310 nm. WDM 313 outputs an egress optical data signal from port 372, which may be a multi-wavelength optical data signal comprising 10G NRZ, coherent 100 GbE, 200 GbE, and/or 400 GbE, XGPON/10GEPON, and/or GPON optical data signals. WDM 313 may multiplex multi-wavelength downstream optical data signal 358, the XGPON/10GEPON optical data signal, and GPON optical data signal the same way DWDM 307 multiplexes optical data signals. The egress optical data signal (e.g., egress optical data signal 357) may be output on port 372 of WDM 313 and optical switch 380 may switch egress optical data signal 357 onto primary fiber 309 or secondary fiber 311 depending on the position of switch 380. Egress optical data signal 357 may be transmitted on primary fiber 309 to a first connector at headend 330, or may be transmitted on secondary fiber 311 to a second connector at headend 330.

The operation of headend 330 may be further described by way of the processing of an upstream optical data signal received from outside plant 350. Egress optical data signal 357 may be received on the first or second connector at headend 330 based on a position of optical switch 308, as ingress optical data signal 339. That is ingress optical data signal 339 may be similar to egress optical data signal 357. Ingress optical data signal 339 may be received by WDM 305 via port 324. WDM 305 may demultiplex ingress optical data signal 339 into a mutli-wavelength upstream optical data signal 337, an XGPON/10GEPON optical data signal that may be output on port 302 onto a first fiber (e.g., XGPON/10GEPON 334), and/or a GPON optical data signal output on port 322 onto a second fiber (e.g., GPON 332). The XGPON/10GEPON optical data signal may be received on XGPON/10GEPON port 303 and the GPON optical data signal may be received on GPON port 301.

The multi-wavelength upstream optical data signal 339 may be output, as multi-wavelength upstream optical data signal 337, on port 321 and received by DWDM 307. The multi-wavelength upstream optical data signal 337 may comprise 10G NRZ, coherent 100 GbE, 200 GbE, and/or 400 GbE optical data signals. DWDM 307 may demultiplex the multi-wavelength upstream optical data signal 337 into individual optical data signals in accordance with the individual wavelengths of the 10G NRZ, coherent 100 GbE, 200 GbE, and/or 400 GbE optical data signals. More specifically, the multi-wavelength upstream optical data signal 337 may be demultiplexed into twenty 10G NRZ, coherent 100 GbE, 200 GbE, and/or 400 GbE optical data signals, each of which may have a unique wavelength. DWDM 307 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 306. Each of the transponders of 20×10G NRZ, coherent 100 GbE, 200 GbE, and/or 400 GbE UP 306 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 306 may transmit the twenty SONET/SDH optical data signals to the MTC on the SONET/SDH optical network connection.

FIG. 4 shows an access link loss budget of a Dense Wave Division Multiplexing (DWDM) passive circuit, in accordance with the disclosure. Link loss budget 400 illustrates the link loss budget in decibels (dB) associated with a physical optical link connecting an OCML transceiver to a outside plant transceiver. The OCML headend and outside plant transceiver may comprise 10G NRZ, coherent 100 GbE, 200 GbE, and/or 400 GbE transceivers that may not contribute to the loss budget. That is there may be no power lost when the 10G NRZ, coherent 100 GbE, 200 GbE, and/or 400 GbE transceivers transmit a 10G NRZ, coherent 100 GbE, 200 GbE, and/or 400 GbE optical data signal. Thus, Txcvr Pwr/WL 401 may be equal to 0.0 when a transceiver at an OCML headend transmits a 10G NRZ, coherent 100 GbE, 200 GbE, and/or 400 GbE optical data signal to a outside plant transceiver, and when the transceiver at the outside plant transmits a 10G NRZ, coherent 100 GbE, 200 GbE, and/or 400 GbE optical data signal to the OCML terminal. The transceiver in the OCML headend may be similar to a transceiver included in the transponders disclosed herein (e.g., 20×10G NRZ, coherent 100 GbE, 200 GbE, and/or 400 GbE DS 190 or 20×10G NRZ, coherent 100 GbE, 200 GbE, and/or 400 GbE UP 188 in headend 101 or 20×10G NRZ, coherent 100 GbE, 200 GbE, and/or 400 GbE DS 304 or 20×10G NRZ, coherent 100 GbE, 200 GbE, and/or 400 GbE UP 306 in OCML headend 301). The transceiver in the outside plant may be similar to a transceiver included in the transponders disclosed herein (e.g., 20×10G NRZ, coherent 100 GbE, 200 GbE, and/or 400 GbE DS 312 or 20×10G NRZ, coherent 100 GbE, 200 GbE, and/or 400 GbE UP 314).

In some embodiments, the fiber connecting the transceiver at the OCML headend to the outside plant, may be 5 kilometers (km). Thus fiber 402 may be 5 km in length and when a transceiver in the OCML headend transmits an optical data signal (e.g., 10G NRZ, coherent 100 GbE, 200 GbE, and/or 400 GbE optical data signal) to a transceiver in the outside plant along fiber 402, fiber 402 may cause the optical data signal to experience a 1.25 dB loss. Similarly, when the transceiver in the outside plant transmits an optical data signal to the OCML headend along fiber 402, fiber 402 may cause the optical data signal to experience a 11.25 dB loss.

In some embodiments, a multiplexer in a DWDM (e.g., DWDM 106 or DWDM 307) in an OCML headend may contribute to the loss budget. This may be based at least in part on the multiplexing process applied to multiple input optical data signals received from multiple transponders (e.g., 20×10G NRZ, coherent 100 GbE, 200 GbE, and/or 400 GbE DS 190 or 20×10G NRZ, coherent 100 GbE, 200 GbE, and/or 400 GbE DS 304). The multiplexing process may result in the multiplexed optical data signal having less power than the multiple input optical data signals. The OCML headend in some embodiments, may also be referred to as the headend, and thus headend DWDM mux 403 is the loss budget associated with the multiplexing of multiple input optical data signals. The loss budget for headend DWDM mux 403 may be 5.8 dB. Similarly a demultiplexer in a DWDM in a outside plant may contribute to the loss budget. This may be based at least in part on the demultiplexing process applied to a multiplexed optical data signal received from the DWDM in the headend. The demultiplexing process may result in each of the demultiplexed optical data signals, included in the received multiplexed optical data signal, having less power than the received multiplexed optical data signal. Thus the loss budget for field DWDM DeMux 404 may be 5.8 dB.

In some embodiments, an optical switch (e.g., optical switch 116 or optical switch 308) may contribute to the loss budget experienced by an optical data signal is transmitted from the OCML headend to the outside plant or an optical data signal received at the OCML headend from the outside plant. This may be due to the fact that the optical switch may comprise one or more electronics that may cause the optical data signal to experience some loss in power as it is it switched from one connector to another in the OCML headend. Thus switch (headend) 405 may cause the optical data signal to experience a 1.5 dB loss.

In some embodiments, there may be an optical passive component connecting the OCML headend to the outside plant. For instance, there may be a first fiber connection between the OCML headend and the optical passive component, and a second fiber connection between the optical passive component and the outside plant. This is depicted as passive optical component 625 in FIG. 6 below. The optical passive component, may cause optical data signals transmitted between the OCML headend and the outside plant to experience some loss in power. The optical passive component may be a 3 dB optical passive component (i.e., 3 dB optical passive 406) that may cause the optical data signals to experience a 3.5 dB loss.

In some embodiments, there may be two connectors at the OCML headend (e.g., connector 118 and connector 150). Each may cause an optical data signal sent to a outside plant or received from the outside plant to experience a loss in power. Each connector may contribute a 0.3 dB loss resulting in the two connectors (connectors 407) contributing a total loss of 0.6 dB. In some embodiments, a safety margin (e.g., safety margin 408) of 3 dB may be included.

Figure 5:
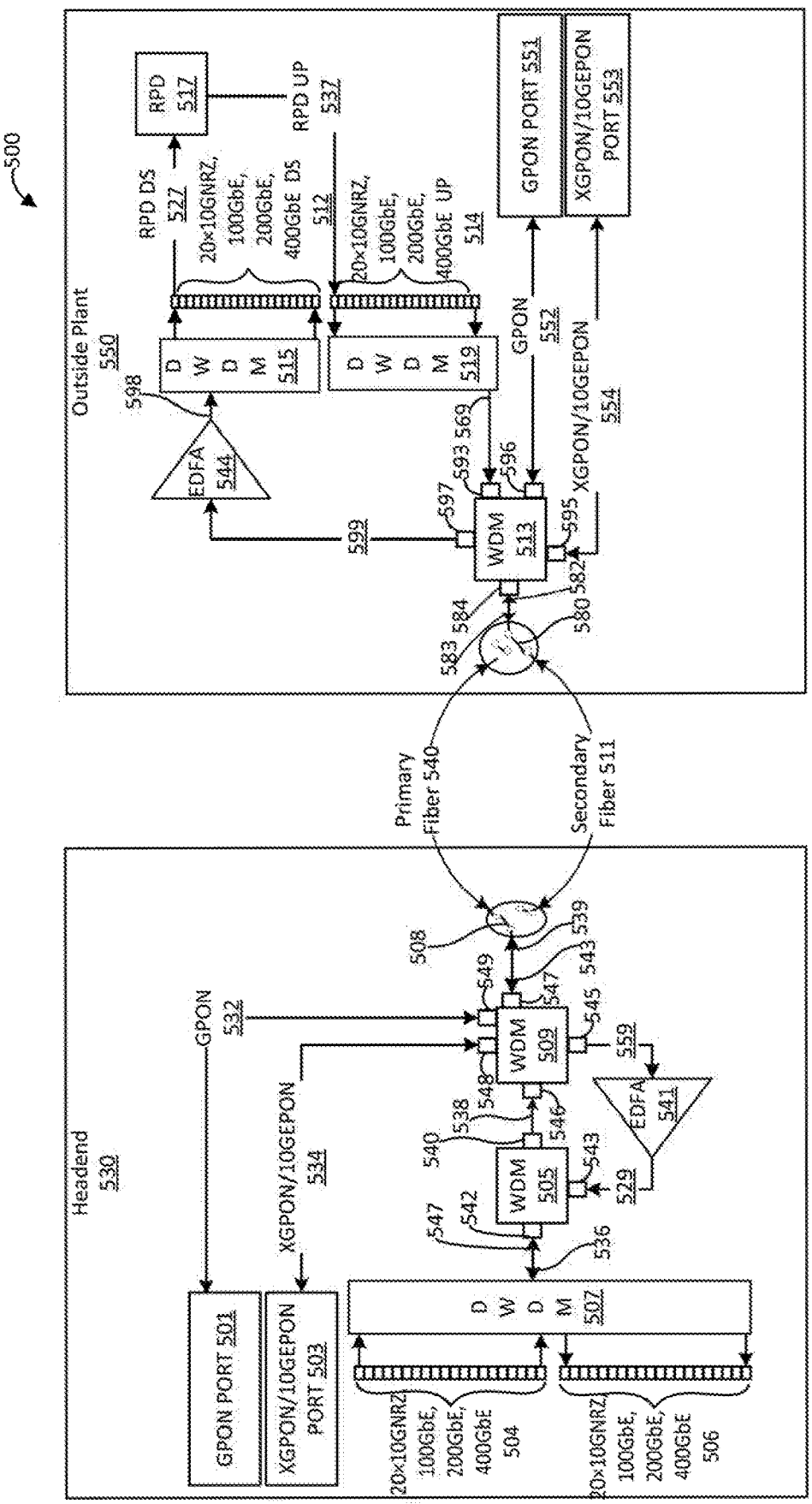
FIG. 5 depicts an access network diagram of an OCML headend and outside plant, in accordance with the disclosure.

FIG. 5 depicts an access network diagram of an OCML headend and outside plant, in accordance with the disclosure. FIG. 5 shows a schematic of an OCML headend according to at least one embodiment of the disclosure. As shown in FIG. 5, headend 530 is a smart integrated OCML headend, which is a circuit, comprising a DWDM (e.g., DWDM 507), a first WDM (e.g., WDM 505), a second WDM (e.g., WDM 509), a GPON port (e.g., GPON PORT 501), an XGPON/10GEPON port (e.g., XGPON/10GEPON PORT 503), an EDFA (e.g., EDFA 541), and an optical switch 508 to feed a primary optical fiber (e.g., Primary Fiber 540) or secondary (backup) optical fiber (e.g., Secondary Fiber 511). DWDM 507 may be similar in functionality to DWDM 106 and WDM 505 and WDM 509 may be similar in functionality to WDM 108. The disclosure provides a method of transporting multiple 10G NRZ, coherent 100 GbE, 200 GbE, and/or 400 GbE and GPON/XGPON/10GEPON signals on the same optical fiber over extended links of up to 60 kms without a cable company having to put optical amplifiers between the cable's Master Terminal Center (MTC) facility and a outside plant (e.g., Outside plant 550) or field hub. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 208 in FIG. 2).

In one aspect, headend 530 may comprise twenty 10G NRZ, coherent 100 GbE, 200 GbE, and/or 400 GbE downstream (DS) transponders (e.g., 20×10G NRZ, coherent 100 GbE, 200 GbE, and/or 400 GbE DS 504) and twenty coherent 10G NRZ, coherent 100 GbE, 200 GbE, and/or 400 GbE upstream (UP) transponders (e.g., 20×10G NRZ, coherent 100 GbE, 200 GbE, and/or 400 GbE UP 506). 20×c 10G NRZ, coherent 100 GbE, 200 GbE, and/or 400 GbE DS 504 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 506 may receive upstream data over 10G NRZ, coherent 100 GbE, 200 GbE, and/or 400 GbE wavelengths. 20×10G NRZ, coherent 100 GbE, 200 GbE, and/or 400 GbE DS 504 may comprise the same elements and perform the same operations as 20×10G NRZ, coherent 100 GbE, 200 GbE, and/or 400 GbE 190, and 20×10G NRZ, coherent 100 GbE, 200 GbE, and/or 400 GbE UP 506 may comprise the same elements and perform the same operations as 20×10G NRZ, coherent 100 GbE, 200 GbE, and/or 400 GbE UP 188.

The operation of headend 530 may be described by way of the processing of downstream optical data signals transmitted from headend 530 to a outside plant (e.g., Outside plant 550), and the processing of upstream optical data signals received from the outside plant. Each of the transponders of 20×10G NRZ, coherent 100 GbE, 200 GbE, and/or 400 GbE DS 504 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 504 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 504 may generate twenty corresponding second optical data signals each of which has a unique wavelength.

DWDM 507 may receive the twenty corresponding second optical data signals as an input and output a multi-wavelength downstream optical data signal (e.g., multi-wavelength downstream optical data signal 547) comprising the twenty corresponding second optical data signals onto a fiber. The multi-wavelength downstream optical data signal 547 may be a 10G NRZ, coherent 100 GbE, 200 GbE, and/or 400 GbE optical data signal. More specifically, DWDM 507 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 547, may be input to WDM 505. WDM 505 may be a four port wave division multiplexer (WDM), or a four port circulator, that receives multi-wavelength downstream optical data signal 547 on port 542. WDM 505 may function as a circulator and may output multi-wavelength downstream optical data signal 538, on port 540, to WDM 509. Multi-wavelength downstream optical data signal 538 may be substantially the same as multi-wavelength downstream optical data signal 547. WDM 509 may receive multi-wavelength downstream optical data signal 538, and may also receive an XGPON/10GEPON signal, carried on a first fiber (e.g., XGPON/10GEPON 534), on port 548, a GPON signal, carried on a second fiber (e.g., GPON 532), on port 549, and may multiplex multi-wavelength downstream optical data signal 538 with the XGPON/10GEPON and GPON signal. XGPON/10GEPON 534 may be a fiber carrying an XGPON/10GEPON optical data signal with a wavelength within the 1571 nm-1591 nm and 1260 nm-1280 nm range. GPON 532 may be a fiber carrying a GPON optical data signal with a wavelength of 1490 or 1310 nm. WDM 509 outputs an egress optical data signal from port 542, which may be a multi-wavelength optical data signal comprising 10G NRZ, coherent 100 GbE, 200 GbE, and/or 400 GbE, XGPON/10GEPON, and/or GPON optical data signals. WDM 509 may multiplex multi-wavelength downstream optical data signal 538, the XGPON/10GEPON optical data signal, and GPON optical data signal the same way DWDM 307 multiplexes optical data signals. The egress optical data signal (e.g., egress optical data signal 539) may be output on port 542 of WDM 509 and optical switch 508 may switch egress optical data signal 539 onto primary fiber 540 or secondary fiber 511 depending on the position of switch 508. Egress optical data signal 539 may be transmitted on primary fiber 540 to a first connector at outside plant 550, or may be transmitted on secondary fiber 511 to a second connector at outside plant 550. Outside plant 550 may include a MDM with the first connector and the second connector.

The operation of outside plant 550 may be described by way of the processing of a downstream optical data signal received from headend 530. Egress optical data signal 539 may be received on the first or second connector at outside plant 550 based on a position of optical switch 580, as ingress optical data signal 582. That is ingress optical data signal 582 may be similar to egress optical data signal 539. Ingress optical data signal 582 may be received by WDM 513 via port 584. WDM 513 may demultiplex ingress optical data signal 582 into a multi-wavelength downstream optical data signal 599, an XGPON/10GEPON optical data signal that may be output on port 595 onto a first fiber (e.g., XGPON/10GEPON 554), and/or a GPON optical data signal output on port 596 onto a second fiber (e.g., GPON 552). The XGPON/10GEPON optical data signal may be received on XGPON/10GEPON port 553 and the GPON optical data signal may be received on GPON port 551.

The multi-wavelength downstream optical data signal 599 may be output on port 597 and received by EDFA 544. The multi-wavelength downstream optical data signal 559 may comprise 10G NRZ, coherent 100 GbE, 200 GbE, and/or 400 GbE optical data signals. A gain associated EDFA 544 may be based at least in part on a distance that 10G NRZ, coherent 100 GbE, 200 GbE, and/or 400 GbE optical data signals have to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, the gain of booster optical amplifier 544 may be adjusted based at least in part on the attenuation coefficient and length of fiber that the egress optical data signal will travel. More specifically, the gain of booster optical amplifier 544 may be $G=e^{(2\alpha L)}$, where $\alpha$ is the fiber attenuation coefficient, as explained above, and L is the length of the fiber (e.g., the length of primary fiber 540 and/or the length of secondary fiber 511). Multi-wavelength upstream optical data signal 599 may be amplified by EDFA 544, and EDFA 544 may output multi-wavelength downstream optical data signal 598 to DWDM 515.

DWDM 515 may demultiplex the multi-wavelength downstream optical data signal 589 into individual optical data signals in accordance with the individual wavelengths of the 10G NRZ, coherent 100 GbE, 200 GbE, and/or 400 GbE optical data signals. More specifically, the multi-wavelength downstream optical data signal 598 may be demultiplexed into twenty 10G NRZ, coherent 100 GbE, 200 GbE, and/or 400 GbE optical data signals, each of which may have a unique wavelength. DWDM 515 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE DS 512. Each of the transponders of 20×10G NRZ, coherent 100 GbE, 200 GbE, and/or 400 GbE DS 512 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE DS 512 may transmit the twenty SONET/SDH optical data signals to the MTC on the SONET/SDH optical network connection. In some embodiments, DWDM 515 may output one or more 10G NRZ, coherent 100 GbE, 200 GbE, and/or 400 GbE optical data signals (e.g., RPD DS 527) to a remote physical (PHY) device (RPD) (e.g., RPD 517). RPD 517 may be similar to Remote PHY Node 207 in functionality. RPD 517 may convert the one or more 10G NRZ, coherent 100 GbE, 200 GbE, and/or 400 GbE optical data signals into an electrical signal that may be transmitted over one or more coaxial cables. RPD 517 may also convert one or more electrical signals into one or more 10G NRZ, coherent 100 GbE, 200 GbE, and/or 400 GbE optical data signal for transmission to a transponder (e.g., 20×10G NRZ, coherent 100 GbE, 200 GbE, and/or 400 GbE UP 514).

The operation of outside plant 550 may be further described by way of the processing of an upstream optical data signal transmitted to headend 530. Each of the transponders of 20×10G NRZ, coherent 100 GbE, 200 GbE, and/or 400 GbE UP 514 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE UP 514 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE UP 514 may generate twenty corresponding second optical data signals each of which has a unique wavelength.

DWDM 519 may receive twenty corresponding second optical data signals as an input and output a multi-wavelength upstream optical data signal (e.g., multi-wavelength downstream optical data signal 569) to port 593 of WDM 513. In some embodiments, RPD 517 may transmit one or more 10G NRZ, coherent 100 GbE, 200 GbE, and/or 400 GbE optical data signals (e.g., RPD UP 537) to one or more of 20×10G NRZ, coherent 100 GbE, 200 GbE, and/or 400 GbE UP 514. RPD UP 537 may be 10G NRZ, coherent 100 GbE, 200 GbE, and/or 400 GbE optical data signals generated by RPD 517 in response to RPD 517 receiving electrical signals on coaxial cables connecting a remote physical (PHY) network (e.g., remote PHY network 216) to DWDM 519. The multi-wavelength upstream optical data signal 569 may be a 10G NRZ, coherent 100 GbE, 200 GbE, and/or 400 GbE optical data signal. More specifically, DWDM 519 may multiplex the twenty corresponding second optical data signals onto the fiber, wherein the twenty multiplexed corresponding second optical data signals compose the multi-wavelength upstream optical data signal. The multi-wavelength optical data signal may have a wavelength comprising the twenty wavelengths of the twenty corresponding second optical data signals.

WDM 513 may be a five port wave division multiplexer (WDM), or a five port circulator, that receives a multi-wavelength upstream optical data signal on port 593. WDM 513 may also receive an XGPON/10GEPON signal, carried on a first fiber (e.g., XGPON/10GEPON 554), on port 595, a GPON signal, carried on a second fiber (e.g., GPON 552), on port 596, and may multiplex the multi-wavelength upstream optical data signal with the XGPON/10GEPON and GPON signal. XGPON/10GEPON 554 may be a fiber carrying an XGPON/10GEPON optical data signal with a wavelength within the 1571 nm-1591 nm range. GPON 552 may be a fiber carrying a GPON optical data signal with a wavelength of 1490 nm. WDM 513 outputs an egress optical data signal from port 584, which may be a multi-wavelength optical data signal comprising 10G NRZ, coherent 100 GbE, 200 GbE, and/or 400 GbE, XGPON/10GEPON, and/or GPON optical data signals. WDM 513 may multiplex the multi-wavelength upstream optical data signal, the XGPON/10GEPON optical data signal, and GPON optical data signal the same way DWDM 507, 515, and 519 multiplex optical data signals. The egress optical data signal (e.g., egress optical data signal 583) may be output on port 584 of WDM 513 and optical switch 580 may switch egress optical data signal 583 onto primary fiber 540 or secondary fiber 511 depending on the position of switch 580. Egress optical data signal 583 may be transmitted on primary fiber 540 to a first connector at headend 530, or may be transmitted on secondary fiber 511 to a second connector at headend 530.

The operation of headend 530 may be further described by way of the processing of an upstream optical data signal received from outside plant 550. Egress optical data signal 583 may be received on the first or second connector at headend 530 based on a position of optical switch 508, as ingress optical data signal 543. That is ingress optical data signal 543 may be similar to egress optical data signal 583. Ingress optical data signal 543 may be received by WDM 509 via port 542.

WDM 509 may demultiplex ingress optical data signal 543 into a multi-wavelength upstream optical data signal 559, an XGPON/10GEPON optical data signal that may be output on port 548 onto a first fiber (e.g., XGPON/10GE-PON 534), and/or a GPON optical data signal output on port 549 onto a second fiber (e.g., GPON 532). The XGPON/10GEPON optical data signal may be received on XGPON/10GEPON port 503 and the GPON optical data signal may be received on GPON port 501.

The multi-wavelength upstream optical data signal 559 may be output on port 545 and received by EDFA 541. The multi-wavelength upstream optical data signal 559 may comprise 10G NRZ, coherent 100 GbE, 200 GbE, and/or 400 GbE optical data signals. A gain associated EDFA 541 may be based at least in part on a distance that 10G NRZ, coherent 100 GbE, 200 GbE, and/or 400 GbE optical data signals have to travel, similar to that of EDFA 544. Multi-wavelength upstream optical data signal 559 may be amplified by EDFA 541, and EDFA 541 may output multi-wavelength upstream optical data signal 529 to WDM 505. WDM 505 may receive the multi-wavelength upstream optical data signal 520 on port 543 of WDM 505. WDM 505 may output multi-wavelength upstream optical data signal 536 which is substantially the same as multi-wavelength upstream optical data signal 529. WDM 505 may function as a circulator when receiving multi-wavelength upstream optical data signal 529 on port 543 and outputting multi-wavelength upstream optical data signal 536 on port 542. Multi-wavelength upstream optical data signal 536 may be received by DWDM 507.

The multi-wavelength upstream optical data signal 536 may comprise 10G NRZ, coherent 100 GbE, 200 GbE, and/or 400 GbE optical data signals. DWDM 507 may demultiplex the multi-wavelength upstream optical data signal 536 into individual optical data signals in accordance with the individual wavelengths of the 10G NRZ, coherent 100 GbE, 200 GbE, and/or 400 GbE optical data signals. More specifically, the multi-wavelength upstream optical data signal 536 may be demultiplexed into twenty 10G NRZ, coherent 100 GbE, 200 GbE, and/or 400 GbE optical data signals, each of which may have a unique wavelength. DWDM 507 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 506. Each of the transponders of 20×10G NRZ, coherent 100 GbE, 200 GbE, and/or 400 GbE UP 506 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 506 may transmit the twenty SONET/SDH optical data signals to the MTC on the SONET/SDH optical network connection.

Figure 6:
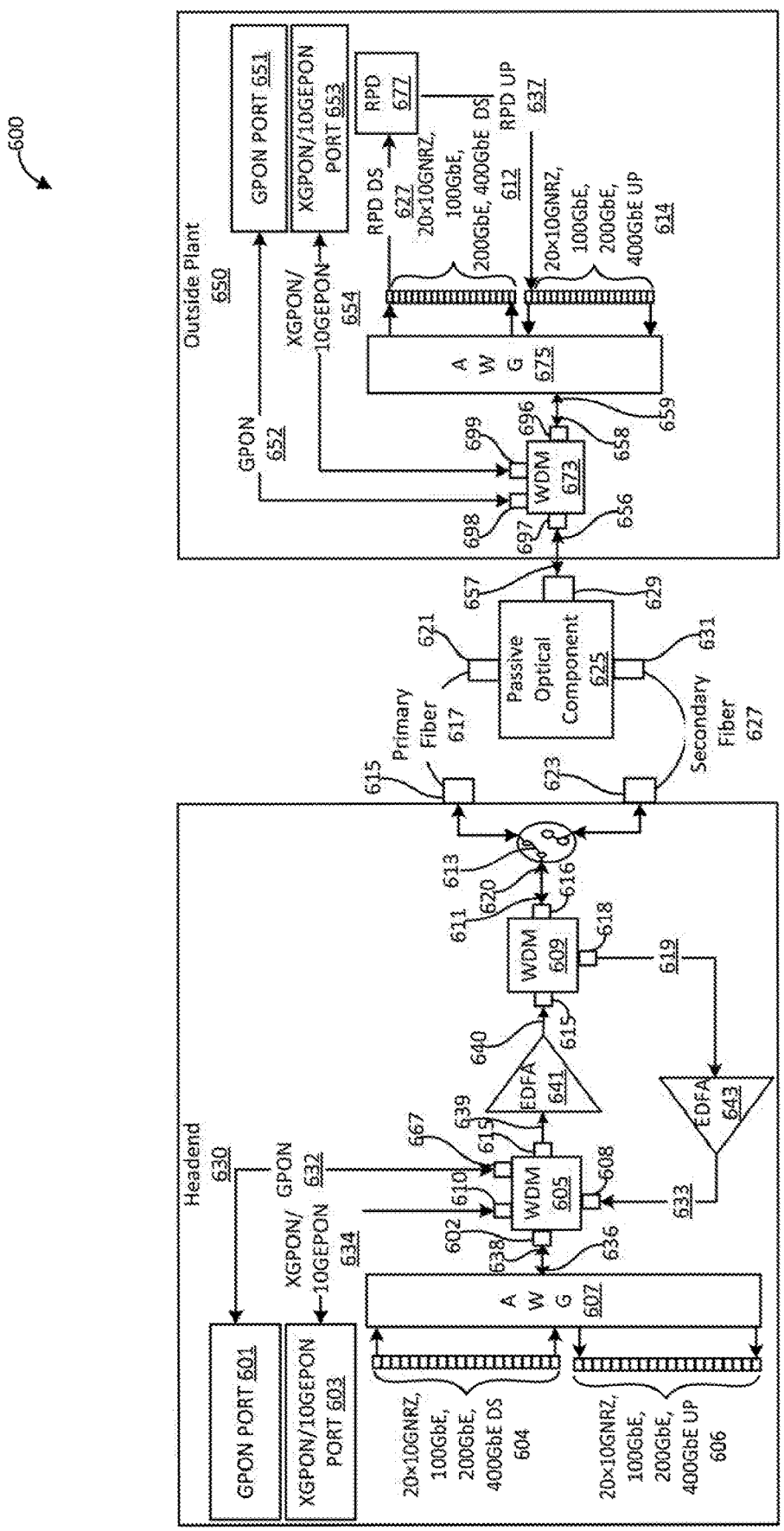
FIG. 6 depicts an access network diagram of an OCML headend and outside plant, in accordance with the disclosure.

FIG. 6 depicts an access network diagram of an OCML headend and outside plant, in accordance with the disclosure. FIG. 6 shows a schematic of an OCML headend according to at least one embodiment of the disclosure. As shown in FIG. 6, headend 630 is a smart integrated OCML headend, which is a circuit, comprising a AWG (e.g., AWG 607), a first WDM (e.g., WDM 605), a second WDM (e.g., WDM 609), a GPON port (e.g., GPON PORT 601), an XGPON/10GEPON port (e.g., XGPON/10GEPON PORT 603), a first EDFA (e.g., EDFA 641), a second EDFA (e.g., EDFA 643), and an optical switch 613 to feed a primary optical fiber (e.g., Primary Fiber 617) or secondary (backup) optical fiber (e.g., Secondary Fiber 627). AWG 607 may be similar in functionality to DWDM 106 and WDM 605 and WDM 609 may be similar in functionality to WDM 108. The disclosure provides a method of transporting multiple 10G NRZ, coherent 100 GbE, 200 GbE, and/or 400 GbE and GPON/XGPON/10GEPON signals on the same optical fiber over extended links of up to 60 kms without a cable company having to put optical amplifiers between the cable's Master Terminal Center (MTC) facility and a outside plant (e.g., Outside plant 650) or field hub. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 208 in FIG. 2).

In one aspect, headend 630 may comprise twenty 10G NRZ, coherent 100 GbE, 200 GbE, and/or 400 GbE downstream (DS) transponders (e.g., 20×10G NRZ, coherent 100 GbE, 200 GbE, and/or 400 GbE DS 604) and twenty 10G NRZ, coherent 100 GbE, 200 GbE, and/or 400 GbE upstream (UP) transponders (e.g., 20×10G NRZ, coherent 100 GbE, 200 GbE, and/or 400 GbE UP 606). 20×10G NRZ, coherent 100 GbE, 200 GbE, and/or 400 GbE DS 604 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 606 may receive upstream data over 10G NRZ, coherent 100 GbE, 200 GbE, and/or 400 GbE wavelengths. 20×10G NRZ, coherent 100 GbE, 200 GbE, and/or 400 GbE DS 504 may comprise the same elements and perform the same operations as 20×10G NRZ, coherent 100 GbE, 200 GbE, and/or 400 GbE DS 190, and 20×10G NRZ, coherent 100 GbE, 200 GbE, and/or 400 GbE UP 606 may comprise the same elements and perform the same operations as 20×10G NRZ, coherent 100 GbE, 200 GbE, and/or 400 GbE UP 188.

The operation of headend 630 may be described by way of the processing of downstream optical data signals transmitted from headend 630 to a outside plant (e.g., Outside plant 650) or field hub, and the processing of upstream optical data signals received from the field hub or outside plant. Each of the transponders of 20×10G NRZ, coherent 100 GbE, 200 GbE, and/or 400 GbE DS 604 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 604 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 604 may generate twenty corresponding second optical data signals each of which has a unique wavelength.

AWG 607 may receive the twenty corresponding second optical data signals as an input and output a multi-wavelength downstream optical data signal (e.g., 638) comprising the twenty corresponding second optical data signals onto a fiber. The multi-wavelength downstream optical data signal 638 may be a 10GNRZ, coherent 100 GbE, 200 GbE, and/or 400 GbE optical data signal. More specifically, AWG 607 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 638, may be input to WDM 605. WDM 605 may be a five port wave division multiplexer (WDM), or a five port circulator, that receives multi-wavelength downstream optical data signal 638 on port 602. WDM 605 may also receive an XGPON/10GEPON signal, carried on a first fiber (e.g., XGPON/10GEPON 634), on port 610, a GPON signal, carried on a second fiber (e.g., GPON 632), on port 667, and may multiplex multi-wavelength downstream optical data signal 638 with the XGPON/10GEPON and GPON signal. XGPON/10GEPON 634 may be a fiber carrying an XGPON/10GEPON optical data signal with a wavelength within the 1571 nm-1591 nm range. GPON 632 may be a fiber carrying a GPON optical data signal with a wavelength of 1490 nm or 1310 nm. WDM 605 outputs an egress optical data signal from port 615, which may be a multi-wavelength optical data signal comprising 10G NRZ, coherent 100 GbE, 200 GbE, and/or 400 GbE, XGPON/10GEPON, and/or GPON optical data signals. WDM 605 may multiplex multi-wavelength downstream optical data signal 638, the XGPON/10GEPON optical data signal, and GPON optical data signal the same way AWG 607 multiplexes optical data signals.

WDM 605 may output multi-wavelength downstream optical data signal 639 to an EDFA (e.g., EDFA 641). A gain of the EDFA may be based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, the EDFA may be adjusted based at least in part on the attenuation coefficient and length of fiber that the egress optical data signal will travel. More specifically, the gain EDFA 641 may be $G=e^{(2\alpha L)}$, where α is the fiber attenuation coefficient, as explained above, and L is the length of the fiber (e.g., the length of primary fiber 617 and/or the length of secondary fiber 627). Multi-wavelength downstream optical data signal 639 may be amplified by EDFA 641, and EDFA 641 may output multi-wavelength downstream optical data signal 640 to port 615 of WDM 609. WDM 609 outputs an egress optical data signal from port 616, which may be a multi-wavelength optical data signal comprising 10G NRZ, coherent 100 GbE, 200 GbE, and/or 400 GbE, XGPON/10GE-PON, and/or GPON optical data signals.

Egress optical data signal 620 by WDM 609 and optical switch 613 may switch egress optical data signal 620 onto primary fiber 617 or secondary fiber 627 depending on the position of switch 613. Egress optical data signal 620 may be transmitted on primary fiber 617 to port 621 at passive optical component 625, or may be transmitted on secondary fiber 627 to port 631 at passive optical component 625. Passive optical component 625 may output ingress optical data signal 656 from port 629 to port 697 at WDM 673.

Ingress optical data signal 656 may be received by WDM 673 via port 697. WDM 673 may demultiplex ingress optical data signal 656 into a mutli-wavelength downstream optical data signal 659, an XGPON/10GEPON optical data signal that may be output on port 699 onto a first fiber (e.g., XGPON/10GEPON 654), and/or a GPON optical data signal output on port 698 onto a second fiber (e.g., GPON 652). The XGPON/10GEPON optical data signal may be received on XGPON/10GEPON port 653 and the GPON optical data signal may be received on GPON port 651.

The multi-wavelength downstream optical data signal 659 may be output on port 696 and received by array waveguide gratings (AWG) AWG 675. The multi-wavelength downstream optical data signal 659 may comprise 10G NRZ, coherent 100 GbE, 200 GbE, and/or 400 GbE optical data signals. AWG 675 may demultiplex the multi-wavelength upstream optical data signal 659 into individual optical data signals in accordance with the individual wavelengths of the 10G NRZ, coherent 100 GbE, 200 GbE, and/or 400 GbE optical data signals. More specifically, the multi-wavelength downstream optical data signal 659 may be demultiplexed into twenty 10G NRZ, coherent 100 GbE, 200 GbE, and/or 400 GbE optical data signals, each of which may have a unique wavelength. AWG 675 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE DS 612. Each of the transponders of 20×10G NRZ, coherent 100 GbE, 200 GbE, and/or 400 GbE DS 612 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE DS 612 may transmit the twenty SONET/SDH optical data signals to a RPD (e.g., RPD 677) on the SONET/SDH optical network connection. In some embodiments, AWG 675 may output one or more 10G NRZ, coherent 100 GbE, 200 GbE, and/or 400 GbE optical data signals (e.g., RPD DS 627) RPD 677. RPD 677 may be similar to Remote PHY Node 207 in functionality. RPD 677 may convert the one or more 10G NRZ, coherent 100 GbE, 200 GbE, and/or 400 GbE optical data signals into an electrical signal that may be transmitted over one or more coaxial cables. RPD 617 may also convert one or more electrical signals into one or more 10G NRZ, coherent 100 GbE, 200 GbE, and/or 400 GbE optical data signal for transmission to a transponder (e.g., 20×10G NRZ, coherent 100 GbE, 200 GbE, and/or 400 GbE UP 614).

The operation of outside plant 650 may be further described by way of the processing of an upstream optical data signal transmitted to headend 630. Each of the transponders of 20×10G NRZ, coherent 100 GbE, 200 GbE, and/or 400 GbE UP 614 may receive a SONET/SDH optical data signal from RPD 677 and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE UP 614 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE UP 614 may generate twenty corresponding second optical data signals each of which has a unique wavelength.

AWG 675 may receive twenty corresponding second optical data signals as an input and output a multi-wavelength upstream optical data signal (e.g., multi-wavelength upstream optical data signal 658) comprising the twenty corresponding second optical data signals onto a fiber. In some embodiments, RPD 677 may transmit one or more 10G NRZ, coherent 100 GbE, 200 GbE, and/or 400GbEoptical data signals (e.g., RPD UP 637) to one or more of 20×10G NRZ, coherent 100 GbE, 200 GbE, and/or 400 GbE UP 614. RPD UP 637 may be 10G NRZ, coherent 100 GbE, 200 GbE, and/or 400 GbE optical data signals generated by RPD 677 in response to RPD 677 receiving electrical signals on coaxial cables connecting a remote physical (PHY) network (e.g., remote PHY network 216) to AWG 675. The multi-wavelength upstream optical data signal 658 may be a coherent 100 GbE, 200 GbE, and/or 400 GbE optical data signal. More specifically, AWG 675 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength upstream optical data signal 658, may be input to WDM 673. WDM 673 may be a four port wave division multiplexer (WDM), or a four port circulator, that receives multi-wavelength upstream optical data signal 658 on port 696. WDM 673 may also receive an XGPON/10GEPON signal, carried on a first fiber (e.g., XGPON/10GEPON 654), on port 699, a GPON signal, carried on a second fiber (e.g., GPON 652), on port 698, and may multiplex multi-wavelength upstream optical data signal 658 with the XGPON/10GEPON and GPON signal. XGPON/10GEPON 654 may be a fiber carrying an XGPON/10GEPON optical data signal with a wavelength within the 1571 nm-1591 nm range. GPON 652 may be a fiber carrying a GPON optical data signal with a wavelength of 1490 nm or 1310 nm. WDM 673 outputs an egress optical data signal from port 697, which may be a multi-wavelength optical data signal comprising 10G NRZ, coherent 100 GbE, 200 GbE, and/or 400 GbE, XGPON/10GEPON, and/or GPON optical data signals. WDM 673 may multiplex multi-wavelength upstream optical data signal 658, the XGPON/10GEPON optical data signal, and GPON optical data signal the same way AWG 675 multiplexes optical data signals. The egress optical data signal (e.g., egress optical data signal 657) may be output on port 697 of WDM 673 to port 629 of passive optical component 625. Passive optical component 625 may switch egress optical data signal 657 onto primary fiber 617 or secondary fiber 627 depending on a position of a switch in passive optical component 625. Egress optical data signal 657 may be transmitted on primary fiber 617 to a first port (e.g., port 615) at headend 630, or may be transmitted on secondary fiber 627 to a second port (e.g., port 623) at headend 630.

The operation of headend 630 may be further described by way of the processing of an upstream optical data signal received from outside plant 650. Egress optical data signal 657 may be received on the first or second connector at headend 630 based on a position of optical switch 613, as ingress optical data signal 611. That is ingress optical data signal 611 may be similar to egress optical data signal 657. Ingress optical data signal 611 may be received by WDM 609 via port 616.

WDM 609 may demultiplex ingress optical data signal 611 into a multi-wavelength upstream optical data signal 619. The multi-wavelength upstream optical data signal 619 may be output on port 618 and received by EDFA 643. The multi-wavelength upstream optical data signal 619 may comprise 10G NRZ, coherent 100 GbE, 200 GbE, and/or 400 GbE optical data signals. A gain associated EDFA 643 may be based at least in part on a distance that 10G NRZ, coherent 100 GbE, 200 GbE, and/or 400 GbE optical data signals have to travel, similar to that of EDFA 641. Multi-wavelength upstream optical data signal 619 may be amplified by EDFA 643, and EDFA 643 may output multi-wavelength upstream optical data signal 633 to WDM 605. WDM 605 may receive the multi-wavelength upstream optical data signal 633 on port 608 of WDM 605. WDM 605 may output multi-wavelength upstream optical data signal 636 which is substantially the same as multi-wavelength upstream optical data signal 633. WDM 605 may function as a circulator when receiving multi-wavelength upstream optical data signal 633 on port 608 and outputting multi-wavelength upstream optical data signal 636 on port 602. Multi-wavelength upstream optical data signal 636 may be received by AWG 607.

The multi-wavelength upstream optical data signal 636 may comprise 10G NRZ, coherent 100 GbE, 200 GbE, and/or 400 GbE optical data signals. AWG 607 may demultiplex the multi-wavelength upstream optical data signal 636 into individual optical data signals in accordance with the individual wavelengths of the 10G NRZ, coherent 100 GbE, 200 GbE, and/or 400 GbE optical data signals. More specifically, the multi-wavelength upstream optical data signal 636 may be demultiplexed into twenty 10G NRZ, coherent 100 GbE, 200 GbE, and/or 400 GbE optical data signals, each of which may have a unique wavelength. AWG 607 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 606. Each of the transponders of 20×10G NRZ, coherent 100 GbE, 200 GbE, and/or 400 GbE UP 606 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 606 may transmit the twenty SONET/SDH optical data signals to the MTC on the SONET/SDH optical network connection.

FIG. 7 depicts different passive optical network (PON) transceiver parameters associated with downstream transmitting circuits and upstream transmitting circuits, in accordance with the disclosure. Parameters 700, comprise a wavelength column (i.e., wavelength 701), a transmission (Tx) power column (i.e., Tx power 702), a dispersion penalty column (i.e., dispersion power 703), a loss budget column (i.e., loss budget 705), and a minimum receive power column (i.e., minimum receive power 709) for different passive optical network (PON) transceivers (i.e., GPON C+711, XGPON/10GEPON N2a 721, or XGPON/10GEPON N1 731).

Wavelength 701 may include the wavelength of a downstream optical data signal (i.e., downstream 712, downstream 722, and downstream 732) transmitted by each of PON transceivers GPON C+711, XGPON/10GEPON N2a 721, or XGPON/10GEPON N1 731 at an OCML headend to a corresponding PON transceiver at an outside plant. Wavelength 701 may include the wavelength of an upstream optical data signal (i.e., upstream 713, upstream 723, and upstream 733) received by each of PON transceivers GPON C+711, XGPON/10GEPON N2a 721, or XGPON/10GEPON N1 731 at an OCML headend from a corresponding PON transceiver at a outside plant. The downstream optical data signal may be an optical data signal sent from an OCML headend to a outside plant, as disclosed herein. The upstream optical data signal may be an optical data signal received at the OCML headend from an outside plant, as disclosed herein.

Tx power 702 may include the transmission power of the downstream optical data signal (i.e., downstream 712, downstream 722, and downstream 732) from each of PON transceivers GPON C+711, XGPON/10GEPON N2a 721, or XGPON/10GEPON N1 731 at an OCML headend to a corresponding PON transceiver at an outside plant. Tx power 702 may include the transmission power of the upstream optical data signal (i.e., upstream 713, downstream 723, and downstream 733) transmitted by each of PON transceivers GPON C+711, XGPON/10GEPON N2a 721, or XGPON/10GEPON N1 731 at an outside plant to a corresponding PON transceiver at an OCML headend.

Dispersion penalty 703 may include a power dispersion penalty associated with the downstream optical data signal (i.e., downstream 712, downstream 722, and downstream 732) being transmitted by each of PON transceivers GPON C+711, XGPON/10GEPON N2a 721, or XGPON/10GEPON N1 731 on a fiber from an OCML headend to a corresponding PON transceiver at a outside plant. Dispersion penalty 703 may include a power dispersion penalty associated with the upstream optical data signal (i.e., downstream 713, downstream 723, and downstream 733) being received by each of PON transceivers GPON C+711, XGPON/10GEPON N2a 721, or XGPON/10GEPON N1 731 at an OCML headend from a corresponding PON transceiver at a outside plant.

In some embodiments, an optical data signal may experience dispersion as it travels through an optical fiber. The dispersion penalty may be based at least in part on a bandwidth of the optical fiber, a dispersion constant for a given wavelength carrying the optical data signal, the length of the optical fiber, and a wavelength spread of a laser generating the optical data signal. More specifically the dispersion penalty may be determined by the expression $PP_D(B, D, L, \sigma_\lambda) = 5*\log[1 + 2*\pi*(B*D*L*\sigma_\lambda)^2]$. B is the bandwidth of the optical fiber carrying the optical data signal, D is the dispersion constant, L is the length of the optical fiber, and $\sigma_A$ is the wavelength spread of the laser. B and L may be constants that are determined during a design of fiber to the home (FTTH) network like the one depicted in FIG. 2. D may be based at least in part a zero dispersion wavelength for the optical data signal, a dispersion wavelength of the optical data signal, and a slope of the dispersion characteristic for the zero dispersion wavelength of the optical data signal. Specifically, D may be equal to $$\frac{S_0}{4} * \left(\lambda - \frac{\lambda_0^4}{\lambda^3}\right),$$

wherein $S_0$ is the slope of the dispersion characteristic for the zero dispersion wavelength ($\lambda_0$) of the optical data signal. The zero dispersion wavelength may be the wavelength at which material dispersion and waveguide dispersion cancel one another out. $\lambda$ may be the dispersion wavelength of the optical data signal. The units of $S_0$ may be picoseconds per the product of nanometers squared and kilometer $$\left(\text{i.e., } \frac{\text{ps}}{\text{nm}^2 * \text{km}}\right).$$

Loss budget 705 may include a loss budget associated with the downstream optical data signal (i.e., downstream 712, downstream 722, and downstream 732) being transmitted by each of PON transceivers GPON C+711, XGPON/10GEPON N2a 721, or XGPON/10GEPON N1 731 at an OCML headend to a corresponding PON transceiver at a outside plant along a fiber connecting the OCML headend and outside plant. Loss budget 705 may include a loss budget associated with the upstream optical data signal (i.e., downstream 713, downstream 723, and downstream 733) being received by each of PON transceivers GPON C+711, XGPON/10GEPON N2a 721, or XGPON/10GEPON N1 731 at an OCML headend from a corresponding PON transceiver at a outside plant along a fiber connecting the OCML headend and outside plant.

Minimum receive power 709 may include a minimum receive power necessary for each of PON transceivers GPON C+711, XGPON/10GEPON N2a 721, or XGPON/10GEPON N1 731, at a outside plant, to correctly decode one or more bits received from a corresponding PON transceiver at an OCML headend in a downstream optical data signal (i.e., downstream 712, downstream 722, and downstream 732). For instance, a minimum receive power level may be necessary for each of PON transceivers GPON C+711, XGPON/10GEPON N2a, or XGPON/10GEPON N1 731 to correctly detect a bit value of "1", at the outside plant, when a bit value of "1" is transmitted by a corresponding PON transceiver at an OCML headend. Minimum receive power 709 may include a minimum receive power necessary for each of PON transceivers GPON C+711, XGPON/10GEPON N2a, at an OCML headend, to correctly decode one or more bits received from a corresponding transceiver at a outside plant in an upstream optical data signal. For instance, a minimum receive power level may be necessary for each of PON transceivers GPON C+711, XGPON/10GEPON N2a, or XGPON/10GEPON N1 731 to correctly detect a bit value of "1", at the OCML headend, when a bit value of "1" is transmitted by a corresponding PON transceiver at the outside plant.

In some embodiments, a GPON C+ transceiver (i.e., GPON C+711), at an OCML headend, may transmit a downstream (i.e., downstream 712) optical data signal with a wavelength (i.e., wavelength 701) of 1490 nanometers, a Tx power (i.e., Tx power 702) between 3 and 7 decibel-milliwatts, a dispersion penalty (i.e., dispersion penalty 703) of 1 decibel, a loss budget (i.e., loss budget 705) of 32 decibels, and a minimum receive power (i.e., minimum receive power 709) of −30 decibels to a GPON C+ transceiver at a outside plant.

In some embodiments, a GPON C+ transceiver (i.e., GPON C+711), at a outside plant, may transmit an upstream (i.e., upstream 713) optical data signal, with a wavelength (i.e., wavelength 701) of 1310 nanometers, a Tx power (i.e., Tx power 702) between 0.5 and 5 decibel-milliwatts, a dispersion penalty (i.e., dispersion penalty 703) of 0.5 decibel, a loss budget (i.e., loss budget 705) of 32 decibels, and a minimum receive power (i.e., minimum receive power 709) of −32 decibels to a GPON C+ transceiver at an OCML headend.

In some embodiments, an XGPON/10GEPON N2a transceiver (i.e., XGPON/10GEPON N2a 721), at an OCML headend, may transmit a downstream (i.e., downstream 722) optical data signal with a wavelength (i.e., wavelength 701) of 1575 nanometers, a Tx power (i.e., Tx power 702) between 4 and 8 decibel-milliwatts, a dispersion penalty (i.e., dispersion penalty 703) of 1 decibel, a loss budget (i.e., loss budget 705) of 31 decibels, and a minimum receive power (i.e., minimum receive power 709) of −28 decibels to an XGPON/10GEPON N2a transceiver at a outside plant.

In the same, or a similar embodiment, an XGPON/10GEPON N2a transceiver (i.e., XGPON/10GEPON N2a 721), at a outside plant, may transmit an upstream (i.e., upstream 723) optical data signal, with a wavelength (i.e., wavelength 701) of 1270 nanometers, a Tx power (i.e., Tx power 702) between 2 and 7 decible-milliwatts, a dispersion penalty (i.e., dispersion penalty 703) of 0.5 decibel, a loss budget (i.e., loss budget 705) of 31 decibels, and a minimum receive power (i.e., minimum receive power 709) of −29.5 decibels to an XGPON/10GEPON N2a transceiver at an OCML headend.

In some embodiments, an XGPON/10GEPON N1 transceiver (i.e., XGPON/10GEPON N1 731), at an OCML headend, may transmit a downstream (i.e., downstream 732) optical data signal with a wavelength (i.e., wavelength 701) of 1575 nanometers, a Tx power (i.e., Tx power 702) between 2 and 6 decibel-milliwatts, a dispersion penalty (i.e., dispersion penalty 703) of 1 decibel, a loss budget (i.e., loss budget 705) of 31 decibels, and a minimum receive power (i.e., minimum receive power 709) of −28 decibels to an XGPON/10GEPON N1 transceiver at a outside plant.

In the same, or a similar embodiment, an XGPON/10GEPON N1 transceiver (i.e., XGPON/10GEPON N1 731), at an outside plant, may transmit an upstream (i.e., upstream 733) optical data signal, with a wavelength (i.e., wavelength 701) of 1270 nanometers, a Tx power (i.e., Tx power 702) between 2 and 7 decibel-milliwatts, a dispersion penalty (i.e., dispersion penalty 703) of 0.5 decibel, a loss budget (i.e., loss budget 705) of 29 decibels, and a minimum receive power (i.e., minimum receive power 709) of −27.5 decibels to an XGPON/10GEPON N1 transceiver at an OCML headend.

Figure 8:
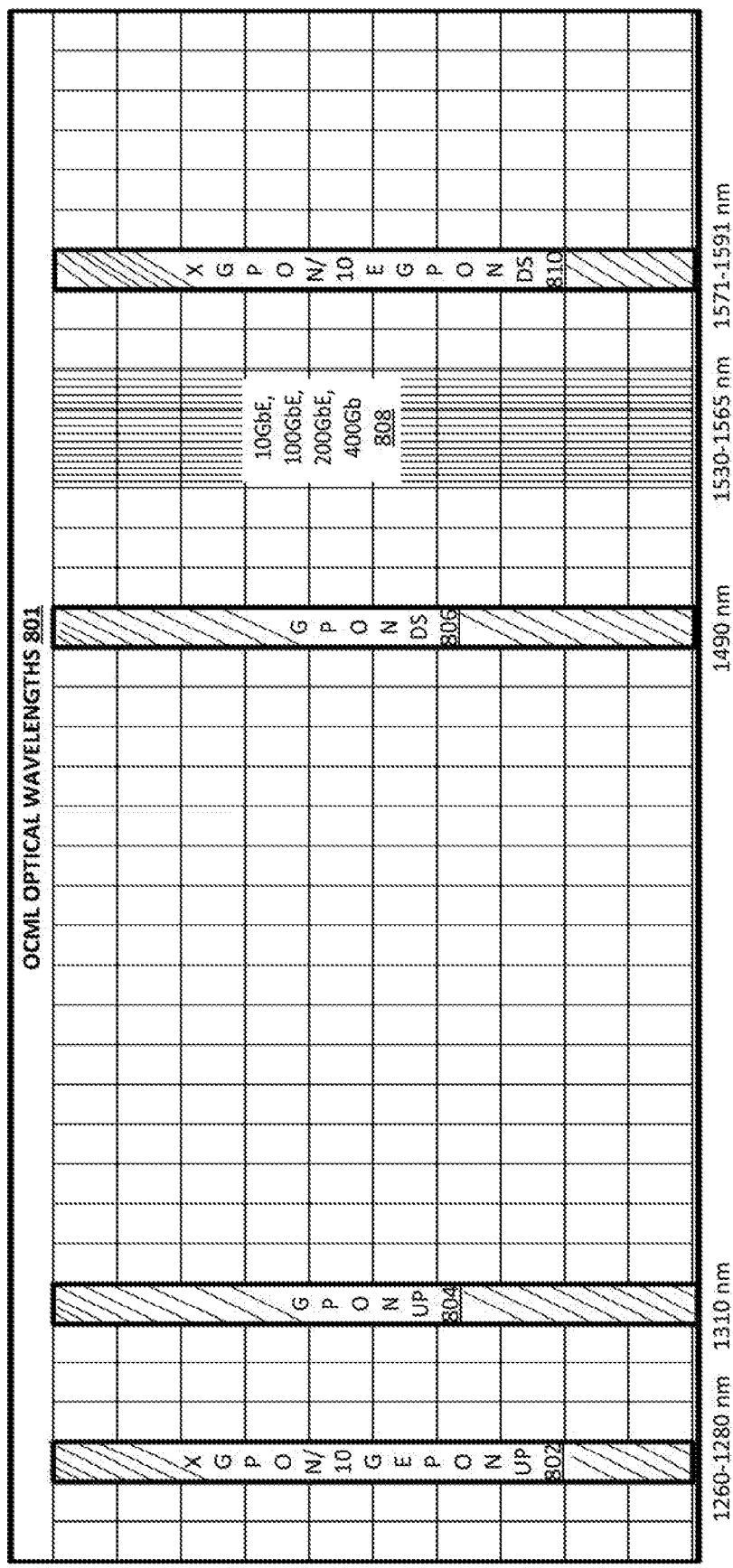
FIG. 8 depicts a graphical representation of wavelengths used to transport one or more signals, in accordance with the disclosure.

FIG. 8 depicts a graphical representation of wavelengths used to transport one or more signals, in accordance with the disclosure. OCML optical wavelengths 801 illustrate the different wavelengths of the optical data signals described herein. For GPON optical data signals disclosed herein, a wavelength of 1310 nm may be used to transmit an upstream GPON optical data signal from a outside plant to an OCML headend. For GPON optical data signals disclosed herein, a wavelength of 1490 nm may be used to transmit a downstream GPON optical data signal from the OCML headend to the outside plant. For 10G NRZ, coherent 100 GbE, 200 GbE, and/or 400 GbE optical data signals disclosed herein, a wavelength between 1530 and 1565 nm may be used to transmit an upstream 10G NRZ, coherent 100 GbE, 200 GbE, and/or 400 GbE optical data signal to the OCML headend from the outside plant, and to transmit a downstream 10G NRZ, coherent 100 GbE, 200 GbE, and/or 400 GbE optical data signal to the outside plant from the OCML headend. In some embodiments, the upstream XGPON/10GEPON optical data signals disclosed herein may have wavelengths between 1260 nm and 1280 nm (e.g., XGPON/10GEPON 802). In some embodiments, the downstream XGPON/10GEPON optical data signals disclosed herein may have wavelengths between 1571 nm and 1591 nm.

Figure 9:
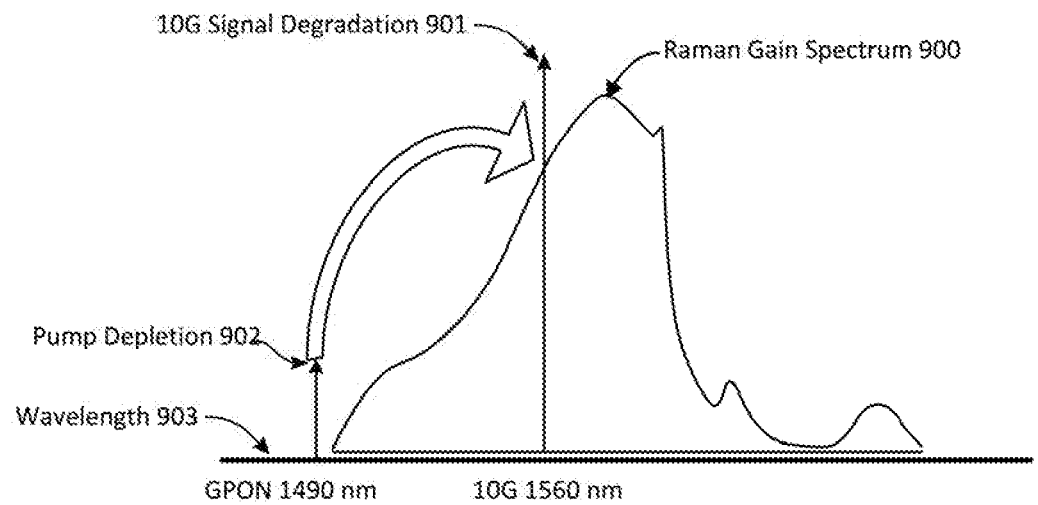
FIG. 9 a stimulated Raman scattering (SRS) diagram, in accordance with the disclosure.

FIG. 9 depicts a stimulated Raman scattering (SRS) diagram, in accordance with the disclosure. Raman gain spectrum 900 may be Raman gain coefficients for an optical fiber comprised of silica and Germania-oxide (GeO$_2$). Raman gain spectrum 900 may be a plot of Raman gain coefficients against different wavelengths (i.e., wavelength 903). SRS is a nonlinear process where higher frequency optical channels are depleted and lower frequency optical channels are amplified. With each optical channel being modulated, the intensity of higher frequency optical data signals modulate the intensity of lower frequency optical data signals. As a result, SRS may lead to optical crosstalk between channels. The optical crosstalk due to SRS may be referred to as SRS optical crosstalk, and may be defined by the following expression $$XT_{SRS,i} = P^2 \sum_{k \neq i} \frac{g_{i,k}^2}{\Delta_{eff}} \left( (1-e^{-\alpha L})^2 + 4e^{-\alpha L}\sin^2\left(\frac{\Omega d_{i,k} L}{2}\right) \right) \Big/ (\alpha^2 + \Omega^2 d_{i,k}^2).$$

That is the optical crosstalk experienced on a channel "i" ($XT_{SRS,i}$) is based at least in part on the square of the optical fiber launch power per channel (P) at which an optical data signal is transmitted. The optical crosstalk may also based at least in part on Raman gain coefficients ($g_{i,k}^2$) between channel "i" and a channel "k". The Raman gain coefficients may be based at least in part on a Raman gain slope and the frequency at which optical data signals on channel "i" are propagating and the frequency at which optical data signals on channel "k" are propagating. The optical crosstalk may also be based at least in part on a fiber loss (a) and length (L) of the optical fiber. The optical crosstalk may also be based at least in part on a subcarrier modulation frequency (Ω) and a group velocity mismatch between optical data signals propagating on channel "i" and optical data signals propagating on channel "k" ($d_{i,k}$).

Depending on the wavelength separation between the optical data signals propagating on channel "i" and the optical data signals propagating on channel "k", polarization states of the optical data signals in channels "i" and "k", the optical fiber launch powers for channels "i" and "k" SRS optical crosstalk may occur which depletes shorter (pump depletion 902) wavelengths (e.g., GPON 1490 nm) and amplifies the higher (stokes) wavelengths resulting in signal degradation for certain optical data signals (e.g., coherent 100 GbE, 200 GbE, and/or 400 GbE optical data signal degradation 901). In some embodiments, the effect is on lower RF frequencies carried on longer wavelength optical data signals. Because of this interference from a GPON optical data signal with a wavelength of 1490 nm may cause interference or signal degradation of a 10G NRZ, coherent 100 GbE, 200 GbE, and/or 400 GbE optical data signal with a wavelength of 1560 nm. In some embodiments, the SRS optical crosstalk may be 35 dB which may result in a tolerable BER.

Figure 10:
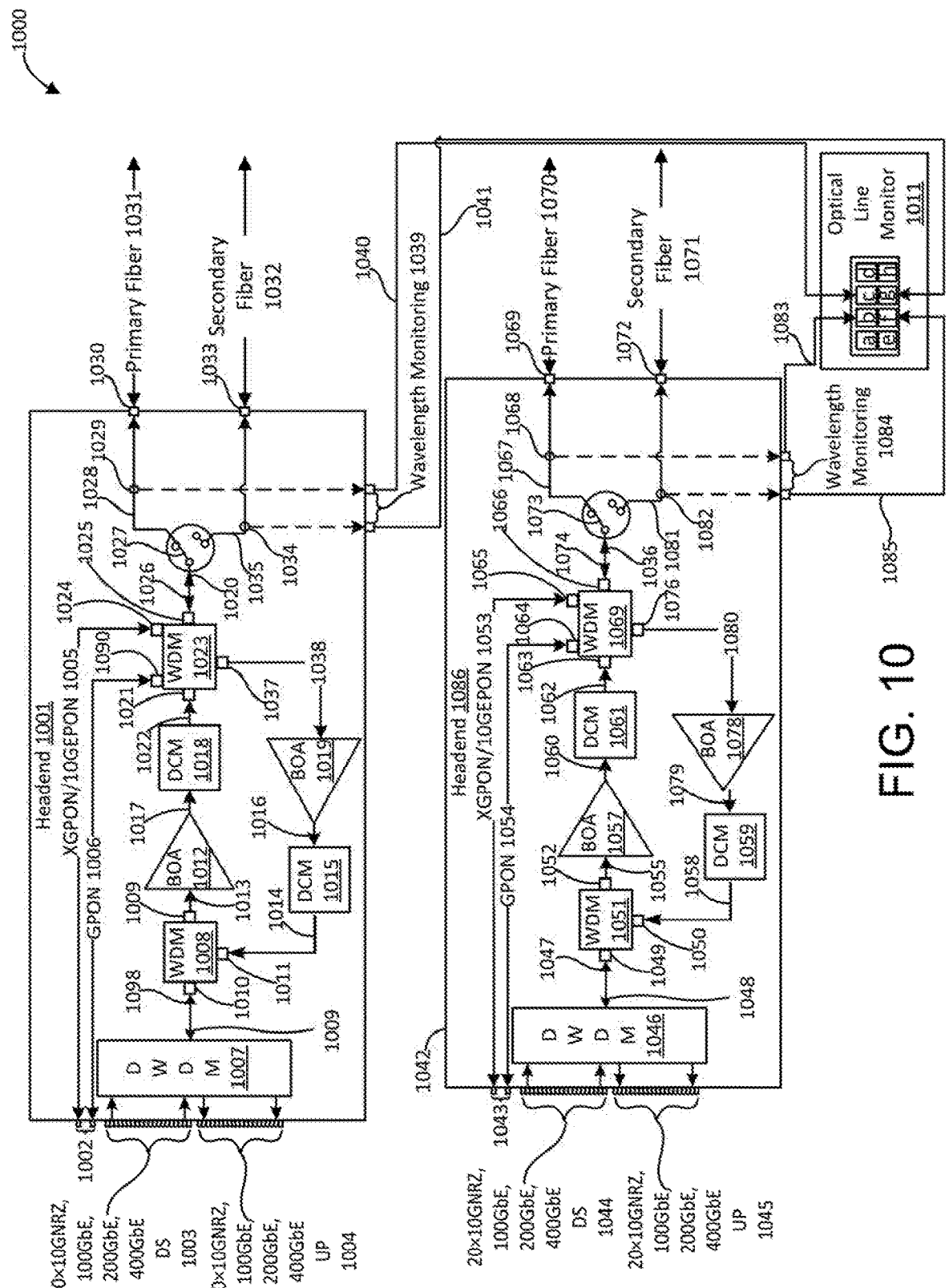
FIG. 10 depicts a schematic illustration of wavelength and optical fiber monitoring of cascaded OCML headends in accordance with the disclosure.

FIG. 10 depicts a schematic illustration of wavelength and optical fiber monitoring of cascaded OCML headends in accordance with the disclosure. Headend 1001 is a smart integrated OCML headend, which is a circuit, comprising one or more EDFAs (e.g., Booster Optical amplifiers 1012 and 1019), a DWDM (e.g., DWDM 1007), one or more WDMs (e.g., WDM 1008 and 1023), one or more DCMs (e.g., DCM 1018 and 1015), and an optical switch 1027 to feed a primary optical fiber (e.g., Primary Fiber 1031) or secondary (backup) optical fiber (e.g., Secondary Fiber 1032). The OCML headend may be located in a secondary terminal center (STC) that connects the MTC facility to a outside plant or field hub housing a multiplexer-demultiplexer (MDM) (e.g., MDM 208 in FIG. 2).

In one aspect, headend 1001 may comprise twenty 10G NRZ, coherent 100 GbE, 200 GbE, and/or 400 GbE downstream (DS) transponders (e.g., 20×10G NRZ, coherent 100 GbE, 200 GbE, and/or 400 GbE DS 1003) and twenty 10G NRZ, coherent 100 GbE, 200 GbE, and/or 400 GbE upstream (UP) transponders (e.g., 20×10G NRZ, coherent 100 GbE, 200 GbE, and/or 400 GbE UP 1004). 20×10G NRZ, coherent 100 GbE, 200 GbE, and/or 400 GbE DS 1003 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 1004 may receive upstream data over 10G NRZ, coherent 100 GbE, 200 GbE, and/or 400 GbE wavelengths. Headend 1001 may comprise two PON 1002 connectors, one of which may be a GPON connector (e.g., GPON 1006) and one of which may be an XGPON/10GEPON connector (e.g., XGPON/10GEPON 1005). Headend 1001 may also comprise two wavelength-monitoring ports (e.g., wavelength-monitoring ports 1039), a primary optical fiber (e.g., primary optical fiber 1031) and a secondary optical fiber (e.g., secondary optical fiber 1032) that transmit and receive a plurality of multi-wavelength 10G NRZ, coherent 100 GbE, 200 GbE, and/or 400 GbE and GPON/XGPON/10GE-PON optical signals. Primary optical fiber 1031 and secondary optical fiber 1032 may transmit a first plurality of multi-wavelength coherent 100 GbE, 200 GbE, and/or 400 GbE, GPON, and/or XGPON/10GEPON optical signals from headend 1001 to a outside plant (not illustrated in FIG. 10), and may receive a second plurality of multi-wavelength 10G NRZ, coherent 100 GbE, 200 GbE, and/or 400 GbE, GPON, and/or XGPON/10GEPON optical signals from the outside plant.

The operation of headend 1001 may be described by way of the processing of downstream optical data signals transmitted from headend 1001 to a field hub or outside plant, and the processing of upstream optical data signals received from the field hub or outside plant. Each of the transponders of 20×10G NRZ, coherent 100 GbE, 200 GbE, and/or 400 GbE DS 1003 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 1003 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 1003 may generate twenty corresponding second optical data signals each of which has a unique wavelength.

DWDM 1007 may receive the twenty corresponding second optical data signals as an input and output a multi-wavelength downstream optical data signal (e.g., 10G NRZ, coherent 100 GbE, 200 GbE, and/or 400 GbE DS 1098) comprising the twenty corresponding second optical data signals onto a fiber. More specifically, DWDM 1007 may multiplex the twenty corresponding second optical data signals onto the fiber, wherein the twenty multiplexed corresponding second optical data signals compose the multi-wavelength downstream optical data signal. The multi-wavelength downstream optical data signal may have a wavelength comprising the twenty wavelengths of the twenty corresponding second optical data signals.

The multi-wavelength downstream optical data signal 10G NRZ, coherent 100 GbE, 200 GbE, and/or 400 GbE DS 1098, may be input to a WDM (e.g. WDM 1008). WDM 1008 may be a three port wave division multiplexer (WDM), or a three port circulator, that receives 10G NRZ, coherent 100 GbE, 200 GbE, and/or 400 GbE DS 1098 on port 1010 and outputs 10G NRZ, coherent 100 GbE, 200 GbE, and/or 400 GbE DS 1098 on port 1009 as 10G NRZ, coherent 100 GbE, 200 GbE, and/or 400 GbE DS 1013. 10G NRZ, coherent 100 GbE, 200 GbE, and/or 400 GbE DS 1013 may be substantially the same as 10G NRZ, coherent 100 GbE, 200 GbE, and/or 400 GbE DS 1098 because WDM 1008 may function as a circulator when 10G NRZ, coherent 100 GbE, 200 GbE, and/or 400 GbE DS 1098 is input on port 1010.

WDM 10G NRZ, coherent 100 GbE, 200 GbE, and/or 400 GbE DS 1013 may be input to an EDFA (e.g., booster optical amplifier 1012). A gain of the booster optical amplifier (e.g., booster optical amplifier 1012) may be based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, the gain of booster optical amplifier 1012 may be adjusted based at least in part on the attenuation coefficient and length of fiber that the egress optical data signal will travel. More specifically, the gain of booster optical amplifier 1012 may be $G=e^{(2\alpha L)}$, where a is the fiber attenuation coefficient, as explained above, and L is the length of the fiber (e.g., the length of primary fiber 1031 and/or the length of secondary fiber 1032). 10G NRZ, coherent 100 GbE, 200 GbE, and/or 400 GbE DS 1013 may be amplified by booster optical amplifier 1012, and booster optical amplifier 1012 may output 10G NRZ, coherent 100 GbE, 200 GbE, and/or 400 GbE DS 1017 to DCM 1018.

10G NRZ, coherent 100 GbE, 200 GbE, and/or 400 GbE DS 1017 may be input into a DCM (e.g., DCM 1012) to compensate for dispersion that 10G NRZ, coherent 100 GbE, 200 GbE, and/or 400 GbE DS 1017 may experience after being amplified by an EDFA and multiplexed by a WDM, with other optical data signals, that are downstream from the DCM. The amplified and multiplexed optical data signal may be referred to as an egress optical data signal, as it is the optical data signal that may be transmitted out of headend 1001 over a fiber connecting headend 1001 to a field hub or outside plant. In some embodiments, DCM 1018 may be configured to balance positive and/or negative dispersion that may be introduced to the egress optical data signal by the fiber. In some embodiments, DCM 1018 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 1018 may be configured to reduce the sensitivity or OSNR level requirement in a photodetector or fiber-optic sensor in the transceiver, which may drastically reduce the cost of the transceivers used in the DWDM located at the field hub or outside plant.

WDM 1023 may be a WDM that may multiplex 10G NRZ, coherent 100 GbE, 200 GbE, and/or 400 GbE DS 1022 with one or more PON signals carried on XGPON/10GEPON 1005 and GPON 1006. 10G NRZ, coherent 100 GbE, 200 GbE, and/or 400 GbE DS 1022 may be a multi-wavelength optical data signal, wherein the wavelengths comprise the same wavelengths as 10G NRZ, coherent 100 GbE, 200 GbE, and/or 400 GbE DS 1022. In some embodiments, the wavelengths of the multi-wavelength optical data signal 10G NRZ, coherent 100 GbE, 200 GbE, and/or 400 GbE DS 1022 may be within the conventional c band of wavelengths, which may include wavelengths within the 1520 nm-1565 nm range. XGPON/10GEPON 1005 may be a fiber carrying an XGPON/10GEPON optical data signal with a wavelength within the 1571 nm-1591 nm or 1260 nm-1280 nm range. GPON 1006 may be a fiber carrying a GPON optical data signal with a wavelength of 1490 nm or 1310 nm. The XGPON/10GEPON optical signal may be input to WDM 1023 on port 1021 and the GPON optical signal may be input to WDM 110 on port 160. WDM 1023 outputs an egress optical data signal from port 1025, which may be a multi-wavelength optical data signal comprising 10G NRZ, coherent 100 GbE, 200 GbE, and/or 400 GbE, XGPON/10GEPON, and GPON optical data signals. WDM 1023 may multiplex 10G NRZ, coherent 100 GbE, 200 GbE, and/or 400 GbE DS 1022, the XGPON/10GEPON optical data signal, and GPON optical data signal the same way DWDM 1007 multiplexes optical data signals. The egress optical data signal (e.g., egress optical data signal 1020) may be output on port 1025 of WDM 1023 and optical switch 1027 may switch egress optical data signal 1020 out of connector 1029 or connector 1034. In some embodiments, connector 1029 may be a primary connector and connector 1034 may be a secondary connector or a backup connector. Wavelength monitoring connector 1039 may connect connector 1028 to a first port of wavelength-monitoring ports 1039, and wavelength monitoring connector 1034 may connect connector 1035 to a second port of wavelength-monitoring ports 1039. Wavelength-monitoring ports 1039 may monitor the wavelengths in egress optical data signal 1020 via connector 1029 or connector 1034 depending on the position of switch 1027. Egress optical data signal 1020 may exit headend 1001 either via connector 1030 connected to primary fiber 1031 or via connector 1033 connected to secondary fiber 1032 depending on the position of switch 1027. Egress optical data signal 1020 may be transmitted on primary fiber 1031 to a first connector in the field hub or outside plant, or may be transmitted on secondary fiber 1032 to a second connector in the field hub or outside plant. The field hub or outside plant may include a MDM with the first connector and the second connector.

The operation of headend 1001 may be described by way of the processing of upstream optical data signals received at headend 1001 from a field hub or outside plant. For instance, a multi-wavelength ingress optical data signal, comprising one or more of a 10G NRZ, coherent 100 GbE, 200 GbE, and/or 400 GbE optical data signal, XGPON/10GEPON optical data signal, and/or GPON optical data signal, may be an upstream optical data signal received on primary fiber 1031 or secondary fiber 1032 depending on the position of switch 1027. Because the multi-wavelength ingress optical data signal is routed to port 1025 of WDM 1023, and is altered negligibly between connector 1028 and port 1025 or connector 1035 and port 1025, depending on the position of switch 1027, the multi-wavelength ingress optical data signal may be substantially the same as ingress optical data signal 1026. The multi-wavelength ingress optical data signal may traverse connector 1028 and switch 1027, before entering WDM 1023 via port 1025 if switch 1027 is connected to connector 1028. The multi-wavelength ingress optical data signal may traverse connector 1035 and switch 1027, before entering WDM 1023 via port 1025 if switch 1027 is connected to connector 1350. WDM 1023 may demultiplex one or more 10G NRZ, coherent 100 GbE, 200 GbE, and/or 400 GbE optical data signals, XGPON/10GEPON optical data signals, and/or GPON optical data signals from ingress optical data signal 1026. WDM 1023 may transmit the one or more XGPON/10GEPON optical data signals along XGPON/10GEPON 1005 to one of PON connectors 1002 via port 1024. WDM 1023 may transmit the one or more GPON optical data signals along GPON 1006 to one of PON connectors 1002 via port 1021. WDM 1023 may transmit the one or more 10G NRZ, coherent 100 GbE, 200 GbE, and/or 400 GbE optical data signals (e.g., signal 1038) out of port 1037 to BOA 1019.

A gain of BOA 1019 may be based at least in part on a distance that the SONET/SDH egress optical data signal has to travel. For example, the gain may be a function of a fiber attenuation coefficient α, which is a measure of the intensity of the attenuation of a beam of light as it traverses a length of an optical fiber segment on the SONET/SDH optical network connection. For instance, the gain of BOA 1019 may be adjusted based at least in part on the attenuation coefficient and length of fiber that the egress optical data signal will travel. More specifically, the gain of BOA 1019 may be $G=e^{(2\alpha L)}$, where a is the fiber attenuation coefficient, as explained above, and L is the length of the fiber (e.g., the length of the fiber of the SONET/SDH optical network connection). Signal 10G NRZ, coherent 100 GbE, 200 GbE, and/or 400 GbE 1038 may be amplified by BOA 1019, and BOA 1019 may output 10G NRZ, coherent 100 GbE, 200 GbE, and/or 400 GbE UP 1014 to DCM 1015.

The wavelength of 10G NRZ, coherent 100 GbE, 200 GbE, and/or 400 GbE UP 1014 may be within the conventional c band of wavelengths, which may include wavelengths within the 1520 nm-1565 nm range. The one or more XGPON/10GEPON optical data signals may have a wavelength within the 1571 nm-1591 nm or 1260 nm-1280 nm range, and the one or more GPON optical data signals may have a wavelength of 1490 nm.

In some embodiments, DCM 1015 may be configured to balance positive and/or negative dispersion that may be introduced to a SONET/SDH egress optical data signal that may enter headend 1001 from 20×10G NRZ, coherent 100 GbE, 200 GbE, and/or 400 GbE UP 1004. The SONET/SDH egress optical data signal may be an upstream signal from a field hub or outside plant destined for a MTC. For example, a customer premise may be connected to the field hub or outside plant and may send one or more packets via a SONET/SDH network to the field hub or outside plant which may in turn transmit the one or more packets using 10G NRZ, coherent 100 GbE, 200 GbE, and/or 400 GbE optical data signals to headend 1001. The one or more packets may be destined for a company web server connected to the MTC via a backbone network. Because headend 1001 may be collocated in a STC that is connected to the MTC via an optical ring network, wherein the connection between the STC and MTC is an SONET/SDH optical network connection, DCM 1015 may be configured to compensate for positive and/or negative dispersion on the SONET/SDH optical network connection. That is DCM 1015 may be configured to reduce temporal broadening of the SONET/SDH egress optical data signal or temporal contraction of the SONET/SDH egress optical data signal. DCM 1015 may input 10G NRZ, coherent 100 GbE, 200 GbE, and/or 400 GbE UP 1016 and my output 10G NRZ, coherent 100 GbE, 200 GbE, and/or 400 GbE UP 1014 to WDM 1008.

WDM 1008 may receive 10G NRZ, coherent 100 GbE, 200 GbE, and/or 400 GbE UP 1014 on port 1011, and may output 10G NRZ, coherent 100 GbE, 200 GbE, and/or 400 GbE UP 1009 on port 1010 as a multi-wavelength upstream optical data signal (e.g., 10G NRZ, coherent 100 GbE, 200 GbE, and/or 400 GbE UP 1009). 10G NRZ, coherent 100 GbE, 200 GbE, and/or 400 GbE UP 1098 is substantially the same as 10G NRZ, coherent 100 GbE, 200 GbE, and/or 400 GbE UP 1014 because WDM 1008 may function as a circulator when 10G NRZ, coherent 100 GbE, 200 GbE, and/or 400 GbE UP 1014 is input to port 1011. 10G NRZ, coherent 100 GbE, 200 GbE, and/or 400 GbE UP 1009 may be received by DWDM 1007, and DWDM may demultiplex one or more 10G NRZ, coherent 100 GbE, 200 GbE, and/or 400 GbE optical data signals from 10G NRZ, coherent 100 GbE, 200 GbE, and/or 400 GbE UP 1009. Because 10G NRZ, coherent 100 GbE, 200 GbE, and/or 400 GbE UP 1009 is a dispersion compensated amplified version of the multi-wavelength ingress optical data signal, DWDM 1007 may demultiplex the one or more optical data signals into individual optical data signals in accordance with the individual wavelengths of any coherent 100 GbE, 200 GbE, and/or 400 GbE optical data signals in the multi-wavelength ingress optical data signal. More specifically, 10G NRZ, coherent 100 GbE, 200 GbE, and/or 400 GbE UP 1009 may be demultiplexed into twenty 10G NRZ, coherent 100 GbE, 200 GbE, and/or 400 GbE optical data signals, each of which may have a unique wavelength. DWDM 1007 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 1004. Each of the transponders of 20×10G NRZ, coherent 100 GbE, 200 GbE, and/or 400 GbE UP 1004 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 1014 may transmit the twenty SONET/SDH optical data signals to the MTC on the SONET/SDH optical network connection.

Headend 1086 and the components therein may be similar in function to the components in headend 1001. Optical line monitor 1011 ports c and g may be connected to wavelength-monitoring ports 1039 and optical line monitor 1011 ports b and f may be connected to wavelength-monitoring ports 1084. Optical line monitor 1011 may be a device that monitors egress optical data signals transmitted on primary fiber 1031 or primary fiber 1070 and ingress optical data signals received on primary fiber 1031 or primary fiber 1070. Optical line monitor 1011 may also monitor egress optical data signals transmitted on secondary fiber 1032 or secondary fiber 1071 and ingress optical data signals received on secondary fiber 1032 or secondary fiber 1071.

Figure 11:
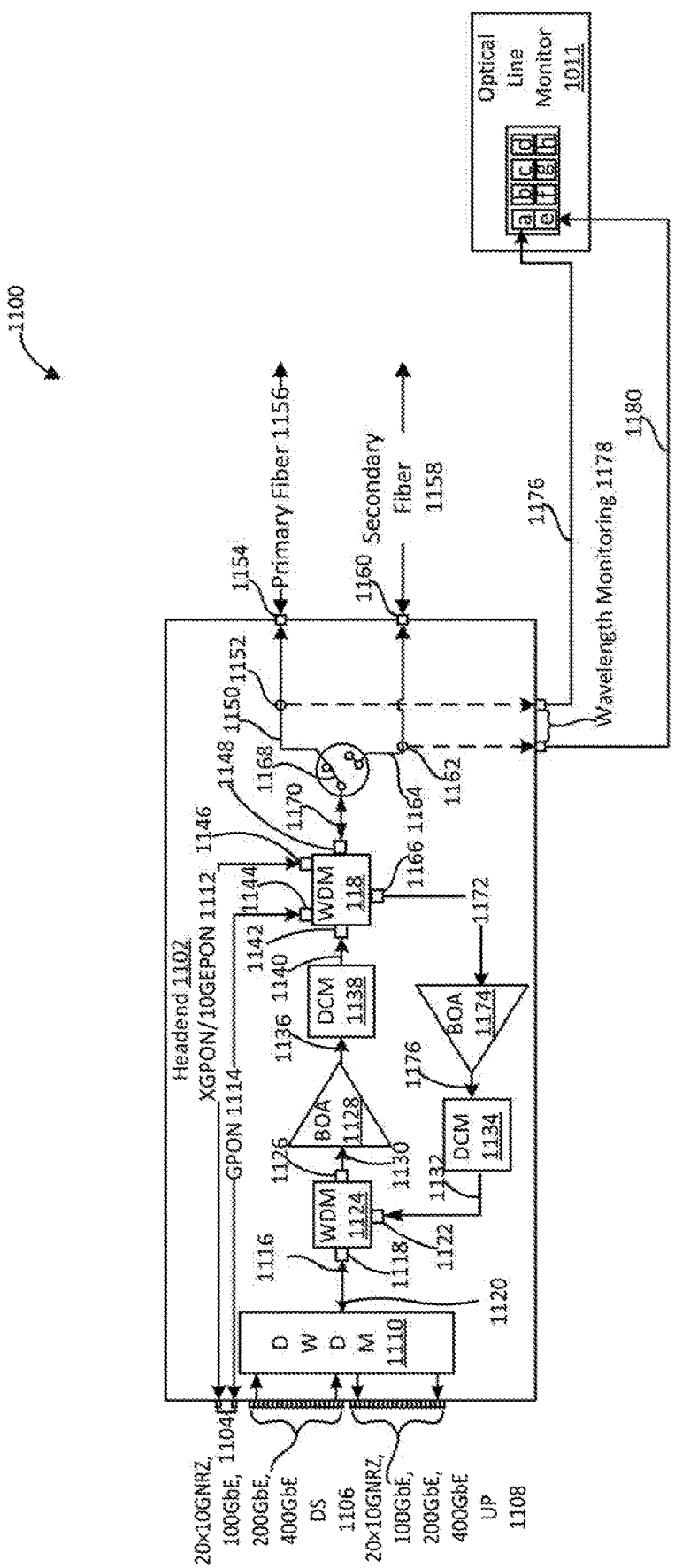
FIG. 11 a schematic illustration of wavelength and optical fiber monitoring of an OCML headend in accordance with the disclosure.

FIG. 11 a schematic illustration of wavelength and optical fiber monitoring of an OCML headend in accordance with the disclosure. Headend 1102 and the components therein may be similar in function to the components in headend 1001. Optical line monitor 1011 ports a and e may be connected to wavelength-monitoring ports 1178.

Figure 12:
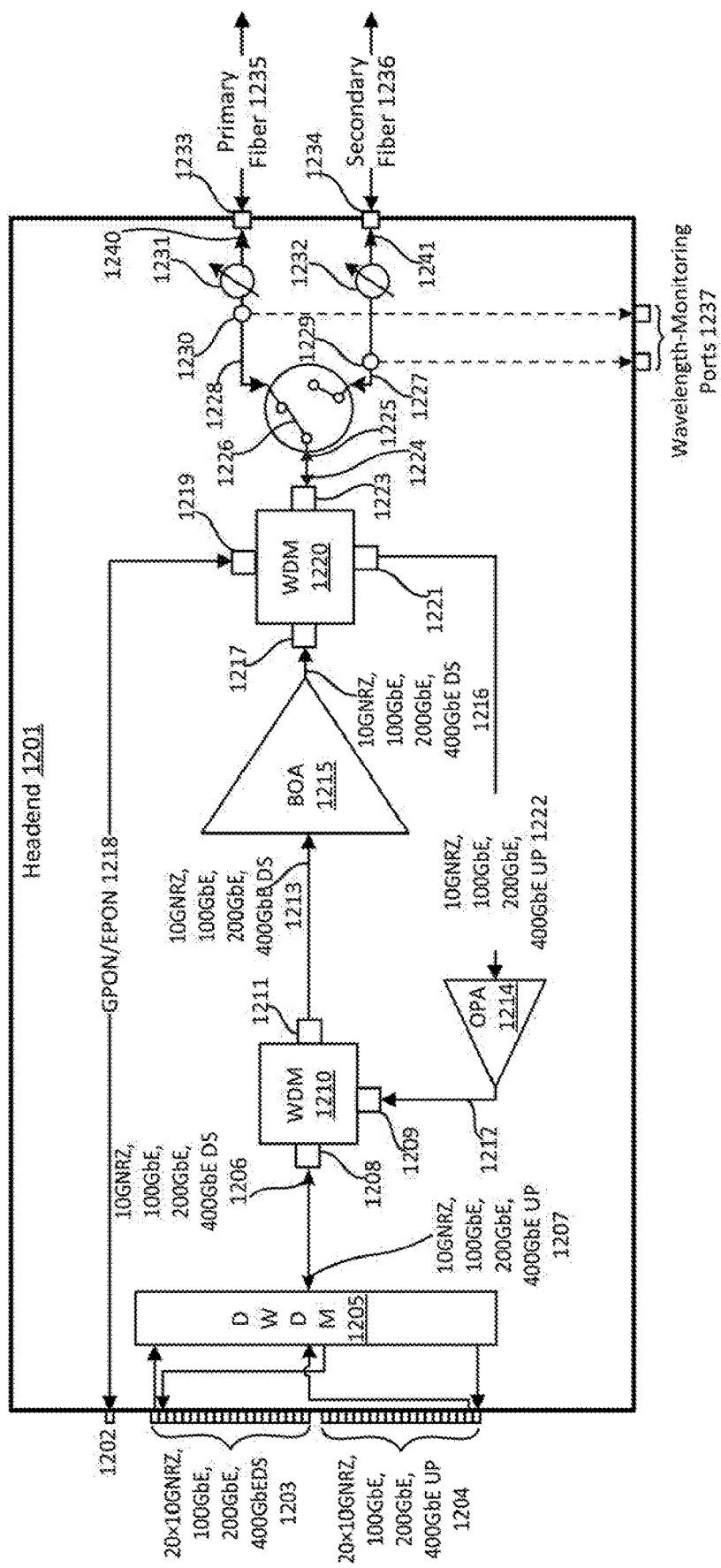
FIG. 12 depicts an access network diagram of an OCML headend comprising wavelength division multiplexers (WDMs), a dense wavelength division multiplexer (DWDM), and optical amplifiers, in accordance with the disclosure.

FIG. 12 depicts an access network diagram of an OCML headend comprising wavelength division multiplexers (WDMs), a dense wavelength division multiplexer (DWDM), and optical amplifiers, in accordance with the disclosure. FIG. 12 shows a schematic of an OCML headend according to at least one embodiment of the disclosure. As shown in FIG. 12, headend 1201 is a smart integrated OCML headend, which is a circuit, comprising a DWDM (e.g., DWDM 1205), a first WDM (e.g., WDM 1210), a second WDM (e.g., WDM 1220), a GPON/EPON connector (e.g., GPON/EPON 1218), a booster amplifier BOA (e.g., BOA 1215), an optical pre-amplifier (OPA) (e.g., OPA 1214), an optical switch 1226 to feed a primary optical fiber (e.g., Primary Fiber 1235) via a primary variable optical attenuator (VOA) (e.g., VOA 1231) or secondary (backup) optical fiber (e.g., Secondary Fiber 1236) via a secondary variable optical attenuator (VOA) (e.g., VOA 1232). DWDM 1205 may be similar in functionality to DWDM 106 and WDM 1210 and WDM 1220 may be similar in functionality to WDM 108. The disclosure provides a method of transporting multiple 10G NRZ, coherent 100 GbE, 200 GbE, and/or 400 GbE and GPON/EPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 208 in FIG. 2).

The EPON signals may operate with the same optical frequencies as GPON and time division multiple access (TDMA). The raw line data rate is 1.25 Gbits/s in both the downstream and upstream directions.

EPON is fully compatible with other Ethernet standards, so no conversion or encapsulation is necessary when connecting to Ethernet-based networks on either end. The same Ethernet frame is used with a payload of up to 1518 bytes. EPON may not use a carrier sense multiple access (CSMA)/collision detection (CD) access method used in other versions of Ethernet.

There is a 10-Gbit/s Ethernet version designated as 802.3av. The line rate may be 10.3125 Gbits/s. The primary mode is 10 Gbits/s upstream as well as downstream. A variation uses 10 Gbits/s downstream and 1 Gbit/s upstream. The 10-Gbit/s versions use different optical wavelengths on the fiber, 1571 to 1591 nm downstream and 1260 to 1280 nm upstream so the 10-Gbit/s system can be wavelength multiplexed on the same fiber as a standard 1-Gbit/s system.

In one aspect, headend 1201 may comprise twenty 10G NRZ, coherent 100 GbE, 200 GbE, and/or 400 GbE downstream (DS) transponders (e.g., 20×10G NRZ, coherent 100 GbE, 200 GbE, and/or 400 GbE DS 1203) and twenty 10G NRZ, coherent 100 GbE, 200 GbE, and/or 400 GbE upstream (UP) transponders (e.g., 20×10G NRZ, coherent 100 GbE, 200 GbE, and/or 400 GbE UP 1204). 20×10G NRZ, coherent 100 GbE, 200 GbE, and/or 400 GbE DS 1203 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 1204 may receive upstream data over 10G NRZ, coherent 100 GbE, 200 GbE, and/or 400 GbE wavelengths. 20×10G NRZ, coherent 100 GbE, 200 GbE, and/or 400 GbE DS 1203 may comprise the same elements and perform the same operations as 20×10G NRZ, coherent 100 GbE, 200 GbE, and/or 400 GbE DS 190, and 20×10G NRZ, coherent 100 GbE, 200 GbE, and/or 400 GbE UP 1204 may comprise the same elements and perform the same operations as 20×10G NRZ, coherent 100 GbE, 200 GbE, and/or 400 GbE UP 188.

The operation of headend 1201 may be described by way of the processing of downstream optical data signals transmitted from headend 1201 to a field hub or outside plant, and the processing of upstream optical data signals received from the field hub or outside plant. Each of the transponders of 20×10G NRZ, coherent 100 GbE, 200 GbE, and/or 400 GbE DS 1203 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 1203 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 1203 may generate twenty corresponding second optical data signals each of which has a unique wavelength.

DWDM 1205 may receive the twenty corresponding second optical data signals as an input and output a multi-wavelength downstream optical data signal (e.g., 10G NRZ, coherent 100 GbE, 200 GbE, and/or 400 GbE DS 1206) comprising the twenty corresponding second optical data signals onto a fiber. The multi-wavelength downstream optical data signal 10G NRZ, coherent 100 GbE, 200 GbE, and/or 400 GbE DS 1206 may be a 10G NRZ, coherent 100 GbE, 200 GbE, and/or 400 GbE optical data signal. More specifically, DWDM 1205 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 10G NRZ, coherent 100 GbE, 200 GbE, and/or 400 GbE DS 1206, may be input to WDM 1210. WDM 1210 may be a three port circulator, that receives multi-wavelength downstream optical data signal 10G NRZ, coherent 100 GbE, 200 GbE, and/or 400 GbE DS 1206 on port 1208, and outputs multi-wavelength downstream optical data signal coherent 10G NRZ, coherent 100 GbE, 200 GbE, and/or 400 GbE DS 1206, on port 1211 as multi-wavelength downstream optical data signal 10G NRZ, coherent 100 GbE, 200 GbE, and/or 400 GbE DS 1213 to BOA 1215.

BOA 1215 may have a gain that is based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, BOA 1215 may be adjusted based at least in part on the attenuation coefficient and length of fiber that the egress optical data signal will travel. More specifically, the gain BOA 1215 may be $G=e^{(2\alpha L)}$, where a is the fiber attenuation coefficient, as explained above, and L is the length of the fiber (e.g., the length of primary fiber 1235 and/or the length of secondary fiber 1236). Multi-wavelength downstream optical data signal 10G NRZ, coherent 100 GbE, 200 GbE, and/or 400 GbE DS 1213 may be amplified by BOA 1215, and BOA 1215 may output multi-wavelength downstream optical data signal 10G NRZ, coherent 100 GbE, 200 GbE, and/or 400 GbE DS 1216 to port 1217 of WDM 1220. WDM 1220 outputs an egress optical data signal from port 1219, which may be a multi-wavelength optical data signal comprising 10G NRZ, coherent 100 GbE, 200 GbE, and/or 400 GbE, EPON, and/or GPON optical data signals. The EPON and/or GPON optical data signals may be received on a GPON/EPON connector (e.g., GPON/EPON 1218) from PON port 1202.

Egress optical data signal 1225 may be output by WDM 1220 and optical switch 1226 may switch egress optical data signal 1225 onto connector 1228 or connector 1227 depending on the position of switch 1226. In some embodiments, connector 1228 may be a primary connector and connector 1227 may be a secondary connector or a backup connector. Wavelength monitoring connector 1230 may connect connector 1228 to a first port of wavelength-monitoring ports 1237, and wavelength monitoring connector 1229 may connect connector 1227 to a second port of wavelength-monitoring ports 1237. Wavelength-monitoring ports 1237 may monitor the wavelengths in egress optical data signal 1225 via connector 1228 or connector 1227 depending on the position of switch 1226. Egress optical data signal 1225 may exit headend 1201 either via connector 1228 connected to primary fiber 1235, as egress optical data signal 1240, or via connector 1227 connected to secondary fiber 1236, as egress optical data signal 1241, depending on the position of switch 1226. Egress optical data signal 1225 may be transmitted as, egress optical data signal 1240, on primary fiber 1235 to a first connector in the field hub or outside plant. Egress optical data signal may be transmitted as, egress optical data signal 1241, on secondary fiber 1236 to a second connector in the field hub or outside plant. The field hub or outside plant may include a MDM with the first connector and the second connector.

Variable optical attenuator (VOA) 1231 and VOA 1232 may be used to reduce the power levels of egress optical data signal 1225 or ingress optical data signal 1224. The power reduction may done by absorption, reflection, diffusion, scattering, deflection, diffraction, and dispersion, of egress optical data signal 1225 or ingress optical data signal 1224. VOA 1231 and VOA 1232 typically have a working wavelength range in which they absorb all light energy equally. In some embodiments VOA 1231 and VOA 1232 utilize a length of high-loss optical fiber, that operates upon its input optical signal power level in such a way that its output signal power level is less than the input level. For example, egress optical data signal 1225 may have an input power level to VOA 1231 that may be greater than the output power level of egress optical data signal 1240 as it is output from VOA 1231. Similarly if egress optical data signal 1225 is transmitted on connector 1227, egress optical data signal 1225 may have an input power level to VOA 1232 that may be greater than the output power level of egress optical data signal 1241. In some embodiments, the output power level of egress optical data signal 1240 may be greater than the output power level of egress optical data signal 1241, and vice versa. The difference in output power levels between egress optical data signal 1240 and egress optical data signal 1241 may depend on the mode of primary fiber 1235 and secondary fiber 1236. VOA 1232 may have a similar functionality to that have VOA 1231.

The variability of the output power level of VOA 1231 and VOA 1232 may be achieved using a fiber coupler, where some of the power is not sent to the port that outputs, but to another port. Another possibility is to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 1231 and VOA 1232 may be based on some piece of doped fiber, exhibiting absorption within a certain wavelength range.

The operation of headend 1201 may be described by way of the processing of upstream optical data signals received at headend 1201 from a field hub or outside plant. For instance, a multi-wavelength ingress optical data signal, comprising one or more of a 10G NRZ, coherent 100 GbE, 200 GbE, and/or 400 GbE optical data signal, EPON optical data signal, and/or GPON optical data signal, may be an upstream optical data signal received on primary fiber 1235 or secondary fiber 1236 depending on the position of switch 1226.

Because the multi-wavelength ingress optical data signal is routed to port 1223 of WDM 1220, and is altered negligibly between connector 1228 and port 1223 or connector 1227 and port 1223, depending on the position of switch 1226, the multi-wavelength ingress optical data signal may be substantially the same as ingress optical data signal 1224. The multi-wavelength ingress optical data signal may traverse connector 1228 and switch 1226, before entering WDM 1220 via port 1223 if switch 1226 is connected to connector 1228. The multi-wavelength ingress optical data signal may traverse connector 1227 and switch 1226, before entering WDM 1220 via port 1223 if switch 1226 is connected to connector 1227. WDM 1220 may demultiplex one or more 10G NRZ, coherent 100 GbE, 200 GbE, and/or 400 GbE optical data signals, EPON optical data signals, and/or GPON optical data signals from ingress optical data signal 1224. WDM 1220 may transmit the one or more EPON and/or GPON optical data signals along GPON/EPON 1218 to PON connector 1202 via port 1219. WDM 1220 may transmit the one or more 10G NRZ, coherent 100 GbE, 200 GbE, and/or 400 GbE optical data signals (e.g., 10 GbE UP 1222) out of port 1221 to OPA 1214.

The one or more 10G NRZ, coherent 100 GbE, 200 GbE, and/or 400 GbE optical data signals 10G NRZ, coherent 100 GbE, 200 GbE, and/or 400 GbE UP 1222 may be received by OPA 1214. The one or more optical data signals 10G NRZ, coherent 100 GbE, 200 GbE, and/or 400 GbE UP 1222 may comprise 10G NRZ, coherent 100 GbE, 200 GbE, and/or 400 GbE optical data signals. A gain associated OPA 1214 may be based at least in part on a distance that 10G NRZ, coherent 100 GbE, 200 GbE, and/or 400 GbE optical data signals have to travel, similar to that of BOA 1215. The one or more optical data signals 10G NRZ, coherent 100 GbE, 200 GbE, and/or 400 GbE UP 1222 may be amplified by OPA 1214, and OPA 1214 may output multi-wavelength upstream optical data signal 1212 to WDM 1210.

WDM 1210 may receive the multi-wavelength upstream optical data signal 1212 on port 1209 of WDM 1210, and may output one or more optical data signals 10G NRZ, coherent 100 GbE, 200 GbE, and/or 400 GbE UP 1207 to DWDM 1205. The one or more optical data signals 10G NRZ, coherent 100 GbE, 200 GbE, and/or 400 GbE UP 1207 are substantially the same as multi-wavelength upstream optical data signal 1212. WDM 1210 may function as a circulator when receiving multi-wavelength upstream optical data signal 1212 on port 1209 and outputting the one or more optical data signals 10G NRZ, coherent 100 GbE, 200 GbE, and/or 400 GbE UP 1207 on port 1208. The one or more optical data signals 10G NRZ, coherent 100 GbE, 200 GbE, and/or 400 GbE UP 1207 may be received by DWDM 1205.

The one or more optical data signals 10G NRZ, coherent 100 GbE, 200 GbE, and/or 400 GbE UP 1207 may comprise 10GNRZ, coherent 100 GbE, 200 GbE, and/or 400 GbE optical data signals. DWDM 1205 may demultiplex the one or more optical data signals 10G NRZ, coherent 100 GbE, 200 GbE, and/or 400 GbE UP 1207 into individual optical data signals in accordance with the individual wavelengths of the one or more optical data signals 10G NRZ, coherent 100 GbE, 200 GbE, and/or 400 GbE UP 1207. More specifically, the one or more optical data signals 10G NRZ, coherent 100 GbE, 200 GbE, and/or 400 GbE UP 1207 may be demultiplexed into twenty 10G NRZ, coherent 100 GbE, 200 GbE, and/or 400 GbE optical data signals, each of which may have a unique wavelength. DWDM 1205 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 1204. Each of the transponders of 20×10G NRZ, coherent 100 GbE, 200 GbE, and/or 400 GbE UP 1204 may convert a received corresponding 10G NRZ, coherent 100 GbE, 200 GbE, and/or 400GbEoptical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 1204 may transmit the twenty SONET/SDH optical data signals to the MTC on the SONET/SDH optical network connection.

Figure 13:
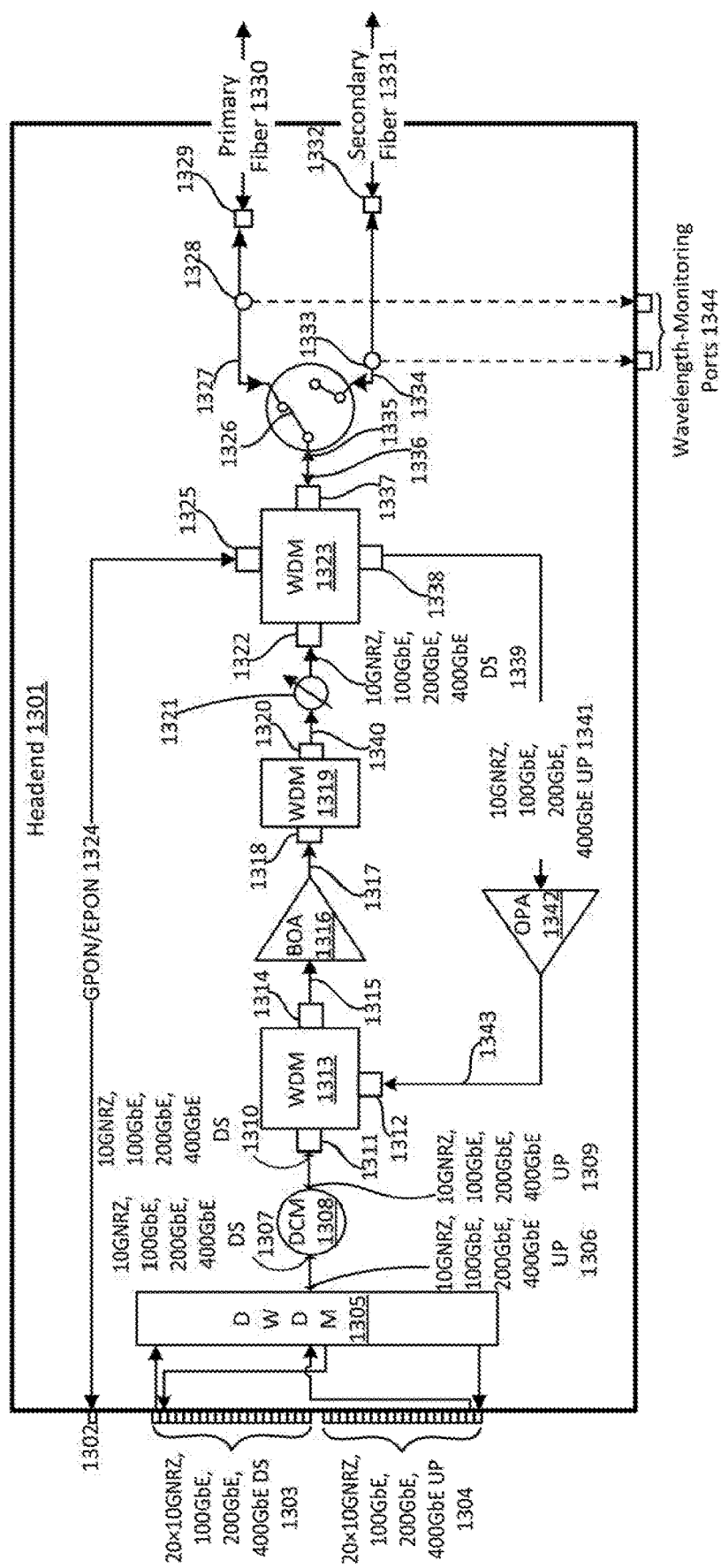
FIG. 13 depicts an access network diagram of an OCML headend comprising WDMs, a DWDM, optical amplifiers, and dispersion control modules (DCMs), in accordance with the disclosure.

FIG. 13 depicts an access network diagram of an OCML headend comprising WDMs, a DWDM, optical amplifiers, and dispersion control modules (DCMs), in accordance with the disclosure. FIG. 13 shows a schematic of an OCML headend according to at least one embodiment of the disclosure. As shown in FIG. 13, headend 1301 is a smart integrated OCML headend, which is a circuit, comprising a DWDM (e.g., DWDM 1305), a first WDM (e.g., WDM 1313), a second WDM (e.g., WDM 1319), a third WDM (e.g., WDM 1323), a GPON/EPON connector (e.g., GPON/EPON 1324), a booster amplifier BOA (e.g., BOA 1316), an optical pre-amplifier (OPA) (e.g., OPA 1342), a variable optical attenuator (VOA) (e.g., VOA 1321), an optical switch 1326 to feed a primary optical fiber (e.g., Primary Fiber 1330) or secondary (backup) optical fiber (e.g., Secondary Fiber 1331), and a dispersion control module (DCM) (e.g., DCM 1308). DWDM 1305 may be similar in functionality to DWDM 106 and WDM 1313, WDM 1319, and WDM 1323 may be similar in functionality to WDM 108. The disclosure provides a method of transporting multiple 10G NRZ, coherent 100 GbE, 200 GbE, and/or 400 GbE and GPON/EPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 208 in FIG. 2).

The EPON signals may operate with the same optical frequencies as GPON and time division multiple access (TDMA). The raw line data rate is 1.25 Gbits/s in both the downstream and upstream directions. EPON is fully compatible with other Ethernet standards, so no conversion or encapsulation is necessary when connecting to Ethernet-based networks on either end. The same Ethernet frame is used with a payload of up to 1518 bytes. EPON may not use a carrier sense multiple access (CSMA)/collision detection (CD) access method used in other versions of Ethernet. There is a 10-Gbit/s Ethernet version designated as 802.3ay. The line rate may be 10.3125 Gbits/s. The primary mode is 10 Gbits/s upstream as well as downstream. A variation uses 10 Gbits/s downstream and 1 Gbit/s upstream. The 10-Gbit/s versions use different optical wavelengths on the fiber, 1575 to 1591 nm downstream and 1260 to 1280 nm upstream so the 10-Gbit/s system can be wavelength multiplexed on the same fiber as a standard 1-Gbit/s system.

In one aspect, headend 1301 may comprise twenty 10G NRZ, coherent 100 GbE, 200 GbE, and/or 400 GbE downstream (DS) transponders (e.g., 20×10G NRZ, coherent 100 GbE, 200 GbE, and/or 400 GbE DS 1303) and twenty 10G NRZ, coherent 100 GbE, 200 GbE, and/or 400 GbE upstream (UP) transponders (e.g., 20×10G NRZ, coherent 100 GbE, 200 GbE, and/or 400 GbE UP 1304). 20×10G NRZ, coherent 100 GbE, 200 GbE, and/or 400 GbE DS 1303 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 1304 may receive upstream data over 10G NRZ, coherent 100 GbE, 200 GbE, and/or 400 GbE wavelengths. 20×10G NRZ, coherent 100 GbE, 200 GbE, and/or 400 GbE DS 1303 may comprise the same elements and perform the same operations as 20×10G NRZ, coherent 100 GbE, 200 GbE, and/or 400 GbE DS 190, and 20×10G NRZ, coherent 100 GbE, 200 GbE, and/or 400 GbE UP 1304 may comprise the same elements and perform the same operations as 20×10G NRZ, coherent 100 GbE, 200 GbE, and/or 400 GbE UP 188.

The operation of headend 1301 may be described by way of the processing of downstream optical data signals transmitted from headend 1301 to a field hub or outside plant, and the processing of upstream optical data signals received from the field hub or outside plant. Each of the transponders of 20×10G NRZ, coherent 100 GbE, 200 GbE, and/or 400 GbE DS 1303 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 1303 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 1303 may generate twenty corresponding second optical data signals each of which has a unique wavelength.

DWDM 1305 may receive the twenty corresponding second optical data signals as an input and output a multi-wavelength downstream optical data signal (e.g., 10G NRZ, coherent 100 GbE, 200 GbE, and/or 400 GbE DS 1307) comprising the twenty corresponding second optical data signals onto a fiber. The multi-wavelength downstream optical data signal 10G NRZ, coherent 100 GbE, 200 GbE, and/or 400 GbE DS 1307 may be a coherent 10G NRZ, coherent 100 GbE, 200 GbE, and/or 400 GbE optical data signal. More specifically, DWDM 1305 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 10G NRZ, coherent 100 GbE, 200 GbE, and/or 400 GbE DS 1307, may be input to DCM 1308. 10G NRZ, coherent 100 GbE, 200 GbE, and/or 400 GbE DS 1307 may be input into DCM 1308 to compensate for dispersion that 10G NRZ, coherent 100 GbE, 200 GbE, and/or 400 GbE DS 1307 may experience after being amplified by BOA 1316 and multiplexed by WDM 1323, with other optical data signals, that are downstream from the DCM. The amplified and multiplexed optical data signal may be referred to as an egress optical data signal, as it is the optical data signal that may be transmitted out of headend 1301 over a fiber connecting headend 1301 to a field hub or outside plant. In some embodiments, DCM 1308 may be configured to balance positive and/or negative dispersion that may be introduced to the egress optical data signal by the fiber. In some embodiments, DCM 1308 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 1308 may be configured to reduce the sensitivity or OSNR level requirement in a photodetector or fiber-optic sensor in the transceiver, which may drastically reduce the cost of the transceivers used in the DWDM located at the field hub or outside plant. DCM 1308 may output a dispersion controlled version of 10G NRZ, coherent 100 GbE, 200 GbE, and/or 400 GbE DS 1307 as 10G NRZ, coherent 100 GbE, 200 GbE, and/or 400 GbE DS 1310.

WDM 1313 may be a three port circulator, that receives multi-wavelength downstream optical data signal 10G NRZ, coherent 100 GbE, 200 GbE, and/or 400 GbE DS 1310 on port 1311, and outputs multi-wavelength downstream optical data signal 10G NRZ, coherent 100 GbE, 200 GbE, and/or 400 GbE DS 1310, on port 1314 as multi-wavelength downstream optical data signal 10G NRZ, coherent 100 GbE, 200 GbE, and/or 400 GbE DS 1315 to BOA 1316.

BOA 1316 may have a gain that is based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, BOA 1316 may be adjusted based at least in part on the attenuation coefficient and length of fiber that the egress optical data signal will travel. More specifically, the gain BOA 1316 may be $G=e^{(2\alpha L)}$, where a is the fiber attenuation coefficient, as explained above, and L is the length of the fiber (e.g., the length of primary fiber 1330 and/or the length of secondary fiber 1331). Multi-wavelength downstream optical data signal 10G NRZ, coherent 100 GbE, 200 GbE, and/or 400 GbE DS 1315 may be amplified by BOA 1316, and BOA 1316 may output multi-wavelength downstream optical data signal 10G NRZ, coherent 100 GbE, 200 GbE, and/or 400 GbE DS 1317 to port 1318 of WDM 1319. WDM 1319 outputs a multi-wavelength downstream optical data signal (e.g., multi-wavelength downstream optical data signal 10G NRZ, coherent 100 GbE, 200 GbE, and/or 400 GbE DS 1340) from port 1320, which may be substantially the same as multi-wavelength downstream optical data signal 10G NRZ, coherent 100 GbE, 200 GbE, and/or 400 GbE DS 1317. Multi-wavelength downstream optical data signal 10G NRZ, coherent 100 GbE, 200 GbE, and/or 400 GbE DS 1340 may be input to variable optical amplifier (VOA) 1321.

VOA 1321 may be used to reduce the power levels of Multi-wavelength downstream optical data signal 10G NRZ, coherent 100 GbE, 200 GbE, and/or 400 GbE DS 1340. The power reduction may done by absorption, reflection, diffusion, scattering, deflection, diffraction, and dispersion, of Multi-wavelength downstream optical data signal 10G NRZ, coherent 100 GbE, 200 GbE, and/or 400 GbE DS 1340. VOA 1321 typically have a working wavelength range in which they absorb all light energy equally. In some embodiments VOA 1321 utilize a length of high-loss optical fiber, that operates upon its input optical signal power level in such a way that its output signal power level is less than the input level. For example, multi-wavelength downstream optical data signal 10G NRZ, coherent 100 GbE, 200 GbE, and/or 400 GbE DS 1340 may have an input power level to VOA 1321 that may be greater than the output power level of multi-wavelength downstream optical data signal 10G NRZ, coherent 100 GbE, 200 GbE, and/or 400 GbE DS 1339.

The variability of the output power level of VOA 1321 may be achieved using a fiber coupler, where some of the power is not sent to the port that outputs, but to another port. Another possibility is to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 13211 may be based on some piece of doped fiber, exhibiting absorption within a certain wavelength range.

WDM 1323 may multiplex multi-wavelength downstream optical data signal 10G NRZ, coherent 100 GbE, 200 GbE, and/or 400 GbE DS 1339 and one or more EPON, and/or GPON optical data signals. The EPON and/or GPON optical data signals may be received on a GPON/EPON connector (e.g., GPON/EPON 1324) from PON port 1302. The resulting multiplexed optical data signal may be referred to as egress optical data signal 1335.

Egress optical data signal 1335 may be output by WDM 1323 and optical switch 1326 may switch egress optical data signal 1335 onto connector 1327 or connector 1334 depending on the position of switch 1326. In some embodiments, connector 1327 may be a primary connector and connector 1334 may be a secondary connector or a backup connector. Wavelength monitoring connector 1328 may connect connector 1327 to a first port of wavelength-monitoring ports 1344, and wavelength monitoring connector 1333 may connect connector 1334 to a second port of wavelength-monitoring ports 1344. Wavelength-monitoring ports 1344 may monitor the wavelengths in egress optical data signal 1335 via connector 1327 or connector 1334 depending on the position of switch 1326. Egress optical data signal 1335 may exit headend 1301 via connector 1327 connected to primary fiber 1330, and may be received on a first connector in the field hub or outside plant. Egress optical data signal 1335 may exit headend 1301 via connector 1334 connected to secondary fiber 1331, and may be received on a second connector in the field hub or outside plant. The field hub or outside plant may include a MDM with the first connector and the second connector.

The operation of headend 1301 may be described by way of the processing of upstream optical data signals received at headend 1301 from a field hub or outside plant. For instance, a multi-wavelength ingress optical data signal, comprising one or more of a 10G NRZ, coherent 100 GbE, 200 GbE, and/or 400 GbE optical data signal, EPON optical data signal, and/or GPON optical data signal or a 10GEPN.XGPON may be an upstream optical data signal received on primary fiber 1330 or secondary fiber 1331 depending on the position of switch 1326.

Multi-wavelength ingress optical data signal 1336 may traverse connector 1327 and switch 1326, before entering WDM 1323 via port 1337 if switch 1326 is connected to connector 1327. Multi-wavelength ingress optical data signal 1336 may traverse connector 1334 and switch 1326, before entering WDM 1323 via port 1337 if switch 1326 is connected to connector 1327. WDM 1323 may demultiplex one or more 10G NRZ, coherent 100 GbE, 200 GbE, and/or 400 GbE optical data signals, EPON optical data signals, and/or GPON optical data signals from multi-wavelength ingress optical data signal 1336. WDM 1323 may transmit the one or more EPON and/or GPON optical data signals along GPON/EPON 1324 to PON connector 1302 via port 1325. WDM 1323 may transmit the one or more 10G NRZ, coherent 100 GbE, 200 GbE, and/or 400 GbE optical data signals (e.g., 10 GbE UP 1341) out of port 1338 to OPA 1342.

The one or more 10G NRZ, coherent 100 GbE, 200 GbE, and/or 400 GbE optical data signals 10G NRZ, coherent 100 GbE, 200 GbE, and/or 400 GbE UP 1341 may be received by OPA 1342. The one or more optical data signals 10G NRZ, coherent 100 GbE, 200 GbE, and/or 400 GbE UP 1341 may comprise 10G NRZ, coherent 100 GbE, 200 GbE, and/or 400 GbE optical data signals. A gain associated OPA 1342 may be based at least in part on a distance that 10G NRZ, coherent 100 GbE, 200 GbE, and/or 400 GbE optical data signals have to travel, similar to that of BOA 1316. The one or more optical data signals 10G NRZ, coherent 100 GbE, 200 GbE, and/or 400 GbE UP 1341 may be amplified by OPA 1342, and OPA 1342 may output multi-wavelength upstream optical data signal 1343 to WDM 1313.

WDM 1313 may receive the multi-wavelength upstream optical data signal 1343 on port 1312, and may output one or more optical data signals 10G NRZ, coherent 100 GbE, 200 GbE, and/or 400 GbE UP 1309 to DCM 1308. DCM 1308 may perform one or more operations on one or more optical data signals 10G NRZ, coherent 100 GbE, 200 GbE, and/or 400 GbE UP 1309 to compensate for any dispersion that may have been introduced by circuit components (e.g., WDM 1313, OPA 1342, or WDM 1323) or imperfections or issues with an optical fiber (e.g., primary fiber 1330 or secondary fiber 1331). DCM 1308 may output one or more optical data signals 10G NRZ, coherent 100 GbE, 200 GbE, and/or 400 GbE UP 1306 to DWDM 1305. The one or more optical data signals 10G NRZ, coherent 100 GbE, 200 GbE, and/or 400 GbE UP 1309 are substantially the same as multi-wavelength upstream optical data signal 1343. WDM 1313 may function as a circulator when receiving multi-wavelength upstream optical data signal 1343 on port 1312. The one or more optical data signals 10G NRZ, coherent 100 GbE, 200 GbE, and/or 400 GbE UP 1306 may be received by DWDM 1305.

The one or more optical data signals 10G NRZ, coherent 100 GbE, 200 GbE, and/or 400 GbE UP 1306 may comprise 10GNRZ, coherent 100 GbE, 200 GbE, and/or 400 GbE optical data signals. DWDM 1305 may demultiplex the one or more optical data signals 10G NRZ, coherent 100 GbE, 200 GbE, and/or 400 GbE UP 1306 into individual optical data signals in accordance with the individual wavelengths of the one or more optical data signals 10G NRZ, coherent 100 GbE, 200 GbE, and/or 400 GbE UP 1306. More specifically, the one or more optical data signals 10G NRZ, coherent 100 GbE, 200 GbE, and/or 400 GbE UP 1306 may be demultiplexed into twenty 10G NRZ, coherent 100 GbE, 200 GbE, and/or 400 GbE optical data signals, each of which may have a unique wavelength. DWDM 1305 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 1304. Each of the transponders of 20×10G NRZ, coherent 100 GbE, 200 GbE, and/or 400 GbE UP 1304 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 1304 may transmit the twenty SONET/SDH optical data signals to the MTC on the SONET/SDH optical network connection.

Figure 14:
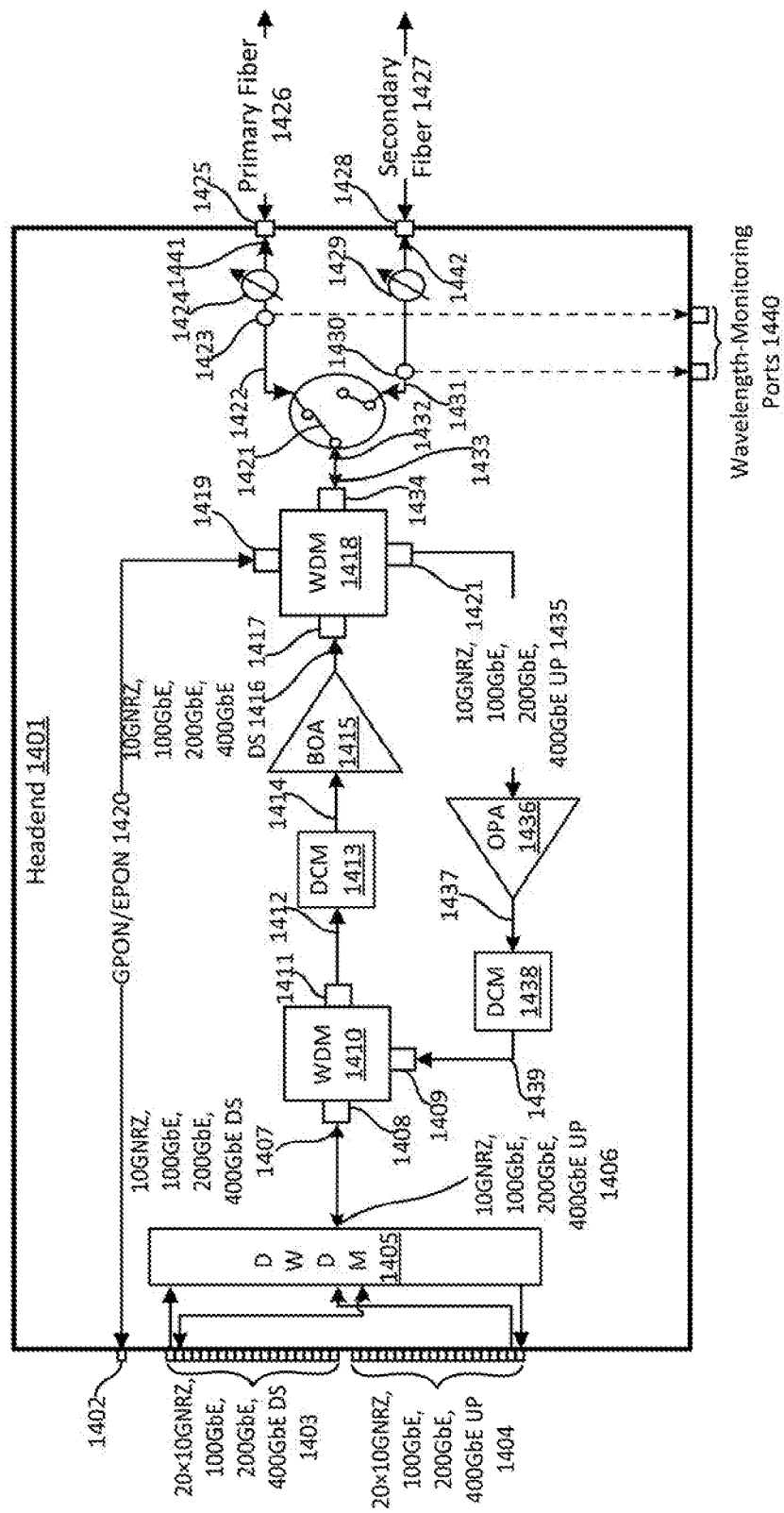
FIG. 14 depicts an access network diagram of an OCML headend and outside plant, in accordance with the disclosure.

FIG. 14 depicts an access network diagram of an OCML headend and outside plant, in accordance with the disclosure. FIG. 14 shows a schematic of an OCML headend according to at least one embodiment of the disclosure. As shown in FIG. 14, headend 1401 is a smart integrated OCML headend, which is a circuit, comprising a DWDM (e.g., DWDM 1405), a first WDM (e.g., WDM 1410), a second WDM (e.g., WDM 1418), a first DCM (e.g., DCM 1413), a second DCM 1438, a GPON/EPON connector (e.g., GPON/EPON 1420), a booster amplifier BOA (e.g., BOA 1415), an optical pre-amplifier (OPA) (e.g., OPA 1436), a first variable optical attenuator (VOA) (e.g., VOA 1424), a second VOA (e.g., VOA 1429), and an optical switch 1421 to feed a primary optical fiber (e.g., Primary Fiber 1426) or secondary (backup) optical fiber (e.g., Secondary Fiber 1427). DWDM 1405 may be similar in functionality to DWDM 106 and WDM 1410 and WDM 1418 may be similar in functionality to WDM 108. DCM 1413 and DCM 1438 may be similar in functionality to DCM 112. The disclosure provides a method of transporting multiple 10G NRZ, coherent 100 GbE, 200 GbE, and/or 400 GbE and GPON/EPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 208 in FIG. 2).

The EPON signals may operate with the same optical frequencies as GPON and time division multiple access (TDMA). The raw line data rate is 1.25 Gbits/s in both the downstream and upstream directions. EPON is fully compatible with other Ethernet standards, so no conversion or encapsulation is necessary when connecting to Ethernet-based networks on either end. The same Ethernet frame is used with a payload of up to 1518 bytes. EPON may not use a carrier sense multiple access (CSMA)/collision detection (CD) access method used in other versions of Ethernet. There is a 10-Gbit/s Ethernet version designated as 802.3av. The line rate may be 10.3125 Gbits/s. The primary mode is 10 Gbits/s upstream as well as downstream. A variation uses 10 Gbits/s downstream and 1 Gbit/s upstream. The 10-Gbit/s versions use different optical wavelengths on the fiber, 1571 to 1591 nm downstream and 1260 to 1280 nm upstream so the 10-Gbit/s system can be wavelength multiplexed on the same fiber as a standard 1-Gbit/s system.

In one aspect, headend 1401 may comprise 10G NRZ, coherent 100 GbE, 200 GbE, and/or 400GbEE downstream (DS) transponders (e.g., 20×10G NRZ, coherent 100 GbE, 200 GbE, and/or 400 GbE DS 1403) and twenty 10G NRZ, coherent 100 GbE, 200 GbE, and/or 400 GbE upstream (UP) transponders (e.g., 20×10G NRZ, coherent 100 GbE, 200 GbE, and/or 400 GbE UP 1404). 20×10G NRZ, coherent 100 GbE, 200 GbE, and/or 400 GbE DS 1403 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 1404 may receive upstream data over 10G NRZ, coherent 100 GbE, 200 GbE, and/or 400 GbE wavelengths. 20×10G NRZ, coherent 100 GbE, 200 GbE, and/or 400 GbE DS 1403 may comprise the same elements and perform the same operations as 20×10G NRZ, coherent 100 GbE, 200 GbE, and/or 400 GbE DS 190, and 20×coherent 100 GbE, 200 GbE, and/or 400 GbE UP 1404 may comprise the same elements and perform the same operations as 20×10G NRZ, coherent 100 GbE, 200 GbE, and/or 400 GbE UP 188.

The operation of headend 1401 may be described by way of the processing of downstream optical data signals transmitted from headend 1401 to a field hub or outside plant, and the processing of upstream optical data signals received from the field hub or outside plant. Each of the transponders of 20×10G NRZ, coherent 100 GbE, 200 GbE, and/or 400 GbE DS 1403 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 1403 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 1403 may generate twenty corresponding second optical data signals each of which has a unique wavelength.

DWDM 1405 may receive the twenty corresponding second optical data signals as an input and output a multi-wavelength downstream optical data signal (e.g., 10G NRZ, coherent 100 GbE, 200 GbE, and/or 400 GbE DS 1407) comprising the twenty corresponding second optical data signals onto a fiber. The multi-wavelength downstream optical data signal 10G NRZ, coherent 100 GbE, 200 GbE, and/or 400 GbE DS 1407 may be a 10G NRZ, coherent 100 GbE, 200 GbE, and/or 400 GbE optical data signal. More specifically, DWDM 1405 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 10G NRZ, coherent 100 GbE, 200 GbE, and/or 400 GbE DS 1407, may be input to WDM 1410. WDM 1410 may be a three port circulator, that receives multi-wavelength downstream optical data signal 10G NRZ, coherent 100 GbE, 200 GbE, and/or 400 GbE DS 1407 on port 1408, and outputs multi-wavelength downstream optical data signal 10G NRZ, coherent 100 GbE, 200 GbE, and/or 400 GbE DS 1407, on port 1408 as multi-wavelength downstream optical data signal 10G NRZ, coherent 100 GbE, 200 GbE, and/or 400 GbE DS 1412 on port 1411 to DCM 1413.

Multi-wavelength downstream optical data signal 10G NRZ, coherent 100 GbE, 200 GbE, and/or 400 GbE DS 1412 may be input into DCM 1413 to compensate for dispersion that 10G NRZ, coherent 100 GbE, 200 GbE, and/or 400 GbE DS 1412 may experience after being amplified by BOA 1415 and multiplexed by WDM 1428, with other optical data signals, that are downstream from DCM 1431. The amplified and multiplexed optical data signal may be referred to as an egress optical data signal, as it is the optical data signal that may be transmitted out of headend 1401 over a fiber connecting headend 1401 to a field hub or outside plant. In some embodiments, DCM 1413 may be configured to balance positive and/or negative dispersion that may be introduced to the egress optical data signal by the fiber. In some embodiments, DCM 1413 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 1413 may be configured to reduce the sensitivity or OSNR level requirement in a photodetector or fiber-optic sensor in the transceiver, which may drastically reduce the cost of the transceivers used in the DWDM located at the field hub or outside plant. DCM 1413 may output a dispersion controlled version of 10G NRZ, coherent 100 GbE, 200 GbE, and/or 400 GbE DS 1412 as 10G NRZ, coherent 100 GbE, 200 GbE, and/or 400 GbE DS 1414.

BOA 1415 may have a gain that is based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, BOA 1415 may be adjusted based at least in part on the attenuation coefficient and length of fiber that the egress optical data signal will travel. More specifically, the gain BOA 1415 may be $G=e^{(2\alpha L)}$, where a is the fiber attenuation coefficient, as explained above, and L is the length of the fiber (e.g., the length of primary fiber 1426 and/or the length of secondary fiber 1427). Multi-wavelength downstream optical data signal 10G NRZ, coherent 100 GbE, 200 GbE, and/or 400 GbE DS 1414 may be amplified by BOA 1415, and BOA 1415 may output multi-wavelength downstream optical data signal 10G NRZ, coherent 100 GbE, 200 GbE, and/or 400 GbE DS 11416 to port 1417 of WDM 1418.

WDM 1418 may multiplex multi-wavelength downstream optical data signal 10G NRZ, coherent 100 GbE, 200 GbE, and/or 400 GbE DS 1416 and one or more EPON, and/or GPON optical data signals. The EPON and/or GPON optical data signals may be received on a GPON/EPON connector (e.g., GPON/EPON 1420) from PON port 1402. The resulting multiplexed optical data signal may be referred to as egress optical data signal 1432.

Egress optical data signal 1432 may be output by WDM 1418 and optical switch 1421 may switch egress optical data signal 1432 onto connector 1422 or connector 1431 depending on the position of switch 1421. In some embodiments, connector 1422 may be a primary connector and connector 1431 may be a secondary connector or a backup connector. Wavelength monitoring connector 1423 may connect connector 1422 to a first port of wavelength-monitoring ports 1440, and wavelength monitoring connector 1430 may connect connector 1431 to a second port of wavelength-monitoring ports 1440. Wavelength-monitoring ports 1440 may monitor the wavelengths in egress optical data signal 1432 via connector 1422 or connector 1431 depending on the position of switch 1421. Egress optical data signal 1432 may exit headend 1401 either via connector 1422 connected to primary fiber 1426, as egress optical data signal 1441, or via connector 1431 connected to secondary fiber 1427, as egress optical data signal 1442, depending on the position of switch 1421. Egress optical data signal 1432 may be transmitted as, egress optical data signal 1441, on primary fiber 1426 to a first connector in the field hub or outside plant. Egress optical data signal may be transmitted as, egress optical data signal 1442, on secondary fiber 1427 to a second connector in the field hub or outside plant. The field hub or outside plant may include a MDM with the first connector and the second connector.

Variable optical attenuator (VOA) 1424 and VOA 1429 may be used to reduce the power levels of egress optical data signal 1432 or ingress optical data signal 1433. The power reduction may done by absorption, reflection, diffusion, scattering, deflection, diffraction, and dispersion, of egress optical data signal 1432 or ingress optical data signal 1433. VOA 1424 and VOA 1429 typically have a working wavelength range in which they absorb all light energy equally. In some embodiments VOA 1424 and VOA 1429 utilize a length of high-loss optical fiber, that operates upon its input optical signal power level in such a way that its output signal power level is less than the input level. For example, egress optical data signal 1432 may have an input power level to VOA 1424 that may be greater than the output power level of egress optical data signal 1441 as it is output from VOA 1424. Similarly if egress optical data signal 1432 is transmitted on connector 1431, egress optical data signal 1432 may have an input power level to VOA 1429 that may be greater than the output power level of egress optical data signal 1442. In some embodiments, the output power level of egress optical data signal 1441 may be greater than the output power level of egress optical data signal 1442, and vice versa. The difference in output power levels between egress optical data signal 1441 and egress optical data signal 1442 may depend on the mode of primary fiber 1426 and secondary fiber 1427. VOA 1424 may have a similar functionality to that have VOA 1429.

The variability of the output power level of VOA 1424 and VOA 1429 may be achieved using a fiber coupler, where some of the power is not sent to the port that outputs, but to another port. Another possibility is to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 1424 and VOA 1429 may be based on some piece of doped fiber, exhibiting absorption within a certain wavelength range.

The operation of headend 1401 may be described by way of the processing of upstream optical data signals received at headend 1401 from a field hub or outside plant. For instance, a multi-wavelength ingress optical data signal, comprising one or more of a 10G NRZ, coherent 100 GbE, 200 GbE, and/or 400 GbE optical data signal, EPON optical data signal, and/or GPON optical data signal, may be an upstream optical data signal received on primary fiber 1426 or secondary fiber 1427 depending on the position of switch 1421.

Because the multi-wavelength ingress optical data signal is routed to port 1434 of WDM 1418, and is altered negligibly between connector 1422 and port 1434 or connector 1432 and port 1434, depending on the position of switch 1421, the multi-wavelength ingress optical data signal may be substantially the same as ingress optical data signal 1433. The multi-wavelength ingress optical data signal may traverse connector 1422 and switch 1421, before entering WDM 1418 via port 1434 if switch 1421 is connected to connector 1422. The multi-wavelength ingress optical data signal may traverse connector 1431 and switch 1421, before entering WDM 1418 via port 1434 if switch 1421 is connected to connector 1431. WDM 1418 may demultiplex one or more 10G NRZ, coherent 100 GbE, 200 GbE, and/or 400 GbE optical data signals, EPON optical data signals, and/or GPON optical data signals from ingress optical data signal 1433. WDM 1418 may transmit the one or more EPON and/or GPON optical data signals along GPON/EPON 11420 to PON connector 1402 via port 1419. WDM 1418 may transmit the one or more 10G NRZ, coherent 100 GbE, 200 GbE, and/or 400 GbE optical data signals (e.g., 10 GbE UP 1435) out of port 1421 to OPA 1436.

The one or more 10G NRZ, coherent 100 GbE, 200 GbE, and/or 400 GbE optical data signals 10G NRZ, coherent 100 GbE, 200 GbE, and/or 400 GbE UP 1435 may be received by OPA 1436. The one or more optical data signals 10G NRZ, coherent 100 GbE, 200 GbE, and/or 400 GbE UP 1435 may comprise 10G NRZ, coherent 100 GbE, 200 GbE, and/or 400 GbE optical data signals. A gain associated OPA 1436 may be based at least in part on a distance that 10G NRZ, coherent 100 GbE, 200 GbE, and/or 400 GbE optical data signals have to travel, similar to that of BOA 1415. The one or more optical data signals 10G NRZ, coherent 100 GbE, 200 GbE, and/or 400 GbE UP 1435 may be amplified by OPA 1436, and OPA 1436 may output multi-wavelength upstream optical data signal 1437 to DCM 1438.

In some embodiments, DCM 1438 may be configured to balance positive and/or negative dispersion that may be introduced to a SONET/SDH egress optical data signal that may enter headend 1401 from 20×10G NRZ, coherent 100 GbE, 200 GbE, and/or 400 GbE UP 1404. The SONET/SDH egress optical data signal may be an upstream signal from a field hub or outside plant destined for a MTC. For example, a customer premise may be connected to the field hub or outside plant and may send one or more packets via a SONET/SDH network to the field hub or outside plant which may in turn transmit the one or more packets using 10G NRZ, coherent 100 GbE, 200 GbE, and/or 400 GbE optical data signals to headend 1401. The one or more packets may be destined for a company web server connected to the MTC via a backbone network. Because headend 1401 may be collocated in a STC that is connected to the MTC via an optical ring network, wherein the connection between the STC and MTC is an SONET/SDH optical network connection, DCM 1438 may be configured to compensate for positive and/or negative dispersion on the SONET/SDH optical network connection. That is DCM 1438 may be configured to reduce temporal broadening of the SONET/SDH egress optical data signal or temporal contraction of the SONET/SDH egress optical data signal. DCM 1438 may input 10G NRZ, coherent 100 GbE, 200 GbE, and/or 400 GbE UP 1437 and my output 10G NRZ, coherent 100 GbE, 200 GbE, and/or 400 GbE UP 1439 to WDM 1410.

WDM 1410 may receive the multi-wavelength upstream optical data signal 10G NRZ, coherent 100 GbE, 200 GbE, and/or 400 GbE UP 1439 on port 1409 of WDM 1410, and may output one or more optical data signals 10G NRZ, coherent 100 GbE, 200 GbE, and/or 400 GbE UP 1206 to DWDM 1405. The one or more optical data signals 10G NRZ, coherent 100 GbE, 200 GbE, and/or 400 GbE UP 1406 are substantially the same as multi-wavelength upstream optical data signal 10G NRZ, coherent 100 GbE, 200 GbE, and/or 400 GbE UP 1439. WDM 1410 may function as a circulator when receiving multi-wavelength upstream optical data signal 10G NRZ, coherent 100 GbE, 200 GbE, and/or 400 GbE UP 1439 on port 1409 and may output the one or more optical data signals 10G NRZ, coherent 100 GbE, 200 GbE, and/or 400 GbE UP 1406 on port 1408. The one or more optical data signals 10G NRZ, coherent 100 GbE, 200 GbE, and/or 400 GbE UP 1406 may be received by DWDM 1405.

The one or more optical data signals 10G NRZ, coherent 100 GbE, 200 GbE, and/or 400 Gb UP 1406 may comprise 10GNRZ, coherent 100 GbE, 200 GbE, and/or 400 GbE optical data signals. DWDM 1405 may demultiplex the one or more optical data signals 10G NRZ, coherent 100 GbE, 200 GbE, and/or 400 GbE UP 1406 into individual optical data signals in accordance with the individual wavelengths of the one or more optical data signals 10G NRZ, coherent 100 GbE, 200 GbE, and/or 400 GbE UP 1406. More specifically, the one or more optical data signals 10G NRZ, coherent 100 GbE, 200 GbE, and/or 400 GbE UP 1406 may be demultiplexed into twenty 10G NRZ, coherent 100 GbE, 200 GbE, and/or 400 GbE optical data signals, each of which may have a unique wavelength. DWDM 1405 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 1404. Each of the transponders of 20×10G NRZ, coherent 100 GbE, 200 GbE, and/or 400 GbE UP 1404 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 1404 may transmit the twenty SONET/SDH optical data signals to the MTC on the SONET/SDH optical network connection.

Figure 15:
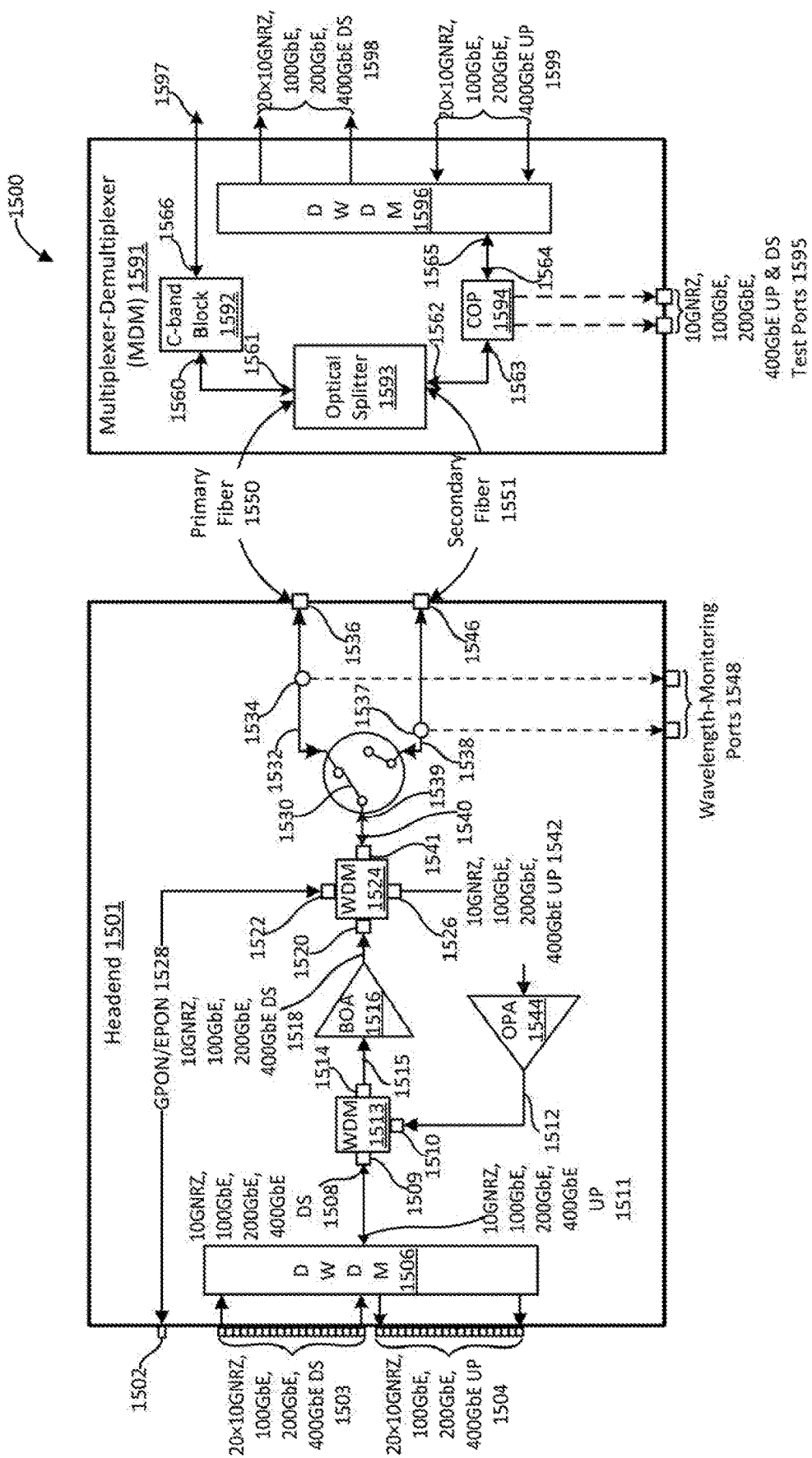
FIG. 15 depicts an access network diagram of an OCML headend and outside plant, in accordance with the disclosure.

FIG. 15 depicts an access network diagram of an OCML headend and outside plant, in accordance with the disclosure. FIG. 15 shows a schematic of an OCML headend according to at least one embodiment of the disclosure. As shown in FIG. 15, headend 1501 is a smart integrated OCML headend, which is a circuit, comprising a DWDM (e.g., DWDM 1506), a first WDM (e.g., WDM 1513), a second WDM (e.g., WDM 1524), a GPON/EPON connector (e.g., GPON/EPON 1528), a booster amplifier BOA (e.g., BOA 1516), an optical pre-amplifier (OPA) (e.g., OPA 1544), an optical switch 1530 to feed a primary optical fiber (e.g., Primary Fiber 1550) or secondary (backup) optical fiber (e.g., Secondary Fiber 1551). DWDM 1506 may be similar in functionality to DWDM 106 and WDM 1513 and WDM 1544 may be similar in functionality to WDM 108. The disclosure provides a method of transporting multiple 10G NRZ, coherent 100 GbE, 200 GbE, and/or 400 GbE and GPON/EPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in the MTC facility. A field hub or outside plant may house a multiplexer-demultiplexer (MDM) (e.g., MDM 1591).

The EPON signals may operate with the same optical frequencies as GPON and time division multiple access (TDMA). The raw line data rate is 1.25 Gbits/s in both the downstream and upstream directions.

EPON is fully compatible with other Ethernet standards, so no conversion or encapsulation is necessary when connecting to Ethernet-based networks on either end. The same Ethernet frame is used with a payload of up to 1518 bytes. EPON may not use a carrier sense multiple access (CSMA)/collision detection (CD) access method used in other versions of Ethernet.

There is a 10-Gbit/s Ethernet version designated as 802.3ay. The line rate may be 10.3125 Gbits/s. The primary mode is 10 Gbits/s upstream as well as downstream. A variation uses 10 Gbits/s downstream and 1 Gbit/s upstream. The 10-Gbit/s versions use different optical wavelengths on the fiber, 1571 to 1591 nm downstream and 1260 to 1280 nm upstream so the 10-Gbit/s system can be wavelength multiplexed on the same fiber as a standard 1-Gbit/s system.

In one aspect, headend 1501 may comprise twenty 10G NRZ, coherent 100 GbE, 200 GbE, and/or 400 GbE downstream (DS) transponders (e.g., 20×10G NRZ, coherent 100 GbE, 200 GbE, and/or 400 GbE DS 1503) and twenty 10G NRZ, coherent 100 GbE, 200 GbE, and/or 400 GbE upstream (UP) transponders (e.g., 20×10G NRZ, coherent 100 GbE, 200 GbE, and/or 400 GbE UP 1504). 20×10G NRZ, coherent 100 GbE, 200 GbE, and/or 400 GbE DS 1503 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 1504 may receive upstream data over 10G NRZ, coherent 100 GbE, 200 GbE, and/or 400 GbE wavelengths. 20×10G NRZ, coherent 100 GbE, 200 GbE, and/or 400 GbE DS 1503 may comprise the same elements and perform the same operations as 20×10G NRZ, coherent 100 GbE, 200 GbE, and/or 400 GbE DS 190, and 20×10G NRZ, coherent 100 GbE, 200 GbE, and/or 400 GbE UP 1504 may comprise the same elements and perform the same operations as 20×10G NRZ, coherent 100 GbE, 200 GbE, and/or 400 GbE UP 188.

The operation of headend 1501 may be described by way of the processing of downstream optical data signals transmitted from headend 1501 to a field hub or outside plant, and the processing of upstream optical data signals received from the field hub or outside plant. Each of the transponders of 20×10G NRZ, coherent 100 GbE, 200 GbE, and/or 400GbEDS 1503 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 1503 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 1503 may generate twenty corresponding second optical data signals each of which has a unique wavelength.

DWDM 1506 may receive the twenty corresponding second optical data signals as an input and output a multi-wavelength downstream optical data signal (e.g., 10G NRZ, coherent 100 GbE, 200 GbE, and/or 400 GbE DS 1508) comprising the twenty corresponding second optical data signals onto a fiber. The multi-wavelength downstream optical data signal 10G NRZ, coherent 100 GbE, 200 GbE, and/or 400 GbE DS 1508 may be a 10G NRZ, coherent 100 GbE, 200 GbE, and/or 400 GbE optical data signal. More specifically, DWDM 1506 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 10G NRZ, coherent 100 GbE, 200 GbE, and/or 400 GbE DS 1508, may be input to WDM 1513. WDM 1513 may be a three port circulator, that receives multi-wavelength downstream optical data signal 10G NRZ, coherent 100 GbE, 200 GbE, and/or 400 GbE DS 1508 on port 1509, and outputs multi-wavelength downstream optical data signal 10G NRZ, coherent 100 GbE, 200 GbE, and/or 400 GbE DS 1515, on port 1514 as multi-wavelength downstream optical data signal 10G NRZ, coherent 100 GbE, 200 GbE, and/or 400 GbE DS 1515 to BOA 1516.

BOA 1516 may have a gain that is based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, BOA 1516 may be adjusted based at least in part on the attenuation coefficient and length of fiber that the egress optical data signal will travel. More specifically, the gain BOA 1516 may be $G=e^{(2\alpha L)}$, where a is the fiber attenuation coefficient, as explained above, and L is the length of the fiber (e.g., the length of primary fiber 1550 and/or the length of secondary fiber 1551). Multi-wavelength downstream optical data signal 10G NRZ, coherent 100 GbE, 200 GbE, and/or 400 GbE DS 1515 may be amplified by BOA 1516, and BOA 1516 may output multi-wavelength downstream optical data signal 10G NRZ, coherent 100 GbE, 200 GbE, and/or 400 GbE DS 1518 to port 1520 of WDM 1524. WDM 1524 outputs an egress optical data signal from port 1541, which may be a multi-wavelength optical data signal comprising 10G NRZ, coherent 100 GbE, 200 GbE, and/or 400 GbE, EPON, and/or GPON optical data signals. The EPON and/or GPON optical data signals may be received on a GPON/EPON connector (e.g., GPON/EPON 1528) from PON port 1502.

Egress optical data signal 1539 may be output by WDM 1524 and optical switch 1530 may switch egress optical data signal 1539 onto connector 1532 or connector 1538 depending on the position of switch 1530. In some embodiments, connector 1532 may be a primary connector and connector 1538 may be a secondary connector or a backup connector. Wavelength monitoring connector 1534 may connect connector 1532 to a first port of wavelength-monitoring ports 1548, and wavelength monitoring connector 1537 may connect connector 1538 to a second port of wavelength-monitoring ports 1548. Wavelength-monitoring ports 1548 may monitor the wavelengths in egress optical data signal 1539 via connector 1532 or connector 1538 depending on the position of switch 1530. Egress optical data signal 1530 may exit headend 1501 either via connector 1532 connected to primary fiber 1550, or via connector 1538 connected to secondary fiber 1551, depending on the position of switch 1530. Egress optical data signal 1539 may be transmitted on primary fiber 1550 to an optical splitter (e.g., the optical splitter 1593) inside of or collocated with a MDM (e.g., the MDM 1591). Egress optical data signal 1539 may be transmitted on secondary fiber 1551 to the optical splitter 1593.

Egress optical data signal 1539 may be received at optical splitter 1593 as an ingress optical data signal. Optical splitter 1593 may also be referred to as a beam splitter, and may comprise one or more quartz substrates of an integrated waveguide optical power distribution device. Optical splitter 1593 may be a passive optical network device. It may be an optical fiber tandem deice comprising one or more input terminals and one or more output terminals. Optical splitter 1539 may be Fused Biconical Taper (FBT) splitter or Planar Lightwave Circuit (PLC) splitter. Optical splitter 1593 may be a balanced splitter wherein optical splitter 1593 comprises 2 input fibers and one or more output fibers over which the ingress optical data signal may be spread proportionally. In some embodiments, the ingress optical data signal may not be spread proportionally across the output fibers of optical splitter 1593. In some embodiments, optical splitter 1593 may comprise two input fibers and 2 output fibers. A first input fiber of optical splitter 1593 may be connected to primary fiber 1550 and a second input fiber of optical splitter 1593 may be connected to secondary fiber 1551.

A first output fiber of optical splitter 1593 may be connected to a filter (e.g., C-band block 1592) that filters out packets of light, in the ingress optical data signal, with wavelengths between 1530 nm and 1565 nm. This range of wavelengths may coincide with a C-band of wavelengths. In some other embodiments, the filter may filter out packets of light with wavelengths not inclusive of the wavelengths between 1260 nm and 1520 nm and not inclusive of wavelengths between 1570 nm and 1660 nm. The packets of light with wavelengths inclusive of the wavelengths between 1260 nm and 1520 nm and inclusive of wavelengths between 1570 nm and 1660 nm, may correspond to the wavelengths of the packets of light carrying the one or more EPON and/or GPON optical data signals transmitted along GPON/EPON 1528. More specifically, optical splitter 1593, may receive one or more downstream EPON and/or GPON optical data signals 1560, in the ingress optical data signal, that corresponds to the one or more EPON and/or GPON optical data signals transmitted along GPON/EPON 1528. In some embodiments, the one or more downstream EPON and/or GPON optical data signals 1560 may have the same wavelength as GPON DS 806. Optical splitter 1593 may output the one or more downstream EPON and/or GPON optical data signals 1560, received in the ingress optical data signal, to C-band block 1592.

C-band block 1592 may output one or more downstream EPON and/or GPON optical data signals 1597 corresponding to the one or more downstream EPON and/or GPON optical data signals 1560 with wavelengths between 1260 nm and 1520 nm and wavelengths between 1570 nm and 1660 nm. The C-band block 1592 may transmit the one or more downstream EPON and/or GPON optical data signals 1597 to an express port (not shown in FIG. 15) collocated with, or attached to MDM 1591. In some embodiments, the express port may be located within the MDM 1591.

A second output fiber of optical splitter 1593 may be connected to coupled optical power (COP) 1594. COP 1594 may be a PON device that monitors the coupled optical power between Optical Splitter 1593 and DWDM 1596. In some embodiments, the coupled optical power may be a percentage value. For instance, the coupled optical power may be 1%. Optical splitter 1593, may receive one or more downstream 10G NRZ, coherent 100 GbE, 200 GbE, and/or 400 GbE optical data signals, in the ingress optical data signal, that corresponds to 10G NRZ, coherent 100 GbE, 200 GbE, and/or 400 GbE DS 1508. In some embodiments, the one or more downstream 10G NRZ, coherent 100 GbE, 200 GbE, and/or 400 GbE optical data signals may have the same wavelength as 10G NRZ, coherent 100 GbE, 200 GbE, and/or 400 GbE 808. Optical splitter 1593 may output the one or more downstream 10G NRZ, coherent 100 GbE, 200 GbE, and/or 400 GbE optical data signals 1563, received in the ingress optical data signal, to COP 1594. COP 1594 may output a first percentage of the one or more downstream 10G NRZ, coherent 100 GbE, 200 GbE, and/or 400 GbE optical data signals 1563 to 10G NRZ, coherent 100 GbE, 200 GbE, and/or 400 GbE upstream and downstream test ports (e.g., 10G NRZ, coherent 100 GbE, 200 GbE, and/or 400 GbE UP & DS Test Ports 1595). The first percentage may be a percentage of the one or more downstream 10G NRZ, coherent 100 GbE, 200 GbE, and/or 400 GbE optical data signals 1563 tested by the 10G NRZ, coherent 100 GbE, 200 GbE, and/or 400 GbE upstream and downstream test ports. The first percentage of the one or more downstream 10G NRZ, coherent 100 GbE, 200 GbE, and/or 400 GbE optical data signals 1563 may be a monitoring signal used by a spectrum analyzer to measure optical power levels of a specific wavelength. The first percentage of the one or more downstream 10G NRZ, coherent 100 GbE, 200 GbE, and/or 400 GbE optical data signals 1563 may also be used by the spectrum analyzer to analyze certain characteristics of the wavelengths of the first percentage of the one or more downstream 10G NRZ, coherent 100 GbE, 200 GbE, and/or 400 GbE optical data signals 1563. COP 1594 may output a second percentage of the one or more downstream 10G NRZ, coherent 100 GbE, 200 GbE, and/or 400 GbE optical data signals 1565 to DWDM 1596. Because the one or more downstream 10G NRZ, coherent 100 GbE, 200 GbE, and/or 400 GbE optical data signals 1565 may be a multi-wavelength downstream optical data signal DWDM 1596 may demultiplex the one or more downstream 10G NRZ, coherent 100 GbE, 200 GbE, and/or 400 GbE optical data signals 1565 into individual optical data signals in accordance with the individual wavelengths of the one or more downstream 10G NRZ, coherent 100 GbE, 200 GbE, and/or 400 GbE optical data signals 1565. More specifically, the one or more downstream 10G NRZ, coherent 100 GbE, 200 GbE, and/or 400 GbE optical data signals 1565 may be demultiplexed into twenty 10G NRZ, coherent 100 GbE, 200 GbE, and/or 400 GbE optical data signals, each of which may have a unique wavelength. DWDM 1596 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE DS 1598. Each of the transponders of 20×10G NRZ, coherent 100 GbE, 200 GbE, and/or 400 GbE DS 1598 may be in a RPD (not shown) and may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. In some embodiments, the RPD may be similar in functionality to Remote PHY Node 207. The RPD may convert the SONET/SDH optical data signals into an electrical signal that may be transmitted over one or more coaxial cables. MDM 1591 may be similar in functionality to MDM 208 and may be connected to the RPD in a way similar to the connection between MDM 208 and Remote PHY Node 207.

The operation of MDM 1591 may be further described by way of the processing of an upstream optical data signal transmitted to headend 1501. Each of the transponders of 20×10G NRZ, coherent 100 GbE, 200 GbE, and/or 400 GbE UP 1599 may receive a SONET/SDH optical data signal and each of the transponders may convert the SONET/SDH optical data signal into an electrical signal. Each of the transponders of 20×10G NRZ, coherent 100 GbE, 200 GbE, and/or 400 GbE UP 1599 may receive the SONET/SDH optical data signal from the RPD. The RPD may also convert one or more electrical signals into the SONET/SDH optical data signal.

More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE UP 1599 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE UP 1599 may generate twenty corresponding second optical data signals each of which has a unique wavelength.

DWDM 1596 may receive twenty corresponding second optical data signals as an input and output a multi-wavelength upstream optical data signal (e.g., multi-wavelength upstream optical data signal 1564) comprising the twenty corresponding second optical data signals. The multi-wavelength upstream optical data signal 1564 may be a 10G NRZ, coherent 100 GbE, 200 GbE, and/or 400 GbE optical data signal. More specifically, DWDM 1596 may multiplex the twenty corresponding second optical data signals onto the fiber connecting DWDM 1596 and COP 1594, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength upstream optical data signal 1564, may be input to COP 1594. COP 1594 may output a first percentage of the multi-wavelength upstream optical data signal 1564 to 10G NRZ, coherent 100 GbE, 200 GbE, and/or 400 GbE upstream and downstream test ports (e.g., 10G NRZ, coherent 100 GbE, 200 GbE, and/or 400 GbE UP & DS Test Ports 1695). The first percentage may be a percentage of the multi-wavelength upstream optical data signal 1564 tested by the 10G NRZ, coherent 100 GbE, 200 GbE, and/or 400 GbE upstream and downstream test ports COP 1594 may output a second percentage of the multi-wavelength upstream optical data signal 1564 to optical splitter 1593 as the multi-wavelength upstream optical data signal 1562.

C-band block 1592 may receive one or more upstream EPON and/or GPON optical data signals 1566 from an express port (not shown in FIG. 15) collocated with, or attached to MDM 1591. In some embodiments, the express port may be located within the MDM 1591. C-band block 1592 may filter out packets of light, in the one or more upstream EPON and/or GPON optical data signals 1566, with wavelengths between 1530 nm and 1565 nm. Thus C-band block 1592 may output one or more upstream EPON and/or GPON optical data signals 1561 with wavelengths between 1260 nm and 1520 nm and wavelengths between 1570 nm and 1660 nm.

Optical splitter 1593 may receive one or more upstream EPON and/or GPON optical data signals 1561, and may also receive the multi-wavelength upstream optical data signal 1562, and may multiplex the multi-wavelength one or more upstream EPON and/or GPON optical data signals 1561 with the multi-wavelength upstream optical data signal 1562. Optical splitter 1593 outputs an egress optical data signal, which may be a multi-wavelength optical data signal comprising 10G NRZ, coherent 100 GbE, 200 GbE, and/or 400 GbE, GPON/EPON optical data signals corresponding to the multiplexed multi-wavelength one or more upstream EPON and/or GPON optical data signals 1561 and multi-wavelength upstream optical data signal 1562. Optical splitter 1593 may output the egress optical data signal onto primary fiber 1550 connecting the optical splitter 1593 to port 1536. Optical splitter 1593 may also output the egress optical data signal onto secondary fiber 1551 connecting the optical splitter 1593 to port 1546.

The operation of headend 1501 may be described by way of the processing of upstream optical data signals received at headend 1501 from MDM 1591. For instance, a multi-wavelength ingress optical data signal, comprising one or more of a 10G NRZ, coherent 100 GbE, 200 GbE, and/or 400 GbE optical data signal, EPON optical data signal, and/or GPON optical data signal, may be an upstream optical data signal received on primary fiber 1550 or secondary fiber 1551 depending on the position of switch 1530. The upstream optical data signal may be substantially the same as the egress optical data signal.

The multi-wavelength ingress optical data signal 1540 may traverse connector 1532 and switch 1530, before entering WDM 1524 via port 1541 if switch 1530 is connected to connector 1532. The multi-wavelength ingress optical data signal may traverse connector 1538 and switch 1530, before entering WDM 1524 via port 1541 if switch 1530 is connected to connector 1538. WDM 1524 may demultiplex one or more 10G NRZ, coherent 100 GbE, 200 GbE, and/or 400 GbE optical data signals, EPON optical data signals, and/or GPON optical data signals from ingress optical data signal 1540. WDM 1524 may transmit the one or more EPON and/or GPON optical data signals along GPON/EPON 1528 to PON connector 1502 via port 1522. WDM 1524 may transmit the one or more 10G NRZ, coherent 100 GbE, 200 GbE, and/or 400 GbE optical data signals (e.g., 10 GbE UP 1542) out of port 1526 to OPA 1544.

The one or more 10G NRZ, coherent 100 GbE, 200 GbE, and/or 400 GbE optical data signals 10G NRZ, coherent 100 GbE, 200 GbE, and/or 400 GbE UP 1542 may be received by OPA 1544. The one or more optical data signals 10G NRZ, coherent 100 GbE, 200 GbE, and/or 400 GbE UP 1542 may comprise 10G NRZ, coherent 100 GbE, 200 GbE, and/or 400 GbE optical data signals. A gain associated OPA 1544 may be based at least in part on a distance that 10G NRZ, coherent 100 GbE, 200 GbE, and/or 400 GbE optical data signals have to travel, similar to that of BOA 1516. The one or more optical data signals 10G NRZ, coherent 100 GbE, 200 GbE, and/or 400 GbE UP 1542 may be amplified by OPA 1544, and OPA 1544 may output multi-wavelength upstream optical data signal 1512 to WDM 1513.

WDM 1513 may receive the multi-wavelength upstream optical data signal 1512 on port 1510 of WDM 1513, and may output one or more optical data signals 10G NRZ, coherent 100 GbE, 200 GbE, and/or 400 GbE UP 1511 to DWDM 1513. The one or more optical data signals 10G NRZ, coherent 100 GbE, 200 GbE, and/or 400 GbE UP 1511 are substantially the same as multi-wavelength upstream optical data signal 1512. WDM 1513 may function as a circulator when receiving multi-wavelength upstream optical data signal 1512 on port 1510 and outputting the one or more optical data signals 10G NRZ, coherent 100 GbE, 200 GbE, and/or 400 GbE UP 1511 on port 1509. The one or more optical data signals 10G NRZ, coherent 100 GbE, 200 GbE, and/or 400 GbE UP 1511 may be received by DWDM 1506.

The one or more optical data signals 10G NRZ, coherent 100 GbE, 200 GbE, and/or 400 GbE UP 1511 may comprise 10GNRZ, coherent 100 GbE, 200 GbE, and/or 400 GbE optical data signals. DWDM 1506 may demultiplex the one or more optical data signals 10G NRZ, coherent 100 GbE, 200 GbE, and/or 400 GbE UP 1511 into individual optical data signals in accordance with the individual wavelengths of the one or more optical data signals 10G NRZ, coherent 100 GbE, 200 GbE, and/or 400 GbE UP 1511. More specifically, the one or more optical data signals 10G NRZ, coherent 100 GbE, 200 GbE, and/or 400 GbE UP 1511 may be demultiplexed into twenty 10G NRZ, coherent 100 GbE, 200 GbE, and/or 400 GbE optical data signals, each of which may have a unique wavelength. DWDM 1506 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 1504. Each of the transponders of 20×10G NRZ, coherent 100 GbE, 200 GbE, and/or 400 GbE UP 1504 may convert a received corresponding 10G NRZ, coherent 100 GbE, 200 GbE, and/or 400 GbE optical data signal, of the coherent 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 1504 may transmit the twenty SONET/SDH optical data signals to the MTC on the SONET/SDH optical network connection.

Figure 16:
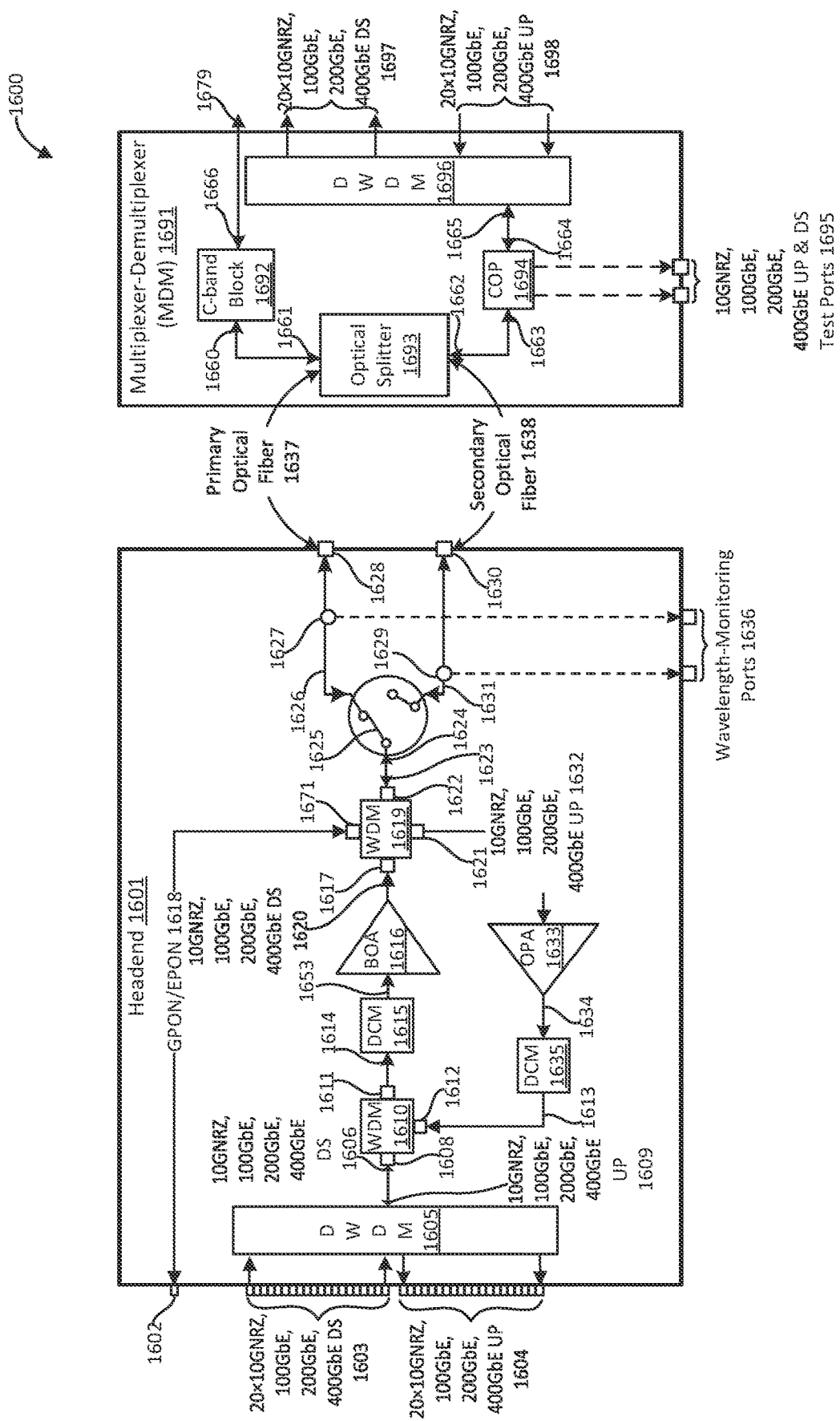
FIG. 16 depicts an access network diagram of an OCML headend and outside plant, in accordance with the disclosure.

FIG. 16 depicts a process of transmitting optical signals with the OCML headend, in accordance with the disclosure. As shown in FIG. 16, headend 1601 is a smart integrated OCML headend, which is a circuit, comprising one or more EDFAs (e.g., booster optical amplifier (BOA) 1616 and optical pre-amplifier (OPA) 1633), a DWDM (e.g., DWDM 1605), one or more WDMs (e.g., WDM 1610 and 1619), one or more DCMs (e.g., DCM 1615 and 1635), and an optical switch 1625 to feed a primary optical fiber (e.g., Primary Fiber 1637) or secondary (backup) optical fiber (e.g., Secondary Fiber 1638). The disclosure provides a method of transporting multiple 10G NRZ, coherent 100 GbE, 200 GbE, and/or 400 GbE and GPON/XGPON/10GEPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 1691).

In one aspect, headend 1601 may comprise twenty 10G NRZ, coherent 100 GbE, 200 GbE, and/or 400 GbE downstream (DS) transponders (e.g., 20×10G NRZ, coherent 100 GbE, 200 GbE, and/or 400 GbE DS 1603) and twenty 10G NRZ, coherent 100 GbE, 200 GbE, and/or 400 GbE upstream (UP) transponders (e.g., 20×10G NRZ, coherent 100 GbE, 200 GbE, and/or 400 GbE UP 1604). 20×10G NRZ, coherent 100 GbE, 200 GbE, and/or 400 GbE DS 1603 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 1604 may receive upstream data over 10G NRZ, coherent 100 GbE, 200 GbE, and/or 400 GbE wavelengths. Headend 1601 may a connector (e.g., PON 1602), that may transmit and receive GPON and/or EPON signals on a GPON/EPON connector (e.g., GPON/EPON 1618). Headend 1601 may also comprise two wavelength-monitoring ports (e.g., wavelength-monitoring ports 1636), a primary optical fiber (e.g., primary optical fiber 1637) and a secondary optical fiber (e.g., secondary optical fiber 1638) that transmit and receive a plurality of multi-wavelength 10G NRZ, coherent 100 GbE, 200 GbE, and/or 400 GbE and GPON/EPON optical signals. Primary optical fiber 1637 and secondary optical fiber 1638 may transmit a first plurality of multi-wavelength 10G NRZ, coherent 100 GbE, 200 GbE, and/or 400 GbE, GPON, and/or XGPON/10GEPON optical signals from headend 1601 to a multiplexer-demultiplexer (MDM) in a outside plant (e.g., MDM 1691), and may receive a second plurality of multi-wavelength 10G NRZ, coherent 100 GbE, 200 GbE, and/or 400 GbE, GPON, and/or EPON optical signals from MDM 1691.

In one aspect, headend 1601 can transmit and receive up to twenty bi-directional 10G NRZ, coherent 100 GbE, 200 GbE, and/or 400 GbE optical data signals, but the actual number of optical data signals may depend on operational needs. That is, headend 1601 can transport more or less than twenty 10G NRZ, coherent 100 GbE, 200 GbE, and/or 400 GbE downstream optical signals, or more or less than twenty 10G NRZ, coherent 100 GbE, 200 GbE, and/or 400 GbE upstream optical data signals, based on the needs of customers' networks (e.g., Remote PHY Network 216, Enterprise Network 218, Millimeter Wave Network 214). These customer networks may be connected to headend 1601 through an optical ring network (e.g., metro access optical ring network 206).

The operation of headend 1601 may be described by way of the processing of downstream optical data signals transmitted from headend 1601 to a field hub or outside plant, and the processing of upstream optical data signals received from the field hub or outside plant. Each of the transponders of 20×10G NRZ, coherent 100 GbE, 200 GbE, and/or 400 GbE DS 1603 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 1603 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 1603 may generate twenty corresponding second optical data signals each of which has a unique wavelength.

DWDM 1605 may receive the twenty corresponding second optical data signals as an input and output a multi-wavelength downstream optical data signal (e.g., 10G NRZ, coherent 100 GbE, 200 GbE, and/or 400 GbE DS 1606) comprising the twenty corresponding second optical data signals onto a fiber. More specifically, DWDM 1605 may multiplex the twenty corresponding second optical data signals onto the fiber, wherein the twenty multiplexed corresponding second optical data signals compose the multi-wavelength downstream optical data signal. The multi-wavelength downstream optical data signal may have a wavelength comprising the twenty wavelengths of the twenty corresponding second optical data signals.

The multi-wavelength downstream optical data signal 10G NRZ, coherent 100 GbE, 200 GbE, and/or 400 GbE DS 1606, may be input to a WDM (e.g. WDM 1610). WDM 1610 may be a three port wave division multiplexer (WDM), or a three port circulator, that receives 10G NRZ, coherent 100 GbE, 200 GbE, and/or 400 GbE DS 1606 on port 1608 and outputs 10G NRZ, coherent 100 GbE, 200 GbE, and/or 400 GbE DS 1606 on port 1611 as 10G NRZ, coherent 100 GbE, 200 GbE, and/or 400 GbE DS 1614. 10G NRZ, coherent 100 GbE, 200 GbE, and/or 400 GbE DS 1614 may be substantially the same as 10G NRZ, coherent 100 GbE, 200 GbE, and/or 400 GbE DS 1606 because WDM 1610 may function as a circulator when 10G NRZ, coherent 100 GbE, 200 GbE, and/or 400 GbE DS 1606 is input on port 1608.

10G NRZ, coherent 100 GbE, 200 GbE, and/or 400 GbE DS 1614 may be input into a DCM (e.g., DCM 1615) to compensate for dispersion that 10G NRZ, coherent 100 GbE, 200 GbE, and/or 400 GbE DS 1614 may experience after being amplified by an EDFA and multiplexed by a WDM, with other optical data signals, that are downstream from the DCM. The amplified and multiplexed optical data signal may be referred to as an egress optical data signal, as it is the optical data signal that may be transmitted out of headend 1601 over a fiber connecting headend 1601 to a field hub or outside plant containing MDM 1691. In some embodiments, DCM 1615 may be configured to balance positive and/or negative dispersion that may be introduced to the egress optical data signal by the fiber. In some embodiments, DCM 1615 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 1615 may be configured to reduce the sensitivity or OSNR level requirement in a photodetector or fiber-optic sensor in the transceiver, which may drastically reduce the cost of the transceivers used in the DWDM located at the field hub or outside plant.

DCM 1615 may input 10G NRZ, coherent 100 GbE, 200 GbE, and/or 400 GbE DS 1614 and may output 10G NRZ, coherent 100 GbE, 200 GbE, and/or 400 GbE DS 1653 to an EDFA (e.g., BOA 1616). A gain of BOA 1616 may be based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, the gain of BOA 1616 may be adjusted based at least in part on the attenuation coefficient and length of fiber that the egress optical data signal will travel. More specifically, the gain of BOA 1616 may be $G=e^{(2\alpha L)}$, where a is the fiber attenuation coefficient, as explained above, and L is the length of the fiber (e.g., the length of primary fiber 1637 and/or the length of secondary fiber 1638). 10G NRZ, coherent 100 GbE, 200 GbE, and/or 400 GbE DS 1653 may be amplified by BOA 1616, and BOA 1616 may output 10G NRZ, coherent 100 GbE, 200 GbE, and/or 400 GbE DS 1620 to port 1617 of WDM 1619.

WDM 1619 may be a WDM that may multiplex 10G NRZ, coherent 100 GbE, 200 GbE, and/or 400 GbE DS 1620 with one or more PON signals received on (GPON/EPON 1618). 10G NRZ, coherent 100 GbE, 200 GbE, and/or 400 GbE DS 1620 may be a multi-wavelength optical data signal, wherein the wavelengths comprise the same wavelengths as 10G NRZ, coherent 100 GbE, 200 GbE, and/or 400 GbE DS 1606. In some embodiments, the wavelengths of the multi-wavelength optical data signal 10G NRZ, coherent 100 GbE, 200 GbE, and/or 400 GbE DS 1620 may be within the conventional c band of wavelengths, which may include wavelengths within the 1520 nm-1565 nm range. GPON 184 may be a fiber carrying a GPON optical data signal with a wavelength of 1490 nm. The GPON signal may be input to WDM 1619 on port 1671. WDM 1619 outputs an egress optical data signal from port 1622, which may be a multi-wavelength optical data signal comprising 10G NRZ, coherent 100 GbE, 200 GbE, and/or 400 GbE, EPON, and GPON optical data signals. WDM 1619 may multiplex 10G NRZ, coherent 100 GbE, 200 GbE, and/or 400 GbE DS 1620, EPON optical data signals, and GPON optical data signals the same way DWDM 1605 multiplexes optical data signals. The egress optical data signal (e.g., egress optical data signal 1624) may be output on port 1622 of WDM 1619 and optical switch 1625 may switch egress optical data signal 1624 out of connector 1626 or connector 1631. In some embodiments, connector 1626 may be a primary connector and connector 1631 may be a secondary connector or a backup connector. Wavelength monitoring connector 1627 may connect connector 1626 to a first port of wavelength-monitoring ports 1636, and wavelength monitoring connector 1629 may connect connector 1631 to a second port of wavelength-monitoring ports 1636. Wavelength-monitoring ports 1636 may monitor the wavelengths in egress optical data signal 1624 via connector 1626 or connector 1631 depending on the position of switch 1625. Egress optical data signal 1624 may exit headend 1601 either via connector 1626 connected to primary fiber 1637 or via connector 1631 connected to secondary fiber 1638 depending on the position of switch 1625. Egress optical data signal 1624 may be transmitted on primary fiber 1637 to a first connector an optical splitter (e.g., the optical splitter 1693) inside of or collocated with a MDM (e.g., the MDM 1691). Egress optical data signal 1539 may be transmitted on secondary fiber 1638 to a second connector in optical splitter 1693.

Egress optical data signal 1624 may be received at optical splitter 1693 as an ingress optical data signal. Optical splitter 1693 may also be referred to as a beam splitter, and may comprise one or more quartz substrates of an integrated waveguide optical power distribution device. Optical splitter 1693 may be a passive optical network device. It may be an optical fiber tandem deice comprising one or more input terminals and one or more output terminals. Optical splitter 1639 may be Fused Biconical Taper (FBT) splitter or Planar Lightwave Circuit (PLC) splitter. Optical splitter 1693 may be a balanced splitter wherein optical splitter 1693 comprises 2 input fibers and one or more output fibers over which the ingress optical data signal may be spread proportionally. In some embodiments, the ingress optical data signal may not be spread proportionally across the output fibers of optical splitter 1693. In some embodiments, optical splitter 1693 may comprise two input fibers and 2 output fibers. A first input fiber of optical splitter 1693 may be connected to primary fiber 1637 and a second input fiber of optical splitter 1593 may be connected to secondary fiber 1638.

A first output fiber of optical splitter 1693 may be connected to a filter (e.g., C-band block 1692) that filters out packets of light, in the ingress optical data signal, with wavelengths between 1530 nm and 1565 nm. This range of wavelengths may coincide with a C-band of wavelengths. In some other embodiments, the filter may filter out packets of light with wavelengths not inclusive of the wavelengths between 1260 nm and 1520 nm and not inclusive of wavelengths between 1570 nm and 1660 nm. The packets of light with wavelengths inclusive of the wavelengths between 1260 nm and 1520 nm and inclusive of wavelengths between 1570 nm and 1660 nm, may correspond to the wavelengths of the packets of light carrying the one or more EPON and/or GPON optical data signals transmitted along GPON/EPON 1618. More specifically, optical splitter 1693, may receive one or more downstream EPON and/or GPON optical data signals 1660, in the ingress optical data signal, that corresponds to the one or more EPON and/or GPON optical data signals transmitted along GPON/EPON 1618. In some embodiments, the one or more downstream EPON and/or GPON optical data signals 1660 may have the same wavelength as GPON DS 806. Optical splitter 1693 may output the one or more downstream EPON and/or GPON optical data signals 1660, received in the ingress optical data signal, to C-band block 1692.

C-band block 1692 may output one or more downstream EPON and/or GPON optical data signals 1697 corresponding to the one or more downstream EPON and/or GPON optical data signals 1660 with wavelengths between 1260 nm and 1520 nm and wavelengths between 1570 nm and 1660 nm. The C-band block 1692 may transmit the one or more downstream EPON and/or GPON optical data signals 1697 to an express port (not shown in FIG. 16) collocated with, or attached to MDM 1691. In some embodiments, the express port may be located within the MDM 1691.

A second output fiber of optical splitter 1693 may be connected to coupled optical power (COP) 1694. COP 1694 may be a PON device that monitors the coupled optical power between Optical Splitter 1693 and DWDM 1696. In some embodiments, the coupled optical power may be a percentage value. For instance, the coupled optical power may be 1%. Optical splitter 1693, may receive one or more downstream 10G NRZ, coherent 100 GbE, 200 GbE, and/or 400 GbE optical data signals, in the ingress optical data signal, that corresponds to 10G NRZ, coherent 100 GbE, 200 GbE, and/or 400 GbE DS 1608. In some embodiments, the one or more downstream 10G NRZ, coherent 100 GbE, 200 GbE, and/or 400 GbE optical data signals may have the same wavelength as 10G NRZ, coherent 100 GbE, 200 GbE, and/or 400 GbE 808. Optical splitter 1693 may output the one or more downstream 10G NRZ, coherent 100 GbE, 200 GbE, and/or 400 GbE optical data signals 1663, received in the ingress optical data signal, to COP 1694. COP 1694 may output a first percentage of the one or more downstream 10G NRZ, coherent 100 GbE, 200 GbE, and/or 400 GbE optical data signals 1663 to 10G NRZ, coherent 100 GbE, 200 GbE, and/or 400 GbE upstream and downstream test ports (e.g., 10G NRZ, coherent 100 GbE, 200 GbE, and/or 400 GbE UP & DS Test Ports 1695). The first percentage may be a percentage of the one or more downstream 10G NRZ, coherent 100 GbE, 200 GbE, and/or 400 GbE optical data signals 1663 tested by the 10G NRZ, coherent 100 GbE, 200 GbE, and/or 400 GbE upstream and downstream test ports. The first percentage of the one or more downstream 10G NRZ, coherent 100 GbE, 200 GbE, and/or 400 GbE optical data signals 1663 may be a monitoring signal used by a spectrum analyzer to measure optical power levels of a specific wavelength. The first percentage of the one or more downstream 10G NRZ, coherent 100 GbE, 200 GbE, and/or 400 GbE optical data signals 1663 may also be used by the spectrum analyzer to analyze certain characteristics of the wavelengths of the first percentage of the one or more downstream 10G NRZ, coherent 100 GbE, 200 GbE, and/or 400 GbE optical data signals 1663. COP 1694 may output a second percentage of the one or more downstream 10G NRZ, coherent 100 GbE, 200 GbE, and/or 400 GbE optical data signals 1665 to DWDM 1696.

Because the one or more downstream 10G NRZ, coherent 100 GbE, 200 GbE, and/or 400 GbE optical data signals 1665 may be a multi-wavelength downstream optical data signal DWDM 1696 may demultiplex the one or more downstream 10G NRZ, coherent 100 GbE, 200 GbE, and/or 400 GbE optical data signals 1665 into individual optical data signals in accordance with the individual wavelengths of the one or more downstream 10G NRZ, coherent 100 GbE, 200 GbE, and/or 400 GbE optical data signals 1665. More specifically, the one or more downstream 10G NRZ, coherent 100 GbE, 200 GbE, and/or 400 GbE optical data signals 1665 may be demultiplexed into twenty 10G NRZ, coherent 100 GbE, 200 GbE, and/or 400 GbE optical data signals, each of which may have a unique wavelength. DWDM 1696 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE DS 1698. Each of the transponders of 20×10G NRZ, coherent 100 GbE, 200 GbE, and/or 400 GbE DS 1698 may be in a RPD (not shown) and may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. In some embodiments, the RPD may be similar in functionality to Remote PHY Node 207. The RPD may convert the SONET/SDH optical data signals into an electrical signal that may be transmitted over one or more coaxial cables. MDM 1691 may be similar in functionality to MDM 208 and may be connected to the RPD in a way similar to the connection between MDM 208 and Remote PHY Node 207.

The operation of MDM 1691 may be further described by way of the processing of an upstream optical data signal transmitted to headend 1601. Each of the transponders of 20×10G NRZ, coherent 100 GbE, 200 GbE, and/or 400 GbE UP 1699 may receive a SONET/SDH optical data signal and each of the transponders may convert the SONET/SDH optical data signal into an electrical signal. Each of the transponders of 20×10G NRZ, coherent 100 GbE, 200 GbE, and/or 400 GbE UP 1699 may receive the SONET/SDH optical data signal from the RPD. The RPD may also convert one or more electrical signals into the SONET/SDH optical data signal.

More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE UP 1699 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE UP 1699 may generate twenty corresponding second optical data signals each of which has a unique wavelength.

DWDM 1696 may receive twenty corresponding second optical data signals as an input and output a multi-wavelength upstream optical data signal (e.g., multi-wavelength upstream optical data signal 1664) comprising the twenty corresponding second optical data signals. The multi-wavelength upstream optical data signal 1664 may be a 10G NRZ, coherent 100 GbE, 200 GbE, and/or 400 GbE optical data signal. More specifically, DWDM 1696 may multiplex the twenty corresponding second optical data signals onto the fiber connecting DWDM 1696 and COP 1694, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength upstream optical data signal 1664, may be input to COP 1694. COP 1694 may output a first percentage of the multi-wavelength upstream optical data signal 1664 to 10G NRZ, coherent 100 GbE, 200 GbE, and/or 400 GbE upstream and downstream test ports (e.g., 10G NRZ, coherent 100 GbE, 200 GbE, and/or 400 GbE UP & DS Test Ports 1695). The first percentage may be a percentage of the multi-wavelength upstream optical data signal 1664 tested by the 10G NRZ, coherent 100 GbE, 200 GbE, and/or 400 GbE upstream and downstream test ports. The first percentage of the multi-wavelength upstream optical data signal 1664 may be a monitoring signal used by a spectrum analyzer to measure optical power levels of a specific wavelength in the multi-wavelength upstream optical data signal 1664. The first percentage of the multi-wavelength upstream optical data signal 1664 may also be used by the spectrum analyzer to analyze certain characteristics of the wavelengths of the first percentage of the multi-wavelength upstream optical data signal 1664. COP 1694 may output a second percentage of the multi-wavelength upstream optical data signal 1664 to optical splitter 1693 as the multi-wavelength upstream optical data signal 1662.

C-band block 1692 may receive one or more upstream EPON and/or GPON optical data signals 1666 from an express port (not shown in FIG. 16) collocated with, or attached to MDM 1691. In some embodiments, the express port may be located within the MDM 1691. C-band block 1692 may filter out packets of light, in the one or more upstream EPON and/or GPON optical data signals 1666, with wavelengths between 1530 nm and 1565 nm. Thus C-band block 1692 may output one or more upstream EPON and/or GPON optical data signals 1661 with wavelengths between 1260 nm and 1520 nm and wavelengths between 1570 nm and 1660 nm.

Optical splitter 1693 may receive one or more upstream EPON and/or GPON optical data signals 1661, and may also receive the multi-wavelength upstream optical data signal 1662, and may multiplex the multi-wavelength one or more upstream EPON and/or GPON optical data signals 1661 with the multi-wavelength upstream optical data signal 1662. Optical splitter 1693 outputs an egress optical data signal, which may be a multi-wavelength optical data signal comprising 10G NRZ, coherent 100 GbE, 200 GbE, and/or 400 GbE, GPON/EPON optical data signals corresponding to the multiplexed multi-wavelength one or more upstream EPON and/or GPON optical data signals 1661 and multi-wavelength upstream optical data signal 1662. Optical splitter 1693 may output the egress optical data signal onto primary fiber 1637 connecting the optical splitter 1693 to port 1628. Optical splitter 1693 may also output the egress optical data signal onto secondary fiber 1638 connecting the optical splitter 1693 to port 1630.

The operation of headend 1601 may be described by way of the processing of upstream optical data signals received at headend 1601 from a field hub or outside plant. For instance, a multi-wavelength ingress optical data signal, comprising one or more of a 10G NRZ, coherent 100 GbE, 200 GbE, and/or 400 GbE optical data signal, EPON optical data signal, and/or GPON optical data signal, may be an upstream optical data signal received on primary fiber 1637 or secondary fiber 1638 depending on the position of switch 1625. The upstream optical data signal may be substantially the same as the egress optical data signal.

Because the multi-wavelength ingress optical data signal is routed to port 1622 of WDM 1619, and is altered negligibly between connector 1626 and port 1622 or connector 1631 and port 1622, depending on the position of switch 1625, the multi-wavelength ingress optical data signal may be substantially the same as ingress optical data signal 1623. The multi-wavelength ingress optical data signal may traverse 1626 and switch 1625, before entering WDM 1619 via port 1622 if switch 1625 is connected to connector 1626. The multi-wavelength ingress optical data signal may traverse connector 1631 switch 1625, before entering WDM 1619 via port 1622 if switch 1625 is connected to connector 1631. WDM 1619 may demultiplex one or more 10G NRZ, coherent 100 GbE, 200 GbE, and/or 400 GbE optical data signals, EPON optical data signals, and/or GPON optical data signals from ingress optical data signal 1623. WDM 1619 may transmit the one or more EPON optical data signals along GPON 1618 to PON connector 1602. WDM 1619 may transmit the one or more 10G NRZ, coherent 100 GbE, 200 GbE, and/or 400 GbE optical data signals (e.g., 10 GbE UP 1632) out of port 1621 to OPA 1633.

A gain of OPA 1633 may be based at least in part on a distance that the SONET/SDH egress optical data signal has to travel. For example, the gain may be a function of a fiber attenuation coefficient α, which is a measure of the intensity of the attenuation of a beam of light as it traverses a length of an optical fiber segment on the SONET/SDH optical network connection. For instance, the gain of OPA 1633 may be adjusted based at least in part on the attenuation coefficient and length of fiber that the egress optical data signal will travel. More specifically, the gain of OPA 1633 may be $G=e^{(2\alpha L)}$, where a is the fiber attenuation coefficient, as explained above, and L is the length of the fiber (e.g., the length of the fiber of the SONET/SDH optical network connection). 10G NRZ, coherent 100 GbE, 200 GbE, and/or 400 GbE UP 1632 may be amplified by OPA 1633, and OPA 1633 may output 10G NRZ, coherent 100 GbE, 200 GbE, and/or 400 GbE UP 1634 to DCM 1635.

In some embodiments, DCM 1635 may be configured to balance positive and/or negative dispersion that may be introduced to a SONET/SDH egress optical data signal that may exit headend 1601 from 20×10G NRZ, coherent 100 GbE, 200 GbE, and/or 400 GbE UP 1604. The SONET/SDH egress optical data signal may be an upstream signal from a field hub or outside plant destined for a MTC. For example, a customer premise may be connected to the field hub or outside plant and may send one or more packets via a SONET/SDH network to the field hub or outside plant which may in turn transmit the one or more packets using 10G NRZ, coherent 100 GbE, 200 GbE, and/or 400 GbE optical data signals to headend 1601. The one or more packets may be destined for a company web server connected to the MTC via a backbone network. Because headend 1601 may be collocated in a STC that is connected to the MTC via an optical ring network, wherein the connection between the STC and MTC is an SONET/SDH optical network connection, DCM 1635 may be configured to compensate for positive and/or negative dispersion on the SONET/SDH optical network connection. That is DCM 1635 may be configured to reduce temporal broadening of the SONET/SDH ingress optical data signal or temporal contraction of the SONET/SDH ingress optical data signal. DCM 1635 may input 10G NRZ, coherent 100 GbE, 200 GbE, and/or 400 GbE UP 1634 and my output 10G NRZ, coherent 100 GbE, 200 GbE, and/or 400 GbE UP 1613 to WDM 1610.

WDM 1610 may receive 10G NRZ, coherent 100 GbE, 200 GbE, and/or 400 GbE UP 1613 on port 1612, and may output 10G NRZ, coherent 100 GbE, 200 GbE, and/or 400 GbE UP 1613 on port 1608 as a multi-wavelength upstream optical data signal (e.g., 10G NRZ, coherent 100 GbE, 200 GbE, and/or 400 GbE UP 1609). 10G NRZ, coherent 100 GbE, 200 GbE, and/or 400 GbE UP 1609 is substantially the same as 10G NRZ, coherent 100 GbE, 200 GbE, and/or 400 GbE UP 1613 is input to port 1612. 10G NRZ, coherent 100

GbE, 200 GbE, and/or 400 GbE UP 1609 may be received by DWDM 1605, and DWDM 1605 may demultiplex one or more 10G NRZ, coherent 100 GbE, 200 GbE, and/or 400 GbE optical data signals from 10G NRZ, coherent 100 GbE, 200 GbE, and/or 400 GbE UP 1609. Because 10GNRZ, coherent 100 GbE, 200 GbE, and/or 400 GbE UP 1609 is a dispersion compensated amplified version of the multi-wavelength ingress optical data signal, DWDM 1605 may demultiplex the one or more optical data signals into individual optical data signals in accordance with the individual wavelengths of any 10G NRZ, coherent 100 GbE, 200 GbE, and/or 400 GbE optical data signals in the multi-wavelength ingress optical data signal. More specifically, 10G NRZ, coherent 100 GbE, 200 GbE, and/or 400 GbE UP 1609 may be demultiplexed into twenty 10G NRZ, coherent 100 GbE, 200 GbE, and/or 400 GbE optical data signals, each of which may have a unique wavelength. DWDM 1605 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 1604. Each of the transponders of 20×10G NRZ, coherent 100 GbE, 200 GbE, and/or 400 GbE UP 1604 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 1604 may transmit the twenty SONET/SDH optical data signals to the MTC on the SONET/SDH optical network connection.

Figure 17:
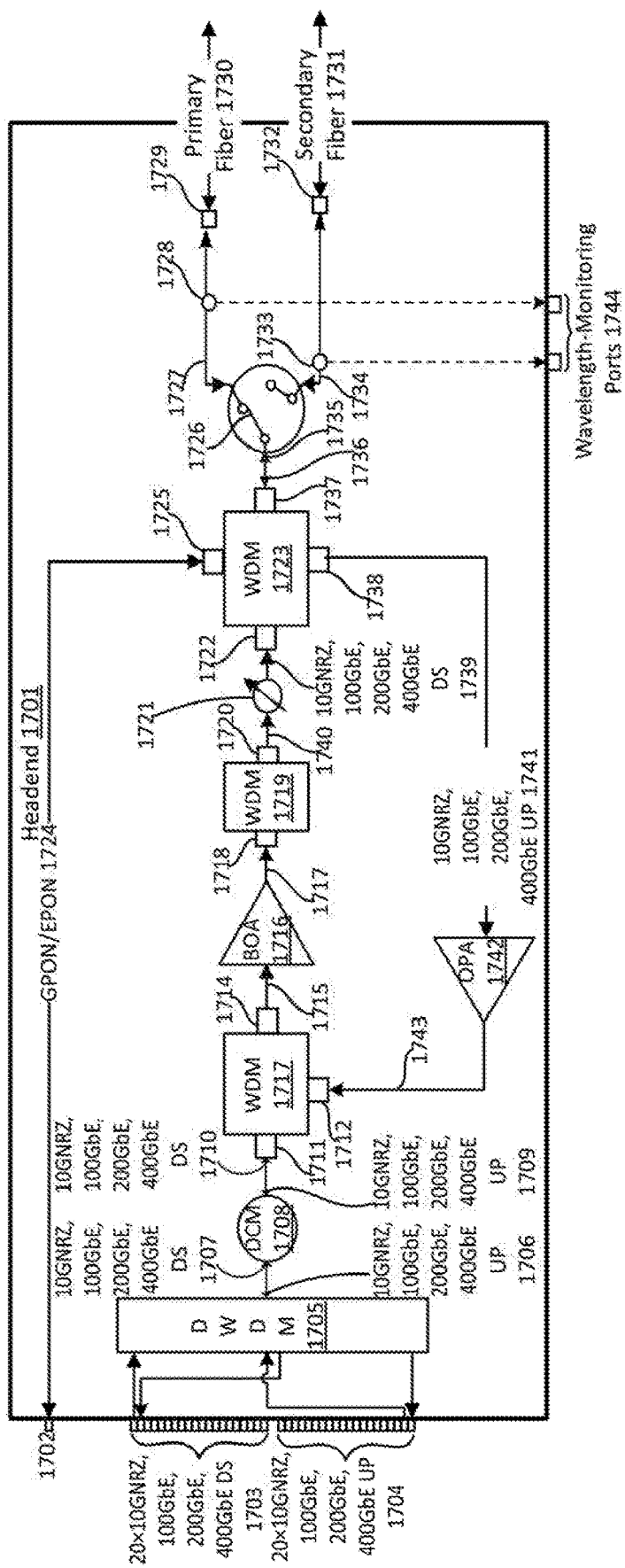
FIG. 17A depicts an access network diagram of an OCML headend, in accordance with the disclosure.
FIG. 17B depicts an access network diagram of a multiplexer-demultiplexer (MDM), in accordance with the disclosure.
Figure 17:
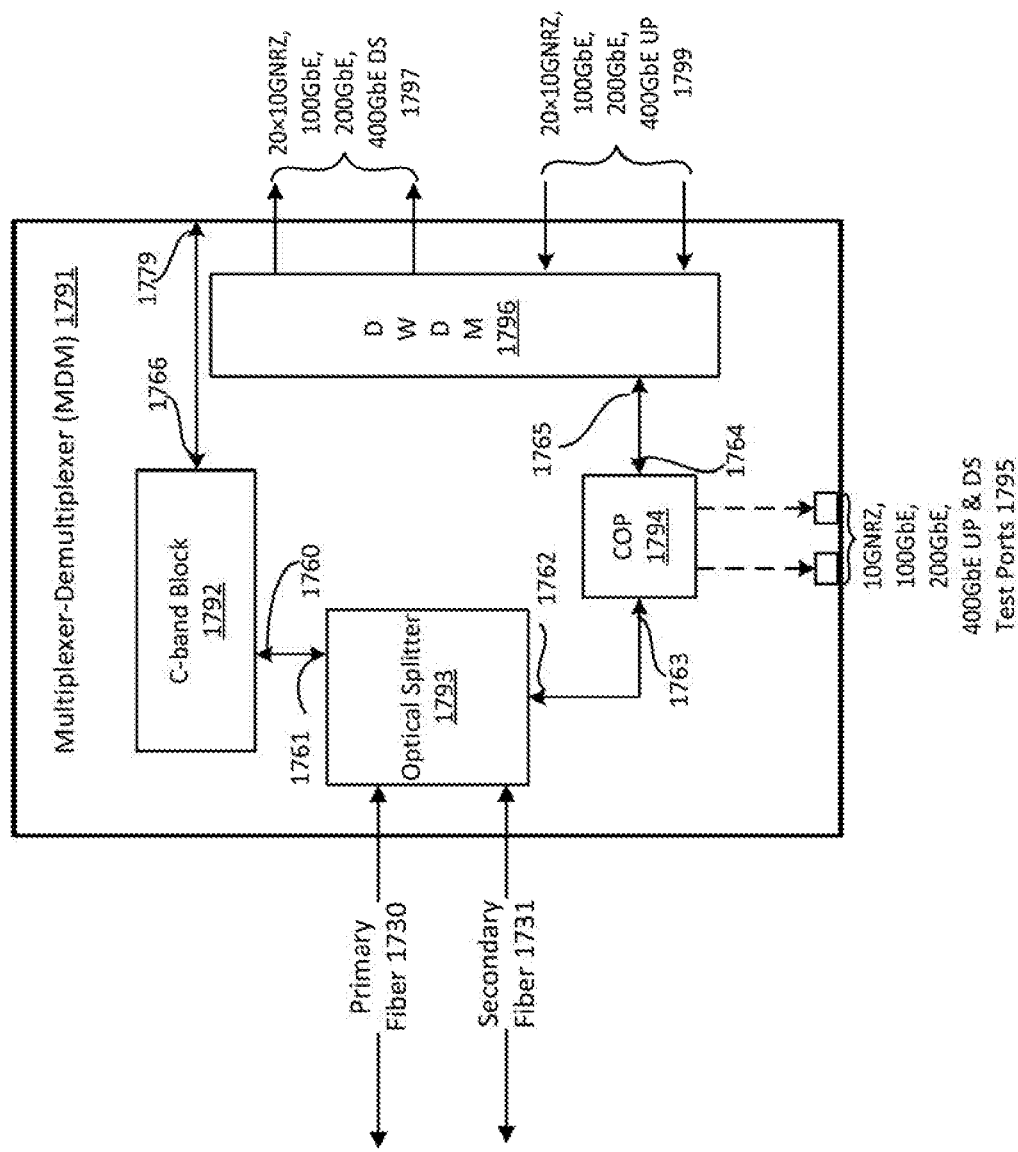

FIGS. 17A and 17B depicts an access network diagram of an OCML headend comprising WDMs, a DWDM, optical amplifiers, and dispersion control modules (DCMs), in accordance with the disclosure. FIG. 17A shows a schematic of an OCML headend according to at least one embodiment of the disclosure. As shown in FIG. 17A, headend 1701 is a smart integrated OCML headend, which is a circuit, comprising a DWDM (e.g., DWDM 1705), a first WDM (e.g., WDM 1713), a second WDM (e.g., WDM 1719), a third WDM (e.g., WDM 1723), a GPON/EPON connector (e.g., GPON/EPON 1724), a booster amplifier BOA (e.g., BOA 1716), an optical pre-amplifier (OPA) (e.g., OPA 1742), a variable optical attenuator (VOA) (e.g., VOA 1721), an optical switch 1726 to feed a primary optical fiber (e.g., Primary Fiber 1730) or secondary (backup) optical fiber (e.g., Secondary Fiber 1731), and a dispersion control module (DCM) (e.g., DCM 1708). DWDM 1705 may be similar in functionality to DWDM 106 and WDM 1713, WDM 1719, and WDM 1723 may be similar in functionality to WDM 108. The disclosure provides a method of transporting multiple 10G NRZ, coherent 100 GbE, 200 GbE, and/or 400 GbE and GPON/EPON signals on the same optical fiber over extended links of up to 60 kms without a cable company having to put optical amplifiers between the cable's Master Terminal Center (MTC) facility and a field hub or outside plant. The MTC facility may be an inside plant facility where a cable company acquires and combines services to be offered to customers. The MTC facility provides these combined services to customers, by transmitting and receiving optical signals over a plurality of optical fibers to a field hub or outside plant which connects the plurality of optical fibers to a customer's premise. The OCML headend may be located in a secondary terminal center (STC) that connects the MTC facility to a field hub or outside plant housing a multiplexer-demultiplexer (MDM) (e.g., MDM 208 in FIG. 2).

The EPON signals may operate with the same optical frequencies as GPON and time division multiple access (TDMA). The raw line data rate is 1.25 Gbits/s in both the downstream and upstream directions. EPON is fully compatible with other Ethernet standards, so no conversion or encapsulation is necessary when connecting to Ethernet-based networks on either end. The same Ethernet frame is used with a payload of up to 1518 bytes. EPON may not use a carrier sense multiple access (CSMA)/collision detection (CD) access method used in other versions of Ethernet. There is a 10-Gbit/s Ethernet version designated as 802.3ay. The line rate may be 10.3125 Gbits/s. The primary mode is 10 Gbits/s upstream as well as downstream. A variation uses 10 Gbits/s downstream and 1 Gbit/s upstream. The 10-Gbit/s versions use different optical wavelengths on the fiber, 1575 to 1591 nm downstream and 1260 to 1280 nm upstream so the 10-Gbit/s system can be wavelength multiplexed on the same fiber as a standard 1-Gbit/s system.

In one aspect, headend 1701 may comprise twenty 10G NRZ, coherent 100 GbE, 200 GbE, and/or 400 GbE downstream (DS) transponders (e.g., 20×10G NRZ, coherent 100 GbE, 200 GbE, and/or 400 GbE DS 1703) and twenty 10G NRZ, coherent 100 GbE, 200 GbE, and/or 400 GbE upstream (UP) transponders (e.g., 20×10G NRZ, coherent 100 GbE, 200 GbE, and/or 400 GbE UP 1704). 20×10G NRZ, coherent 100 GbE, 200 GbE, and/or 400 GbE DS 1703 may transmit downstream data over twenty 10G NRZ, coherent 100 GbE, 200 GbE, and/or 400 GbE wavelengths. 20×10G NRZ, coherent 100 GbE, 200 GbE, and/or 400 GbE UP 1704 may receive upstream data over 10G NRZ, coherent 100 GbE, 200 GbE, and/or 400 GbE wavelengths. 20×10G NRZ, coherent 100 GbE, 200 GbE, and/or 400 GbE DS 1703 may comprise the same elements and perform the same operations as 20×10G NRZ, coherent 100 GbE, 200 GbE, and/or 400 GbE 190, and 20×10G NRZ, coherent 100 GbE, 200 GbE, and/or 400 GbE UP 1704 may comprise the same elements and perform the same operations as 20×10G NRZ, coherent 100 GbE, 200 GbE, and/or 400 GbE UP 188.

The operation of headend 1701 may be described by way of the processing of downstream optical data signals transmitted from headend 1701 to a field hub or outside plant, and the processing of upstream optical data signals received from the field hub or outside plant. Each of the transponders of 20×10G NRZ, coherent 100 GbE, 200 GbE, and/or 400 GbE DS 1703 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE DS 1703 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE DS 1703 may generate twenty corresponding second optical data signals each of which has a unique wavelength.

DWDM 1705 may receive the twenty corresponding second optical data signals as an input and output a multi-wavelength downstream optical data signal (e.g., 10G NRZ, coherent 100 GbE, 200 GbE, and/or 400 GbE DS 1707) comprising the twenty corresponding second optical data signals onto a fiber. The multi-wavelength downstream optical data signal 10G NRZ, coherent 100 GbE, 200 GbE, and/or 400 GbE DS 1707 may be a 10G NRZ, coherent 100 GbE, 200 GbE, and/or 400 GbE optical data signal. More specifically, DWDM 1705 may multiplex the twenty corresponding second optical data signals onto the fiber, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength downstream optical data signal 10G NRZ, coherent 100 GbE, 200 GbE, and/or 400 GbE DS 1707, may be input to DCM 1708. 10G NRZ, coherent 100 GbE, 200 GbE, and/or 400 GbE DS 1707 may be input into DCM 1708 to compensate for dispersion that 10G NRZ, coherent 100 GbE, 200 GbE, and/or 400 GbE DS 1707 may experience after being amplified by BOA 1716 and multiplexed by WDM 1723, with other optical data signals, that are downstream from the DCM. The amplified and multiplexed optical data signal may be referred to as an egress optical data signal, as it is the optical data signal that may be transmitted out of headend 1701 over a fiber connecting headend 1701 to a field hub or outside plant. In some embodiments, DCM 1708 may be configured to balance positive and/or negative dispersion that may be introduced to the egress optical data signal by the fiber. In some embodiments, DCM 1708 may be configured to compensate for positive (temporal broadening of the egress optical data signal) and/or negative (temporal contraction of the egress optical data signal) dispersion introduced by fiber that is 80 km or greater in length, to reduce the sensitivity or OSNR levels of a transceiver in a DWDM located at a field hub or outside plant. More specifically, DCM 1708 may be configured to reduce the sensitivity or OSNR level requirement in a photodetector or fiber-optic sensor in the transceiver, which may drastically reduce the cost of the transceivers used in the DWDM located at the field hub or outside plant. DCM 1708 may output a dispersion controlled version of 10G NRZ, coherent 100 GbE, 200 GbE, and/or 400 GbE DS 1707 as coherent 10G NRZ, coherent 100 GbE, 200 GbE, and/or 400 GbE DS 1710.

WDM 1713 may be a three port circulator, that receives multi-wavelength downstream optical data signal 10G NRZ, coherent 100 GbE, 200 GbE, and/or 400 GbE DS 1710 on port 1711, and outputs multi-wavelength downstream optical data signal 10G NRZ, coherent 100 GbE, 200 GbE, and/or 400 GbE DS 1710, on port 1714 as multi-wavelength downstream optical data signal 10G NRZ, coherent 100 GbE, 200 GbE, and/or 400 GbE DS 1715 to BOA 1716. In some embodiments, Headend 1701 may not include DCM 1708.

BOA 1716 may have a gain that is based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, BOA 1716 may be adjusted based at least in part on the attenuation coefficient and length of fiber that the egress optical data signal will travel. More specifically, the gain BOA 1716 may be $G=e^{(2\alpha L)}$, where a is the fiber attenuation coefficient, as explained above, and L is the length of the fiber (e.g., the length of primary fiber 1730 and/or the length of secondary fiber 1731). Multi-wavelength downstream optical data signal 10G NRZ, coherent 100 GbE, 200 GbE, and/or 400 GbE DS 1715 may be amplified by BOA 1716, and BOA 1716 may output multi-wavelength downstream optical data signal 10G NRZ, coherent 100 GbE, 200 GbE, and/or 400 GbE DS 1717 to port 1718 of WDM 1719. WDM 1719 outputs a multi-wavelength downstream optical data signal (e.g., multi-wavelength downstream optical data signal 10G NRZ, coherent 100 GbE, 200 GbE, and/or 400 GbE DS 1740) from port 1720, which may be substantially the same as multi-wavelength downstream optical data signal 10G NRZ, coherent 100 GbE, 200 GbE, and/or 400 GbE DS 1717. Multi-wavelength downstream optical data signal 10G NRZ, coherent 100 GbE, 200 GbE, and/or 400 GbE DS 1740 may be input to variable optical amplifier (VOA) 1721.

VOA 1721 may be used to reduce the power levels of Multi-wavelength downstream optical data signal 10G NRZ, coherent 100 GbE, 200 GbE, and/or 400 GbE DS 1740. The power reduction may done by absorption, reflection, diffusion, scattering, deflection, diffraction, and dispersion, of Multi-wavelength downstream optical data signal 10G NRZ, coherent 100 GbE, 200 GbE, and/or 400 GbE DS 1740. VOA 1721 typically have a working wavelength range in which they absorb all light energy equally. In some embodiments VOA 1721 utilize a length of high-loss optical fiber, that operates upon its input optical signal power level in such a way that its output signal power level is less than the input level. For example, multi-wavelength downstream optical data signal 10G NRZ, coherent 100 GbE, 200 GbE, and/or 400 GbE DS 1740 may have an input power level to VOA 1721 that may be greater than the output power level of multi-wavelength downstream optical data signal 10G NRZ, coherent 100 GbE, 200 GbE, and/or 400 GbE DS 1739.

The variability of the output power level of VOA 1721 may be achieved using a fiber coupler, where some of the power is not sent to the port that outputs, but to another port. Another possibility is to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 17211 may be based on some piece of doped fiber, exhibiting absorption within a certain wavelength range.

WDM 1723 may multiplex multi-wavelength downstream optical data signal 10G NRZ, coherent 100 GbE, 200 GbE, and/or 400 GbE DS 1739 and one or more EPON, and/or GPON optical data signals. The EPON and/or GPON optical data signals may be received on a GPON/EPON connector (e.g., GPON/EPON 1724) from PON port 1702.

The resulting multiplexed optical data signal may be referred to as egress optical data signal 1735.

FIG. 17B depicts an access network diagram of a multiplexer-demultiplexer (MDM), in accordance with the disclosure. Egress optical data signal 1735 may be output by WDM 1723 and optical switch 1726 may switch egress optical data signal 1735 onto connector 1727 or connector 1734 depending on the position of switch 1726. In some embodiments, connector 1727 may be a primary connector and connector 1734 may be a secondary connector or a backup connector. Wavelength monitoring connector 1728 may connect connector 1727 to a first port of wavelength-monitoring ports 1744, and wavelength monitoring connector 1733 may connect connector 1734 to a second port of wavelength-monitoring ports 1744. Wavelength-monitoring ports 1744 may monitor the wavelengths in egress optical data signal 1735 via connector 1727 or connector 1734 depending on the position of switch 1726. Egress optical data signal 1735 may exit headend 1701 via connector 1727 connected to primary fiber 1730, and may be received on a first connector in the field hub or outside plant. Egress optical data signal 1735 may exit headend 1701 via connector 1734 connected to secondary fiber 1731, and may be received on a second connector in the field hub or outside plant. The field hub or outside plant may include a MDM with the first connector and the second connector.

Egress optical data signal 1735 may be received at optical splitter 1793 as an ingress optical data signal. Optical splitter 1793 may also be referred to as a beam splitter, and may comprise one or more quartz substrates of an integrated waveguide optical power distribution device. Optical splitter 1793 may be a passive optical network device. It may be an optical fiber tandem deice comprising one or more input terminals and one or more output terminals. Optical splitter 1739 may be Fused Biconical Taper (FBT) splitter or Planar Lightwave Circuit (PLC) splitter. Optical splitter 1793 may be a balanced splitter wherein optical splitter 1793 comprises 2 input fibers and one or more output fibers over which the ingress optical data signal may be spread proportionally. In some embodiments, the ingress optical data signal may not be spread proportionally across the output fibers of optical splitter 1793. In some embodiments, optical splitter 1793 may comprise two input fibers and 2 output fibers. A first input fiber of optical splitter 1793 may be connected to primary fiber 1737 and a second input fiber of optical splitter 1793 may be connected to secondary fiber 1738.

A first output fiber of optical splitter 1793 may be connected to a filter (e.g., C-band block 1792) that filters out packets of light, in the ingress optical data signal, with wavelengths between 1530 nm and 1565 nm. This range of wavelengths may coincide with a C-band of wavelengths. In some other embodiments, the filter may filter out packets of light with wavelengths not inclusive of the wavelengths between 1260 nm and 1520 nm and not inclusive of wavelengths between 1570 nm and 1660 nm. The packets of light with wavelengths inclusive of the wavelengths between 1260 nm and 1520 nm and inclusive of wavelengths between 1570 nm and 1660 nm, may correspond to the wavelengths of the packets of light carrying the one or more EPON and/or GPON optical data signals transmitted along GPON/EPON 1724. More specifically, optical splitter 1793, may receive one or more downstream EPON and/or GPON optical data signals 1760, in the ingress optical data signal, that corresponds to the one or more EPON and/or GPON optical data signals transmitted along GPON/EPON 1724. In some embodiments, the one or more downstream EPON and/or GPON optical data signals 1760 may have the same wavelength as GPON DS 806. Optical splitter 1793 may output the one or more downstream EPON and/or GPON optical data signals 1760, received in the ingress optical data signal, to C-band block 1792.

C-band block 1792 may output one or more downstream EPON and/or GPON optical data signals 1797 corresponding to the one or more downstream EPON and/or GPON optical data signals 1760 with wavelengths between 1260 nm and 1520 nm and wavelengths between 1570 nm and 1660 nm. The C-band block 1792 may transmit the one or more downstream EPON and/or GPON optical data signals 1797 to an express port (not shown in FIG. 17) collocated with, or attached to MDM 1791. In some embodiments, the express port may be located within the MDM 1791.

A second output fiber of optical splitter 1793 may be connected to COP 1794. COP 1794 may be a PON device that monitors the coupled optical power between Optical Splitter 1793 and DWDM 1796. In some embodiments, the coupled optical power may be a percentage value. For instance, the coupled optical power may be 1%. Optical splitter 1793, may receive one or more downstream 10G NRZ, coherent 100 GbE, 200 GbE, and/or 400 GbE optical data signals, in the ingress optical data signal, that corresponds to 10G NRZ, coherent 100 GbE, 200 GbE, and/or 400 GbE DS 1708. In some embodiments, the one or more downstream 10G NRZ, coherent 100 GbE, 200 GbE, and/or 400 GbE optical data signals may have the same wavelength as 10G NRZ, coherent 100 GbE, 200 GbE, and/or 400 GbE 808. Optical splitter 1793 may output the one or more downstream 10G NRZ, coherent 100 GbE, 200 GbE, and/or 400 GbE optical data signals 1763, received in the ingress optical data signal, to COP 1794. COP 1794 may output a first percentage of the one or more downstream 10G NRZ, coherent 100 GbE, 200 GbE, and/or 400 GbE optical data signals 1763 to 10G NRZ, coherent 100 GbE, 200 GbE, and/or 400 GbE upstream and downstream test ports (e.g., 10G NRZ, coherent 100 GbE, 200 GbE, and/or 400 GbE UP & DS Test Ports 1795). The first percentage may be a percentage of the one or more downstream 10G NRZ, coherent 100 GbE, 200 GbE, and/or 400 GbE optical data signals 1763 tested by the 10G NRZ, coherent 100 GbE, 200 GbE, and/or 400 GbE upstream and downstream test ports. The first percentage of the one or more downstream 10G NRZ, coherent 100 GbE, 200 GbE, and/or 400 GbE optical data signals 1763 may be a monitoring signal used by a spectrum analyzer to measure optical power levels of a specific wavelength. The first percentage of the one or more downstream 10G NRZ, coherent 100 GbE, 200 GbE, and/or 400 GbE optical data signals 1763 may also be used by the spectrum analyzer to analyze certain characteristics of the wavelengths of the first percentage of the one or more downstream 10G NRZ, coherent 100 GbE, 200 GbE, and/or 400 GbE optical data signals 1763. COP 1794 may output a second percentage of the one or more downstream 10G NRZ, coherent 100 GbE, 200 GbE, and/or 400 GbE optical data signals 1765 to DWDM 1796.

Because the one or more downstream 10G NRZ, coherent 100 GbE, 200 GbE, and/or 400 GbE optical data signals 1765 may be a multi-wavelength downstream optical data signal DWDM 1796 may demultiplex the one or more downstream 10G NRZ, coherent 100 GbE, 200 GbE, and/or 400 GbE optical data signals 1765 into individual optical data signals in accordance with the individual wavelengths of the one or more downstream 10G NRZ, coherent 100 GbE, 200 GbE, and/or 400 GbE optical data signals 1765. More specifically, the one or more downstream 10G NRZ, coherent 100 GbE, 200 GbE, and/or 400 GbE optical data signals 1765 may be demultiplexed into twenty 10G NRZ, coherent 100 GbE, 200 GbE, and/or 400 GbE optical data signals, each of which may have a unique wavelength. DWDM 1796 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE DS 1798. Each of the transponders of 20×10G NRZ, coherent 100 GbE, 200 GbE, and/or 400 GbE DS 1798 may be in a RPD (not shown) and may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. In some embodiments, the RPD may be similar in functionality to Remote PHY Node 207. The RPD may convert the SONET/SDH optical data signals into an electrical signal that may be transmitted over one or more coaxial cables. MDM 1791 may be similar in functionality to MDM 208 and may be connected to the RPD in a way similar to the connection between MDM 208 and Remote PHY Node 207.

The operation of MDM 1791 may be further described by way of the processing of an upstream optical data signal transmitted to headend 1701. Each of the transponders of 20×10G NRZ, coherent 100 GbE, 200 GbE, and/or 400 GbE UP 1799 may receive a SONET/SDH optical data signal and each of the transponders may convert the SONET/SDH optical data signal into an electrical signal. Each of the transponders of 20×10G NRZ, coherent 100 GbE, 200 GbE, and/or 400 GbE UP 1799 may receive the SONET/SDH optical data signal from the RPD. The RPD may also convert one or more electrical signals into the SONET/SDH optical data signal.

More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty transponders in 20×10G NRZ, coherent 100 GbE, 200 GbE, and/or 400 GbE UP 1799 may each receive a SONET/SDH optical data signal, and each of the twenty transponders may convert the received SONET/SDH optical data signal into a corresponding second optical data signal, wherein each of the corresponding second optical data signals has a unique wavelength. That is, the wavelength of each of the corresponding second optical data signals is distinguishable from the wavelength of any of the other corresponding second optical data signals. Thus 20×10G NRZ, coherent 100 GbE, 200 GbE, and/or 400 GbE UP 1799 may generate twenty corresponding second optical data signals each of which has a unique wavelength.

DWDM 1796 may receive twenty corresponding second optical data signals as an input and output a multi-wavelength upstream optical data signal (e.g., multi-wavelength upstream optical data signal 1764) comprising the twenty corresponding second optical data signals. The multi-wavelength upstream optical data signal 1764 may be a 10G NRZ, coherent 100 GbE, 200 GbE, and/or 400 GbE optical data signal. More specifically, DWDM 1796 may multiplex the twenty corresponding second optical data signals onto the fiber connecting DWDM 1796 and COP 1794, wherein the twenty multiplexed corresponding second optical data signals compose the multi-wavelength downstream optical data signal. The multi-wavelength optical data signal may have a wavelength comprising the twenty wavelengths of the twenty corresponding second optical data signals.

The multi-wavelength upstream optical data signal 1764, may be input to COP 1794. COP 1794 may output a first percentage of the multi-wavelength upstream optical data signal 1664 to 10G NRZ, coherent 100 GbE, 200 GbE, and/or 400 GbE upstream and downstream test ports (e.g., 10G NRZ, coherent 100 GbE, 200 GbE, and/or 400 GbE UP & DS Test Ports 1795). The first percentage may be a percentage of the multi-wavelength upstream optical data signal 1764 tested by the 10G NRZ, coherent 100 GbE, 200 GbE, and/or 400 GbE upstream and downstream test ports. The first percentage of the multi-wavelength upstream optical data signal 1764 may be a monitoring signal used by a spectrum analyzer to measure optical power levels of a specific wavelength in the multi-wavelength upstream optical data signal 1764. The first percentage of the multi-wavelength upstream optical data signal 1764 may also be used by the spectrum analyzer to analyze certain characteristics of the wavelengths of the first percentage of the multi-wavelength upstream optical data signal 1764. COP 1794 may output a second percentage of the multi-wavelength upstream optical data signal 1764 to optical splitter 1793 as the multi-wavelength upstream optical data signal 1762.

C-band block 1792 may receive one or more upstream EPON and/or GPON optical data signals 1766 from an express port (not shown in FIG. 17) collocated with, or attached to MDM 1791. In some embodiments, the express port may be located within the MDM 1791. C-band block 1792 may filter out packets of light, in the one or more upstream EPON and/or GPON optical data signals 1766, with wavelengths between 1530 nm and 1565 nm. Thus C-band block 1792 may output one or more upstream EPON and/or GPON optical data signals 1761 with wavelengths between 1260 nm and 1520 nm and wavelengths between 1570 nm and 1660 nm.

Optical splitter 1793 may receive one or more upstream EPON and/or GPON optical data signals 1761, and may also receive the multi-wavelength upstream optical data signal 1762, and may multiplex the multi-wavelength one or more upstream EPON and/or GPON optical data signals 1761 with the multi-wavelength upstream optical data signal 1762. Optical splitter 1793 outputs an egress optical data signal, which may be a multi-wavelength optical data signal comprising 10G NRZ, coherent 100 GbE, 200 GbE, and/or 400 GbE, GPON/EPON optical data signals corresponding to the multiplexed multi-wavelength one or more upstream EPON and/or GPON optical data signals 1761 and multi-wavelength upstream optical data signal 1762. Optical splitter 1793 may output the egress optical data signal onto primary fiber 1730 connecting the optical splitter 1793 to port 1729. Optical splitter 1793 may also output the egress optical data signal onto secondary fiber 1731 connecting the optical splitter 1793 to port 1731.

The operation of headend 1701 may be described by way of the processing of upstream optical data signals received at headend 1701 from a field hub or outside plant. For instance, a multi-wavelength ingress optical data signal, comprising one or more of a 10G NRZ, coherent 100 GbE, 200 GbE, and/or 400 GbE optical data signal, EPON optical data signal, and/or GPON optical data signal or a 10GEPN.XGPON may be an upstream optical data signal received on primary fiber 1730 or secondary fiber 1731 depending on the position of switch 1726. The upstream optical data signal may be substantially the same as the egress optical data signal.

Multi-wavelength ingress optical data signal 1736 may traverse connector 1727 and switch 1726, before entering WDM 1723 via port 1737 if switch 1726 is connected to connector 1727. Multi-wavelength ingress optical data signal 1736 may traverse connector 1734 and switch 1726, before entering WDM 1723 via port 1737 if switch 1726 is connected to connector 1727. WDM 1723 may demultiplex one or more 10G NRZ, coherent 100 GbE, 200 GbE, and/or 400 GbE optical data signals, EPON optical data signals, and/or GPON optical data signals from multi-wavelength ingress optical data signal 1736. WDM 1723 may transmit the one or more EPON and/or GPON optical data signals along GPON/EPON 1724 to PON connector 1702 via port 1725. WDM 1723 may transmit the one or more 10G NRZ, coherent 100 GbE, 200 GbE, and/or 400 GbE optical data signals (e.g., 10 GbE UP 1741) out of port 1738 to OPA 1742.

The one or more 10G NRZ, coherent 100 GbE, 200 GbE, and/or 400 GbE optical data signals 10G NRZ, coherent 100 GbE, 200 GbE, and/or 400 GbE UP 1741 may be received by OPA 1742. The one or more optical data signals 10G NRZ, coherent 100 GbE, 200 GbE, and/or 400 GbE UP 1741 may comprise 10G NRZ, coherent 100 GbE, 200 GbE, and/or 400 GbE optical data signals. A gain associated OPA 1742 may be based at least in part on a distance that 10G NRZ, coherent 100 GbE, 200 GbE, and/or 400 GbE optical data signals have to travel, similar to that of BOA 1716. The one or more optical data signals 10G NRZ, coherent 100 GbE, 200 GbE, and/or 400 GbE UP 1741 may be amplified by OPA 1742, and OPA 1742 may output multi-wavelength upstream optical data signal 1743 to WDM 1713.

WDM 1713 may receive the multi-wavelength upstream optical data signal 1743 on port 1712, and may output one or more optical data signals 10G NRZ, coherent 100 GbE, 200 GbE, and/or 400 GbE UP 1709 to DCM 1708. DCM 1708 may perform one or more operations on one or more optical data signals 10G NRZ, coherent 100 GbE, 200 GbE, and/or 400 GbE UP 1709 to compensate for any dispersion that may have been introduced by circuit components (e.g., WDM 1713, OPA 1742, or WDM 1723) or imperfections or issues with an optical fiber (e.g., primary fiber 1730 or secondary fiber 1731). DCM 1708 may output one or more optical data signals 10G NRZ, coherent 100 GbE, 200 GbE, and/or 400 GbE UP 1706 to DWDM 1705. The one or more optical data signals 10G NRZ, coherent 100 GbE, 200 GbE, and/or 400 GbE UP 1709 are substantially the same as multi-wavelength upstream optical data signal 1743. WDM 1713 may function as a circulator when receiving multi-wavelength upstream optical data signal 1743 on port 1712.

The one or more optical data signals 10G NRZ, coherent 100 GbE, 200 GbE, and/or 400 GbE UP 1706 may be received by DWDM 1705.

The one or more optical data signals 10G NRZ, coherent 100 GbE, 200 GbE, and/or 400 GbE UP 1706 may comprise 10GNRZ, coherent 100 GbE, 200 GbE, and/or 400 GbE optical data signals. DWDM 1705 may demultiplex the one or more optical data signals 10G NRZ, coherent 100 GbE, 200 GbE, and/or 400 GbE UP 1706 into individual optical data signals in accordance with the individual wavelengths of the one or more optical data signals 10G NRZ, coherent 100 GbE, 200 GbE, and/or 400 GbE UP 1706. More specifically, the one or more optical data signals 10G NRZ, coherent 100 GbE, 200 GbE, and/or 400 GbE UP 1706 may be demultiplexed into twenty 10G NRZ, coherent 100 GbE, 200 GbE, and/or 400 GbE optical data signals, each of which may have a unique wavelength. DWDM 1705 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 1704. Each of the transponders of 20×10G NRZ, coherent 100 GbE, 200 GbE, and/or 400 GbE UP 1704 may convert a received corresponding 10G NRZ, coherent 100 GbE, 200 GbE, and/or 400 GbE optical data signal, of the coherent 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 1704 may transmit the twenty SONET/SDH optical data signals to the MTC on the SONET/SDH optical network connection.

The operation of headend 1701 may be described by way of the processing of upstream optical data signals received at headend 1701 from a field hub or outside plant. For instance, a multi-wavelength ingress optical data signal, comprising one or more of a 10G NRZ, coherent 100 GbE, 200 GbE, and/or 400 GbE optical data signal, EPON optical data signal, and/or GPON optical data signal or a 10GEPN.XGPON may be an upstream optical data signal received on primary fiber 1730 or secondary fiber 1731 depending on the position of switch 1726.

Multi-wavelength ingress optical data signal 1736 may traverse connector 1727 and switch 1726, before entering WDM 1723 via port 1737 if switch 1726 is connected to connector 1727. Multi-wavelength ingress optical data signal 1736 may traverse connector 1734 and switch 1726, before entering WDM 1723 via port 1737 if switch 1726 is connected to connector 1727. WDM 1723 may demultiplex one or more 10G NRZ, coherent 100 GbE, 200 GbE, and/or 400 GbE optical data signals, EPON optical data signals, and/or GPON optical data signals from multi-wavelength ingress optical data signal 1736. WDM 1723 may transmit the one or more EPON and/or GPON optical data signals along GPON/EPON 1724 to PON connector 1702 via port 1725. WDM 1723 may transmit the one or more 10G NRZ, coherent 100 GbE, 200 GbE, and/or 400 GbE optical data signals (e.g., 10 GbE UP 1741) out of port 1738 to OPA 1742.

The one or more 10G NRZ, coherent 100 GbE, 200 GbE, and/or 400 GbE optical data signals 10G NRZ, coherent 100 GbE, 200 GbE, and/or 400 GbE UP 1741 may be received by OPA 1742. The one or more optical data signals 10G NRZ, coherent 100 GbE, 200 GbE, and/or 400 GbE UP 1741 may comprise 10G NRZ, coherent 100 GbE, 200 GbE, and/or 400 GbE optical data signals. A gain associated OPA 1742 may be based at least in part on a distance that 10G NRZ, coherent 100 GbE, 200 GbE, and/or 400 GbE optical data signals have to travel, similar to that of BOA 1716. The one or more optical data signals 10G NRZ, coherent 100 GbE, 200 GbE, and/or 400 GbE UP 1741 may be amplified by OPA 1742, and OPA 1742 may output multi-wavelength upstream optical data signal 1743 to WDM 1713.

WDM 1713 may receive the multi-wavelength upstream optical data signal 1743 on port 1712, and may output one or more optical data signals 10G NRZ, coherent 100 GbE, 200 GbE, and/or 400 GbE UP 1709 to DCM 1708. DCM 1708 may perform one or more operations on one or more optical data signals 10G NRZ, coherent 100 GbE, 200 GbE, and/or 400 GbE UP 1709 to compensate for any dispersion that may have been introduced by circuit components (e.g., WDM 1713, OPA 1742, or WDM 1723) or imperfections or issues with an optical fiber (e.g., primary fiber 1730 or secondary fiber 1731). DCM 1708 may output one or more optical data signals 10G NRZ, coherent 100 GbE, 200 GbE, and/or 400 GbE UP 1706 to DWDM 1705. The one or more optical data signals 10G NRZ, coherent 100 GbE, 200 GbE, and/or 400 GbE UP 1709 are substantially the same as multi-wavelength upstream optical data signal 1743. WDM 1713 may function as a circulator when receiving multi-wavelength upstream optical data signal 1743 on port 1712. The one or more optical data signals 10G NRZ, coherent 100 GbE, 200 GbE, and/or 400 GbE UP 1706 may be received by DWDM 1705.

The one or more optical data signals 10G NRZ, coherent 100 GbE, 200 GbE, and/or 400 GbE UP 1706 may comprise 10GNRZ, coherent 100 GbE, 200 GbE, and/or 400 GbE optical data signals. DWDM 1705 may demultiplex the one or more optical data signals 10G NRZ, coherent 100 GbE, 200 GbE, and/or 400 GbE UP 1706 into individual optical data signals in accordance with the individual wavelengths of the one or more optical data signals 10G NRZ, coherent 100 GbE, 200 GbE, and/or 400 GbE UP 1706. More specifically, the one or more optical data signals 10G NRZ, coherent 100 GbE, 200 GbE, and/or 400 GbE UP 1706 may be demultiplexed into twenty 10G NRZ, coherent 100 GbE, 200 GbE, and/or 400 GbE optical data signals, each of which may have a unique wavelength. DWDM 1705 may output each of the twenty 10G NRZ, coherent 100 GbE, 200 GbE, and/or 400 GbE optical data signals to each of the transponders of 20×10G NRZ, coherent 100 GbE, 200 GbE, and/or 400 GbE UP 1704. Each of the transponders of 20×10G NRZ, coherent 100 GbE, 200 GbE, and/or 400 GbE UP 1704 may convert a received corresponding 10G NRZ, coherent 100 GbE, 200 GbE, and/or 400 GbE optical data signal, of the 10G NRZ, coherent 100 GbE, 200 GbE, and/or 400 GbE optical data signals, into a corresponding electrical signal. More specifically, a first transceiver in each of the transponders may convert each of the twenty 10G NRZ, coherent 100 GbE, 200 GbE, and/or 400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty corresponding SONET/SDH optical data signals may have the same wavelength. In other embodiments, each of the twenty corresponding SONET/SDH optical data signals may have unique wavelengths. The twenty transponders of 20×10G NRZ, coherent 100 GbE, 200 GbE, and/or 400 GbE UP 1704 may transmit the twenty SONET/SDH optical data signals to the MTC on the SONET/SDH optical network connection.

Figure 18:
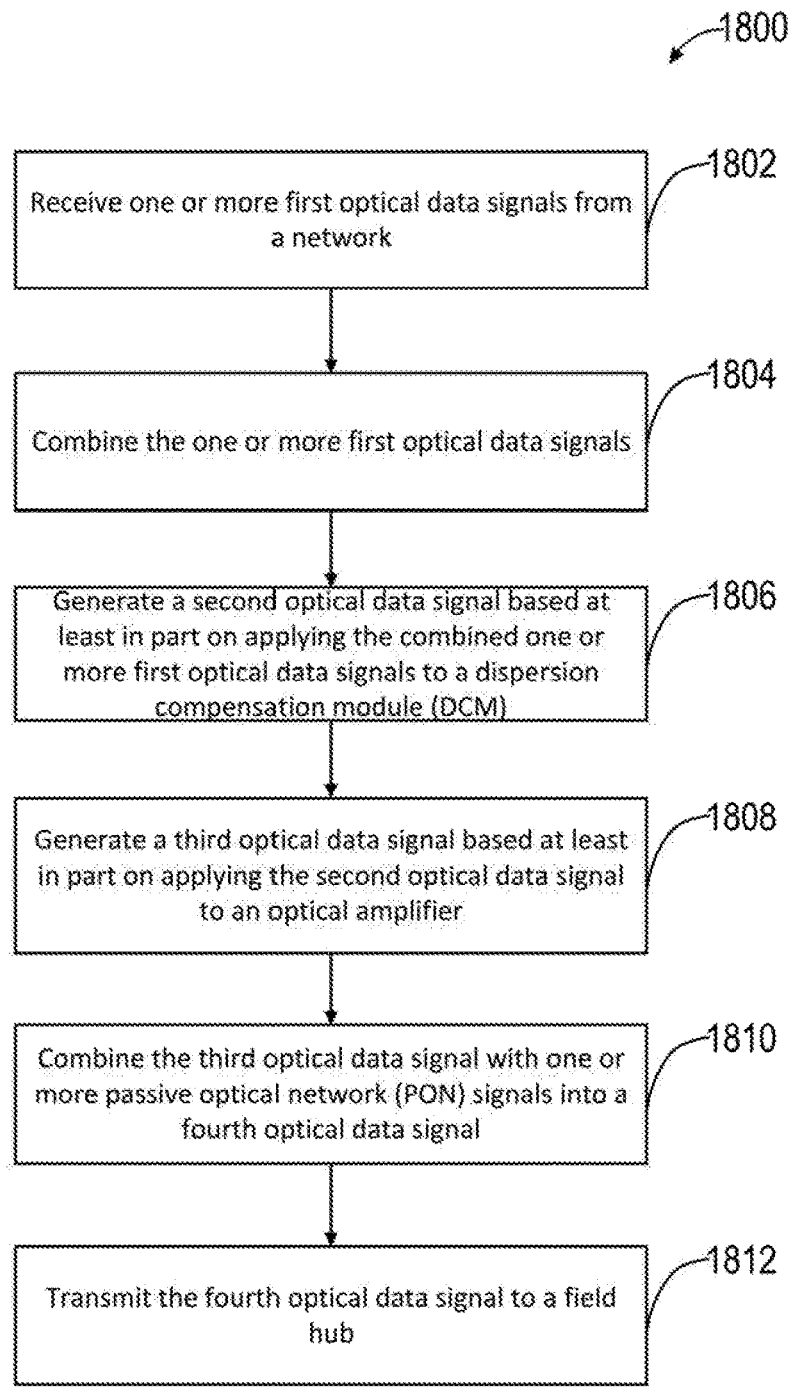
FIG. 18 depicts an access network diagram of an OCML headend and outside plant, in accordance with the disclosure.

FIG. 18 depicts an access network diagram of an OCML headend and outside plant, in accordance with the disclosure. At block 1802 the OCML headend may receive one or more first optical data signals from a network. At block 1804 the OCML headend may combine the one or more first optical data signals. At block 1806 the OCML headend may generate a second optical data signal based at least in part on applying the combined one or more first optical data signals to a dispersion compensation module (DCM). At block 1808 the OCML headend may generate a third optical data signal based at least in part on applying the second optical data signal to an optical amplifier. At block 1810 the OCML headend may combine the third optical data signal with one or more passive optical network (PON) signals into a fourth optical data signal. At block 1812 the OCML headend may transmit the fourth optical data signal to a field hub.

FIG. 18 may cover the operation of the OCML headend in FIGS. 1, 10, 11, 14, 16, and 17 in the downstream.

Figure 19:
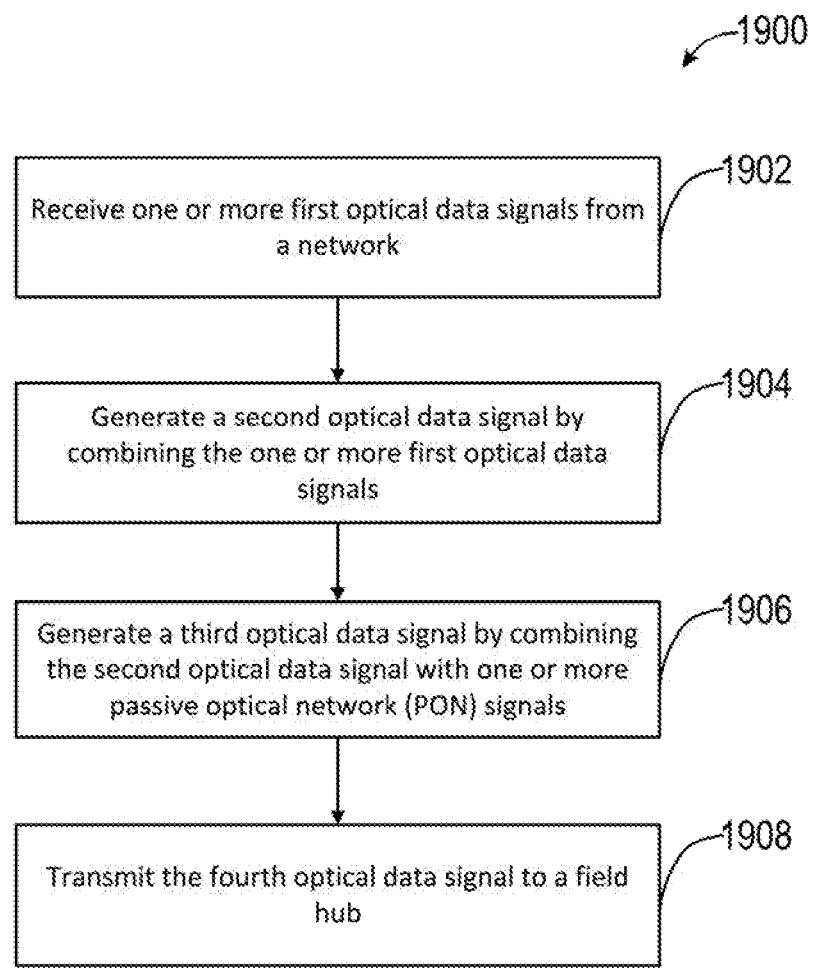
FIG. 19 depicts a process of transmitting optical signals with the OCML headend, in accordance with the disclosure.

FIG. 19 depicts a process of transmitting optical signals with the OCML headend, in accordance with the disclosure. At block 1902 the OCML headend may receive one or more first optical data signals from a network. At block 1904 the OCML headend may generate a second optical data signal by combining the one or more first optical data signals. At block 1906 the OCML headend may generate a third optical data signal by combining the second optical data signal with one or more passive optical network (PON) signals. At block 1908 the headend may transmit the fourth optical data signal to a field hub. The flowchart in FIG. 19 may cover the operation of the terminal in FIGS. 3, 5, 6, 12, and 15 in the downstream.

Figure 20:
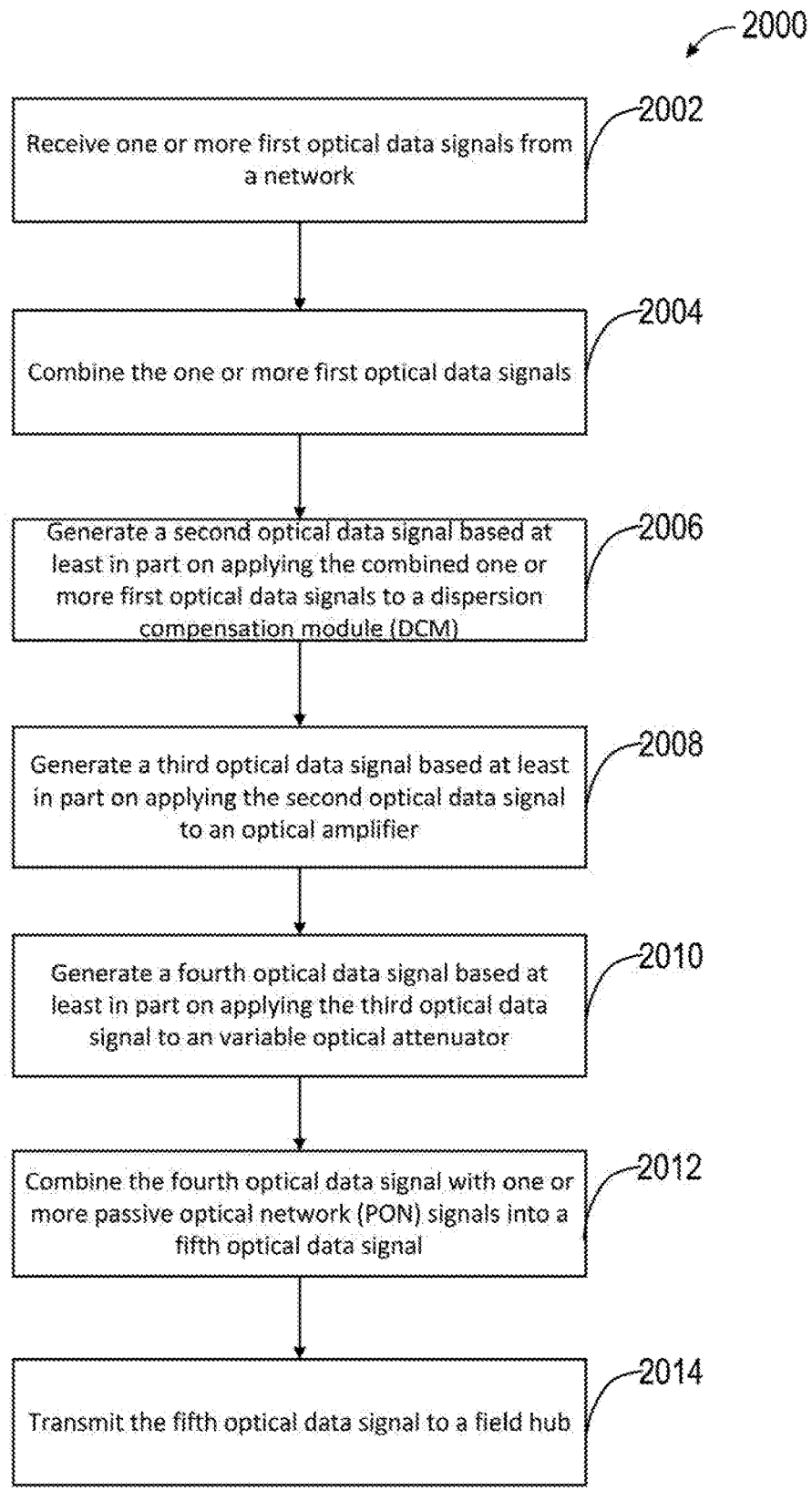
FIG. 20 depicts a process of transmitting optical signals with the OCML headend, in accordance with the disclosure.

FIG. 20 depicts a process of transmitting optical signals with the OCML headend, in accordance with the disclosure. At block 2002 the OCML headend may receive one or more first optical data signals from a network. At block 2004 the OCML headend may combine the one or more first optical data signals. At block 2006 the OCML headend may generate a second optical data signal based at least in part on applying the combined one or more first optical data signals to a dispersion compensation module (DCM). At block 2008 the OCML headend may generate a third optical data signal based at least in part on applying the second optical data signal to an optical amplifier. At block 2010 the OCML headend may generate a fourth optical data signal based at least in part on applying the third optical data signal to an variable optical attenuator. At block 2012 the OCML headend may combine the fourth optical data signal with one or more passive optical network (PON) signals into a fifth optical data signal. At block 2014 the OCML terminal may transmit the fifth optical data signal to a field hub. The flowchart in FIG. 20 may cover the operation of FIG. 13 in the downstream.

FIG. 21 depicts an illustrative aggregation node, in accordance with the disclosure. Aggregation node 2105 may comprise one or more of a muxponder, ethernet switch or a router. Aggregation node 2105 may multiplex one or more 10GNRz, coherent 100 GbE, 200 GbE, and/or 400 GbE optical data signals received from anyone of node 2106 . . . node 2107. Aggregation node 2105 may comprise a10GNRZ, coherent 100 GbE, 200 GbE, and/or 400 GbE transceiver (e.g., trx 2115), that receives one or more optical data signals comprising a multiplexed 10GNRz, coherent 100 GbE, 200 GbE, and/or 400 GbE optical data signals. trx 2115 may receive these one or more optical data signals over a connection, for example a MDM (e.g., MDM 208) and may output one or more 10GNRZ or 40GNRZ optical data signals to node 2106 . . . node 2107. For example, aggregation node 2105 may transmit streaming video footage, that it received from one or more video servers at an OCML headend (e.g., OCML 207), over a 10GNRZ optical data signal. In another example, aggregation node 2105 may transmit one or more high bandwidth packets, corresponding to several movie files, to node 2107 over a 40GNRZ optical data signal.

Aggregation node 2105 may transmit the one or more optical data signals to node 2106 out of txr 2125 and may transmit the one or more optical data signals to node 2107 out of txr 2135. Node 2106 may receive the one or more optical data signals on txr 2126 from txr 2125, and node 2107 may receive the one or more optical data signals on txr 2127 from txr 2135. trx 2126 may receive one or more 10GNRZ or 40GNRZ optical data signals and a remote physical device (R-PHY) in node 2106 (e.g., R-PHY 2116) may convert the one or more optical data signals to a cable signal (e.g., a digital over cable service interface specification (DOCSIS) signal). trx 2127 may receive one or more 10GNRZ or 40GNRZ optical data signals and a R-PHY in node 2107 (e.g., R-PHY 2117) may convert the one or more optical data signals to a cable signal (e.g., a DOCSIS signal). After R-PHY 2116 and R-PHY 2117 convert the one or more optical data signals to cable signals, one or more devices connected to node 2106 and 2107 respectively may receive the cable signals.

Node 2106 and node 2107 may transmit cable signals to an OCML headend via aggregation node 2105, and aggregation node 2105 may receive one or more 10GNRZ and/or 40GNRZ optical data signals corresponding to the cable signals and may multiplex the one or more 10GNRZ and/or 40 GNRZ optical data signals onto an optical fiber. In particular, trx 2115 may multiplex the one or more 10GNRZ and/or 40GNRZ optical data signals onto the optical fiber as 10GNRZ, coherent 100G, 200G, and/or 400G optical data signals. Node 2106 and node 2107 may be one of device 299.

What is claimed is:

1. An optical communication module link extender (OCML) comprising:
    a Dense Wave Division Multiplexer (DWDM) at a headend that is configured to receive one or more first optical data signals from a network, and combine the one or more first optical data signals into a second optical data signal;
    a first Wave Division Multiplexer (WDM) at the headend that receives the second optical data signal and outputs a third optical data signal;
    a booster optical amplifier, wherein the booster optical amplifier is configured to amplify the third optical data signal and output a fourth optical data signal;
    a second WDM at the headend that receives the fourth optical data signal and outputs a fifth optical data signal; and
    a third WDM at the headend that receives the fifth optical data signal and outputs a sixth optical data signal.

2. The optical communication module link extender of claim 1, further comprising a variable optical attenuator (VOA) communicatively coupled to the second WDM and the third WDM.

3. The optical communication module link extender of claim 1, further comprising an optical switch coupled to an output of the third WDM, wherein the optical switch is configured to output the sixth optical data signal on a first fiber or a second fiber.

4. The optical communication module link extender of claim 1, wherein the optical switch is further configured to:
    receive an input optical data signal, and
    output the input optical data signal to a second booster optical preamplifier.

5. The optical communication module link extender of claim 4, wherein the second booster optical amplifier is configured to:
    amplify the input optical data signal; and
    output the amplified input optical data signal to the first WDM.

6. The optical communication module link extender of claim 5, wherein the first WDM is further configured to:
    receive the amplified input optical data signal from the first WDM; and output the amplified input optical data signal to the DWDM.

7. A method for multiplexing one or more optical data signals, the method comprising:
    receiving, by a dense wave division multiplexer (DWDM) at a headend, one or more first optical data signals from a network;
    combining, by the DWDM, the one or more first optical data signals into a second optical data signal;
    receiving, by a first wave division multiplexing (WDM) at the headend, the second optical data signal the second optical data signal;
    outputting, by the first WDM, a third optical data signal to a booster optical amplifier at the headend;
    receiving, by the booster optical amplifier communicatively coupled to the first WDM, the third optical data signal;
    amplifying, by a booster optical amplifier, the third optical data signal;
    outputting, by the booster optical amplifier, a fourth optical data signal to a second WDM at the headend;
    receiving, by the second WDM, the fourth optical data signal;
    outputting, by the second WDM, a fifth optical data signal;
    receiving, by the third WDM, the fifth optical data signal; and
    outputting, by the third WDM, a sixth optical data signal.

8. The method of claim 7, further comprising:
    receiving, by an optical switch, the sixth optical data signal; and
    outputting the sixth optical data signal on a first fiber or a second fiber.

9. The method of claim 7, wherein the optical switch is further configured to:
    receive an input optical data signal, and
    output the input optical data signal to a second booster optical preamplifier.

10. The method of claim 9, wherein the second booster optical amplifier is configured to:
    amplify the input optical data signal; and
    output the amplified input optical data signal to the first WDM.

11. The method of claim 10, wherein the first WDM is further configured to:
 receive the amplified input optical data signal from the first WDM; and output the amplified input optical data signal to the DWDM.

12. A system comprising:
 a Dense Wave Division Multiplexer (DWDM) at a headend that is configured to receive one or more first optical data signals from a network, and combine the one or more first optical data signals into a second optical data signal;
 a first Wave Division Multiplexer (WDM) at the headend that receives the second optical data signal and outputs a third optical data signal;
 a booster optical amplifier, wherein the booster optical amplifier is configured to amplify the third optical data signal and output a fourth optical data signal;
 a second WDM at the headend that receives the fourth optical data signal and outputs a fifth optical data signal; and
 a third WDM at the headend that receives the fifth optical data signal and outputs a sixth optical data signal.

13. The system of claim 12 further comprising:
 a variable optical attenuator (VOA) communicatively coupled to the second WDM, wherein the VOA is configured to receive the fifth optical data signal, adjust a power of the fifth optical data signal to a first level, and output a sixth optical data signal.

14. The optical communication module link extender of claim 1, wherein the third WDM further receives a gigabit passive optical network (GPON) optical data signal and combines the gigabit passive optical network (GPON) optical data signal with the second optical data signal to create the third optical data signal.

\* \* \* \* \*